(12) United States Patent
Hubbard et al.

(10) Patent No.: US 12,116,115 B2
(45) Date of Patent: Oct. 15, 2024

(54) ARRESTING HOOK SYSTEMS FOR AIRCRAFT

(71) Applicant: The Boeing Company, Arlington, VA (US)

(72) Inventors: Andrew James Hubbard, Saint Charles, MO (US); Timothy Charles Andrews, Des Peres, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/167,649

(22) Filed: Feb. 10, 2023

(65) Prior Publication Data

US 2024/0270375 A1 Aug. 15, 2024

(51) Int. Cl.
*B64C 25/68* (2006.01)
(52) U.S. Cl.
CPC ................... *B64C 25/68* (2013.01)
(58) Field of Classification Search
CPC ...................................................... B64C 25/68
See application file for complete search history.

(56) References Cited

U.S. PATENT DOCUMENTS

| | | | |
|---|---|---|---|
| 2,053,509 A * | 9/1936 | Barney | F04B 47/026 |
| | | | 74/593 |
| 2,396,628 A | 3/1946 | Woods | |
| 2,479,927 A | 8/1949 | Hand et al. | |
| 2,668,031 A * | 2/1954 | Martin | B64C 25/68 |
| | | | 244/110 G |
| 5,979,825 A * | 11/1999 | Cox | B64C 25/68 |
| | | | 244/110 G |
| 2013/0082137 A1 | 4/2013 | Gundlach et al. | |
| 2017/0021943 A1 | 1/2017 | Peverill et al. | |

OTHER PUBLICATIONS

United States Patent and Trademark Office, "Non-Final Office Action", issued in connection with U.S. Appl. No. 18/167,657 on Jun. 20, 2024, 8 pages.
United States Patent and Trademark Office, "Notice of Allowance and Fee(s) Due", issued in connection with U.S. Appl. No. 18/167,661 on May 31, 2024, 7 pages.

* cited by examiner

*Primary Examiner* — Alentina Xavier
(74) *Attorney, Agent, or Firm* — Hanley, Flight & Zimmerman, LLC

(57) ABSTRACT

Methods, apparatus, systems, and articles of manufacture are disclosed. An example pivot assembly for use with an arresting hook includes a coupler having a first opening defining a first axis and a second opening defining a second axis, the first opening transverse relative to the second opening. A linkage arm has a body and an arm. The body includes a third opening defining a third axis. The first opening of the coupler is to receive the body of the linkage arm such that the second opening of the coupler coaxially aligns with the third opening of linkage arm. A pin extends through the second opening and the third opening to couple the coupler and the linkage arm.

24 Claims, 40 Drawing Sheets

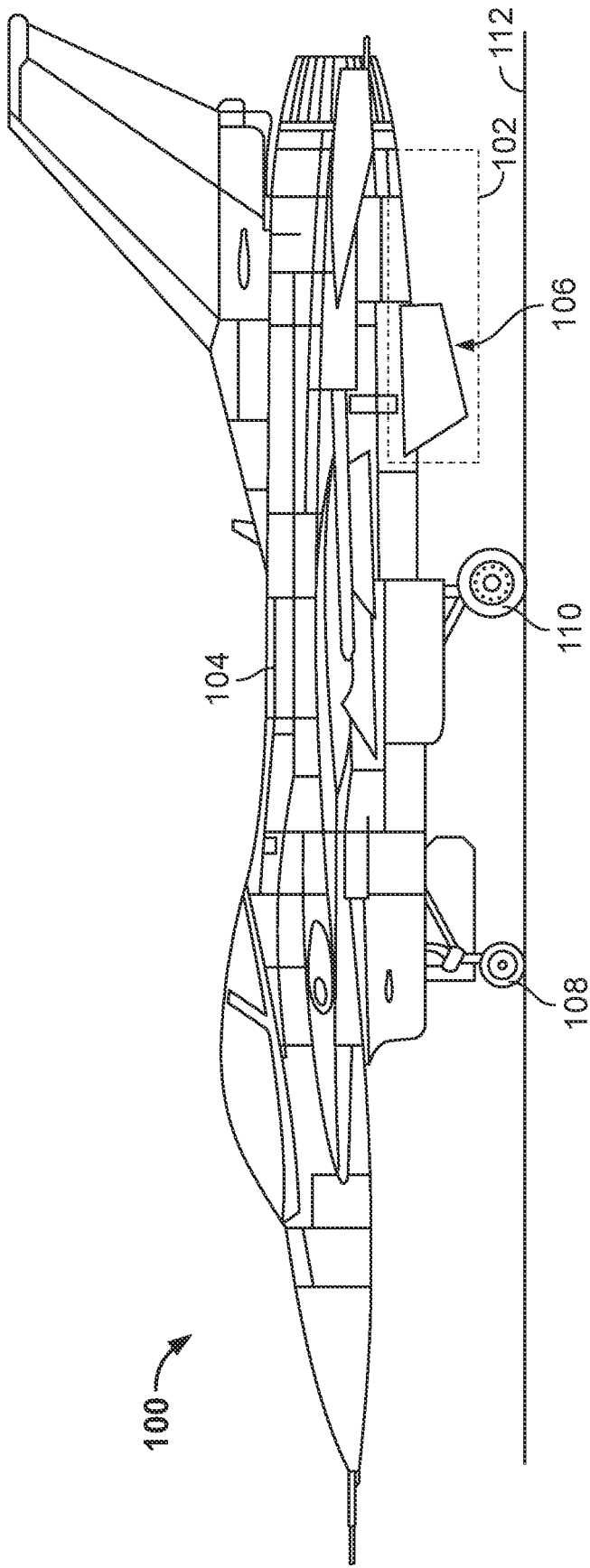
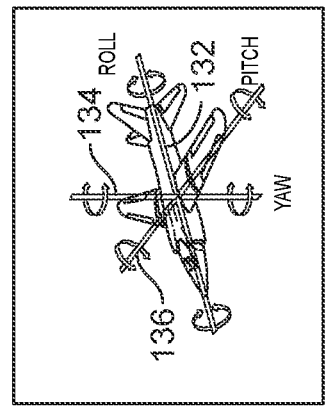
FIG. 1

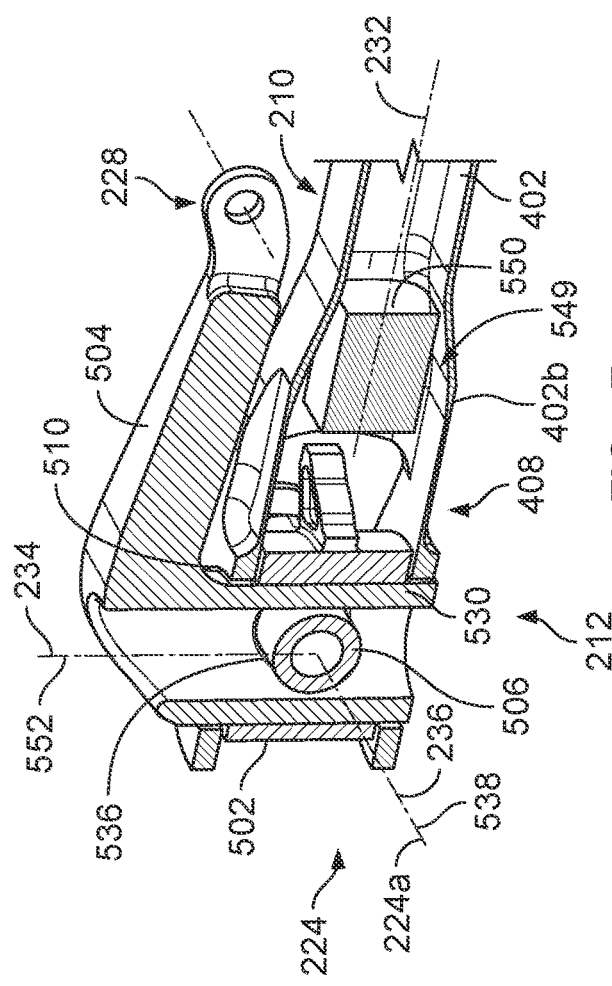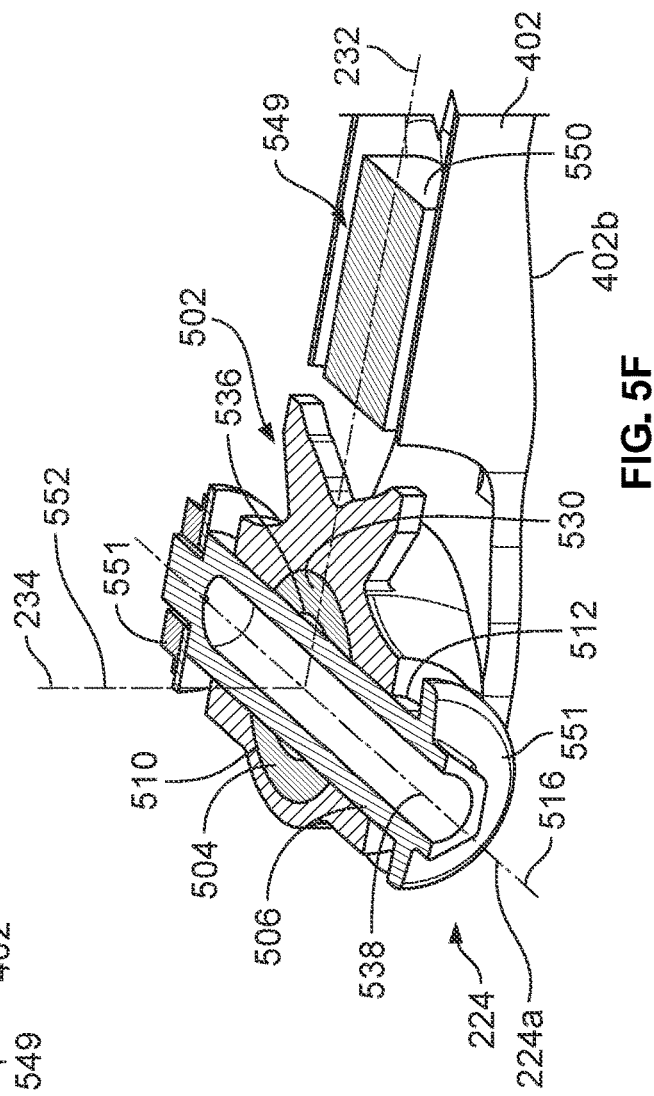

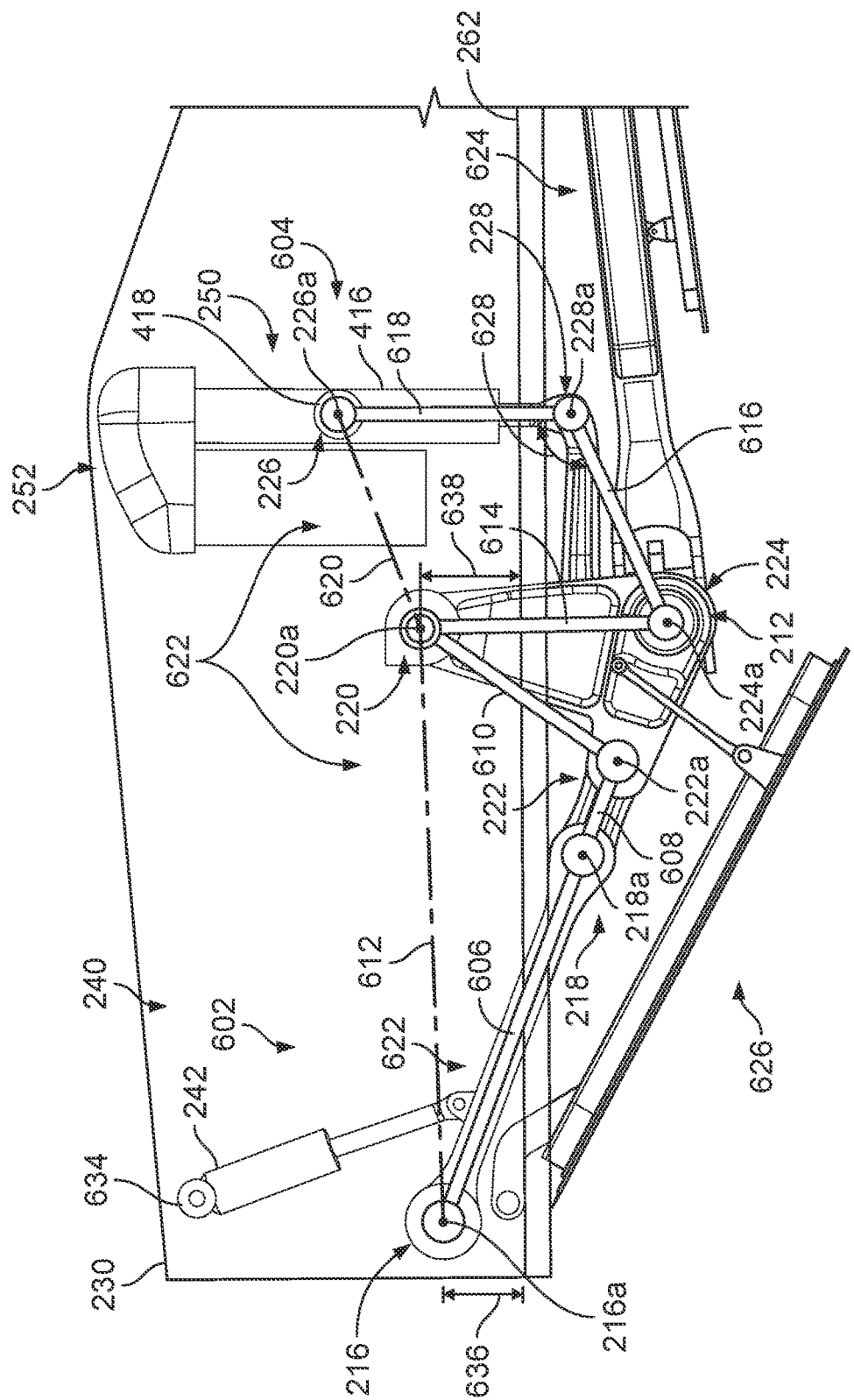

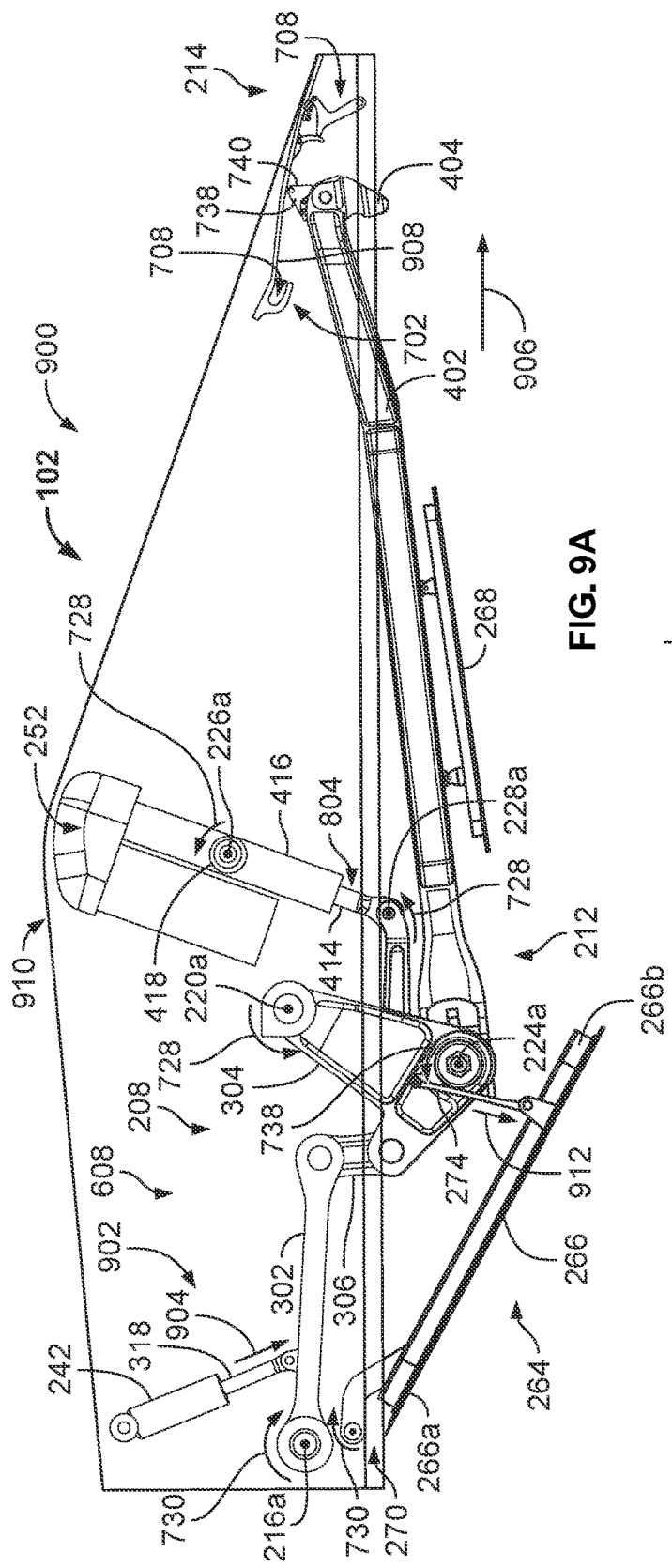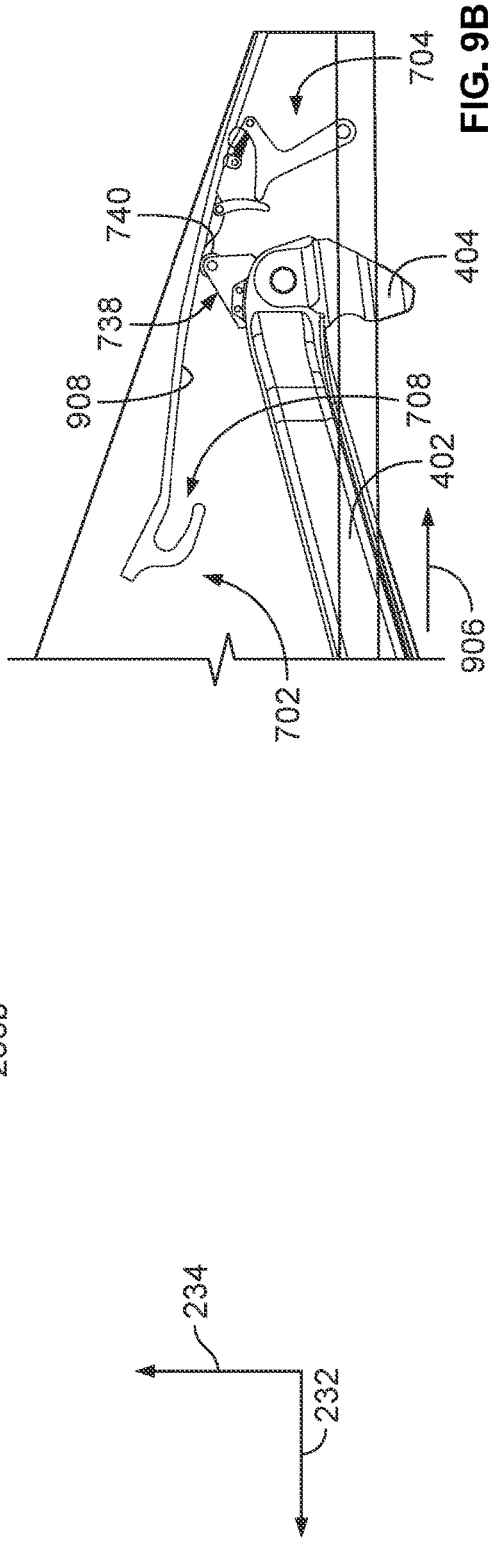
FIG. 9A
FIG. 9B

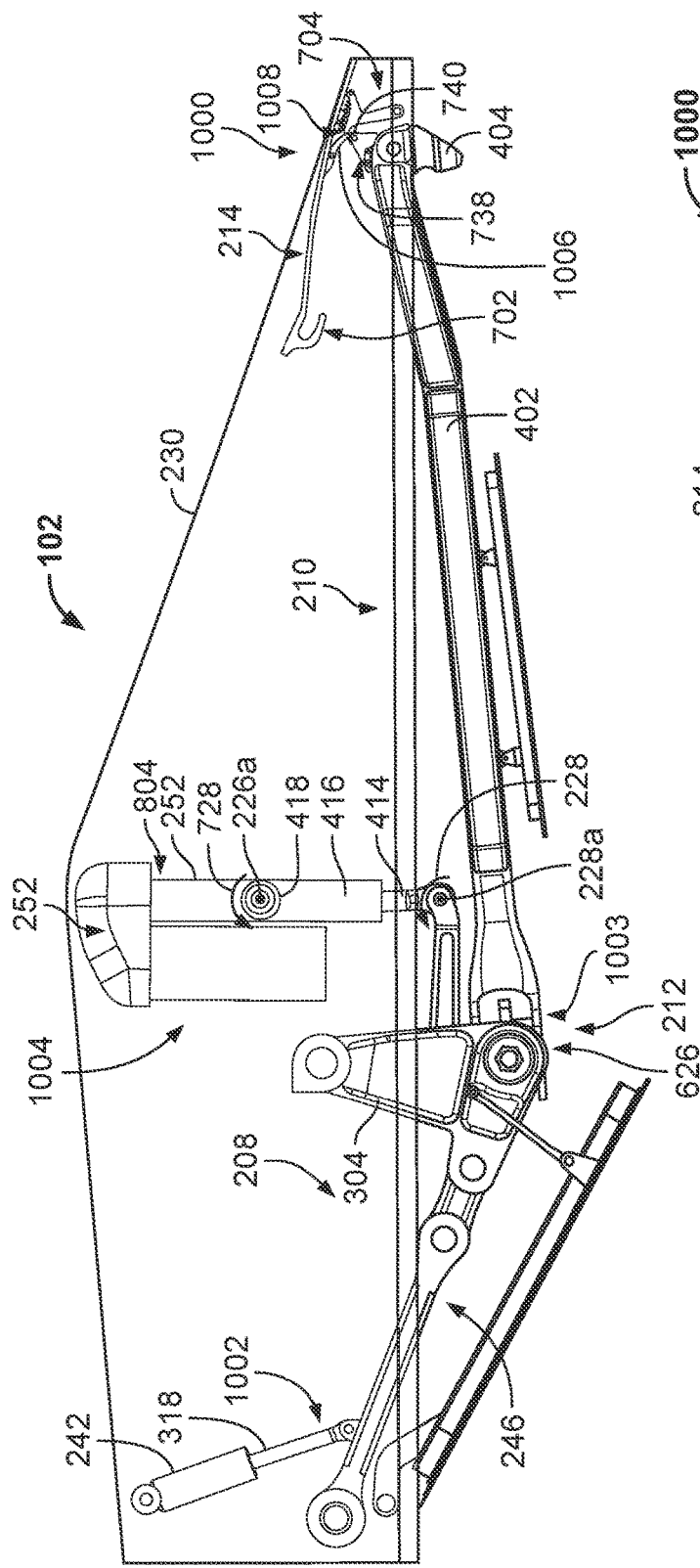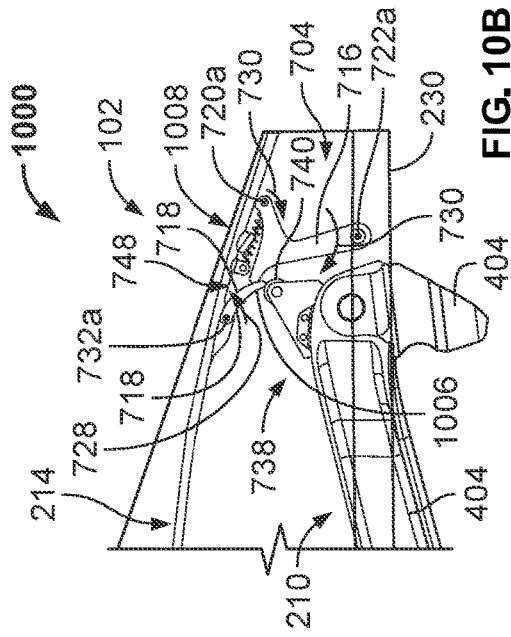
FIG. 10A
FIG. 10B

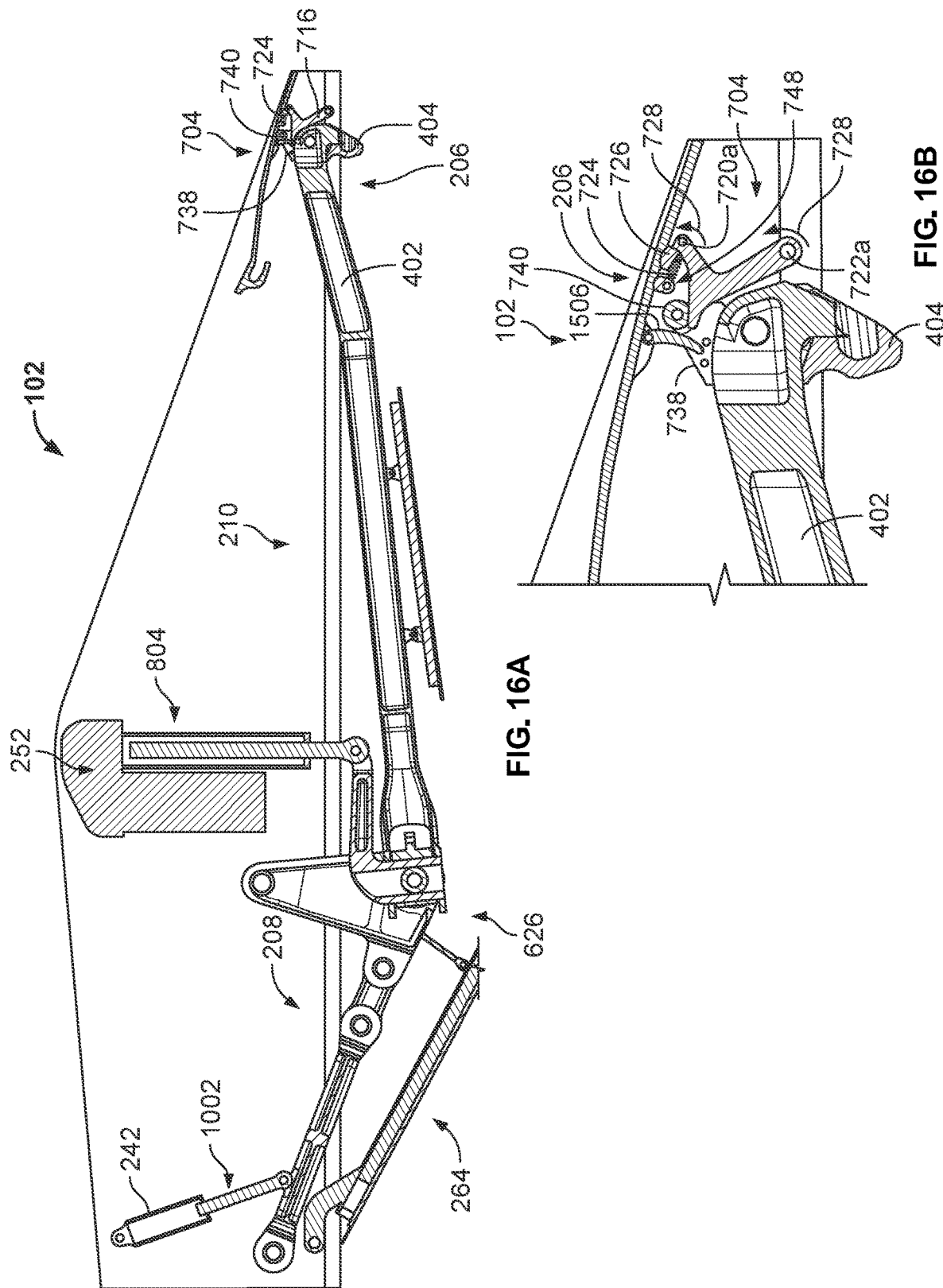

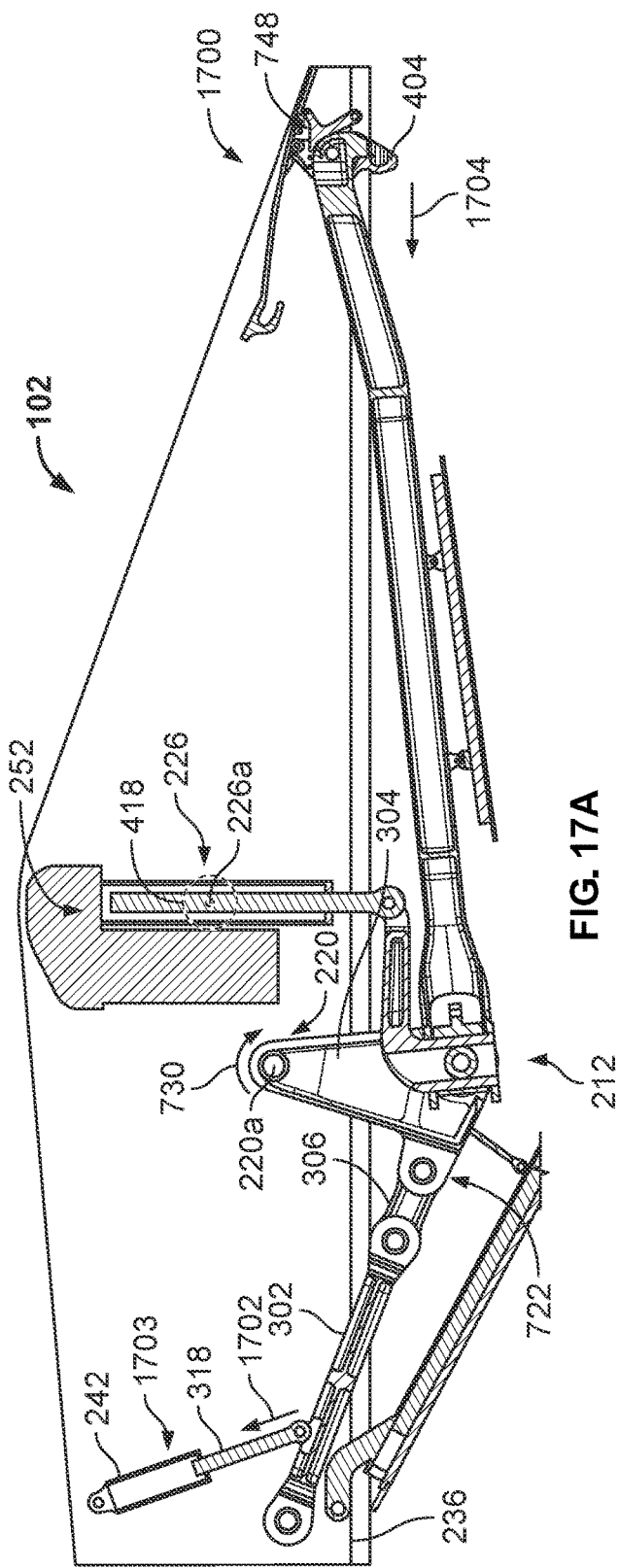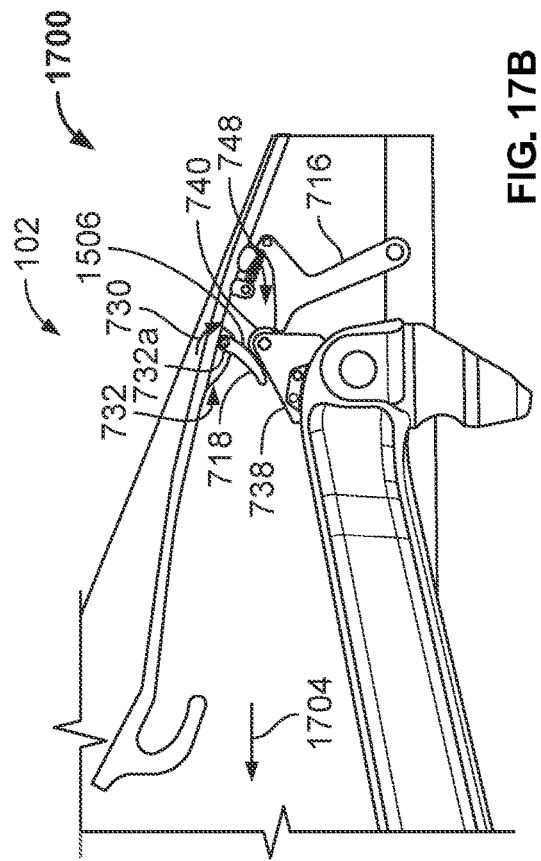
FIG. 17A
FIG. 17B

ARRESTING HOOK SYSTEMS FOR AIRCRAFT

FIELD OF THE DISCLOSURE

This disclosure relates generally to aircraft landing systems and, more particularly, to arresting hook systems for aircraft.

BACKGROUND

Landing strips having abridged runways (e.g., such as Aircraft carriers) can cause aircraft landings to be challenging. Such aircraft typically include arresting hook systems to decelerate the aircraft after landing on an abridged runway.

SUMMARY

An example pivot assembly includes a coupler having a first opening defining a first axis and a second opening defining a second axis, the first opening transverse relative to the second opening. A linkage arm has a body and an arm. The body includes a third opening defining a third axis. The first opening of the coupler is to receive the body of the linkage arm such that the second opening of the coupler coaxially to align with the third opening of linkage arm. A pin extends through the second opening and the third opening to couple the coupler and the linkage arm.

An example pivot assembly includes a coupler to couple to a clevis of an arresting hook shank. A linkage arm has a shaft and an arm. The shaft extends through the clevis of the hook shank and the coupler. The arm extends at an angle relative to the shaft. A pin extends through the coupler and the shaft of the linkage arm. The pin couples the coupler and the linkage arm. An axis of the pin intersects a longitudinal axis of the shaft when the pin is coupled to the coupler and the linkage arm.

An example arresting system includes a trapeze assembly including a pivot plate. A hook assembly includes a hook and a hook shank to support the hook. The hook shank includes a clevis opposite the hook. A pivot assembly couples the trapeze assembly and the hook assembly. The pivot assembly includes a coupler positioned in the clevis of the hook shank, a linkage arm having a shaft and an arm extending rearward of the shaft, the shaft positioned in an opening of the clevis of the hook shank and a first opening of the coupler, and a pin to couple the coupler and the shaft of the linkage arm, the pin defining a lateral pivot axis that intersects a vertical pivot of the shaft of the linkage arm.

BRIEF DESCRIPTION OF THE DRAWINGS

FIG. 1 is a side view of an example aircraft including an example arresting hook system in accordance with teachings of this disclosure.

FIG. 5E is a partial perspective view of the example pivot assembly of FIGS. 2A-2C and 5A.

FIG. 5F is another partial perspective view of the example pivot assembly of FIGS. 2A-2C and 5A.

FIG. 6C is a partial side view of the example arresting hook system of FIGS. 2A-2C shown in the example inspection position.

FIG. 9A is a side view of the example arresting hook system of FIGS. 2A-2C shown in a first intermediate position.

FIG. 9B is a partially enlarged view of the example arrestment hook system of FIG. 9A.

FIG. 10A is a side view of the example arresting hook system shown in an example bypass position.

FIG. 10B is a partially enlarged view of the example arrestment hook system of FIG. 10A.

FIG. 16A is a side view of the example arresting hook system of FIGS. 2A-2C shown in the example inspection position.

FIG. 16B is a partial enlarged view of FIG. 16A.

FIG. 17A is a side view of the example arresting hook system of FIGS. 2A-2C shown in an example release position.

FIG. 17B is a partial, enlarged view of FIG. 17A.

In general, the same reference numbers will be used throughout the drawing(s) and accompanying written description to refer to the same or like parts.

Figure 2A:
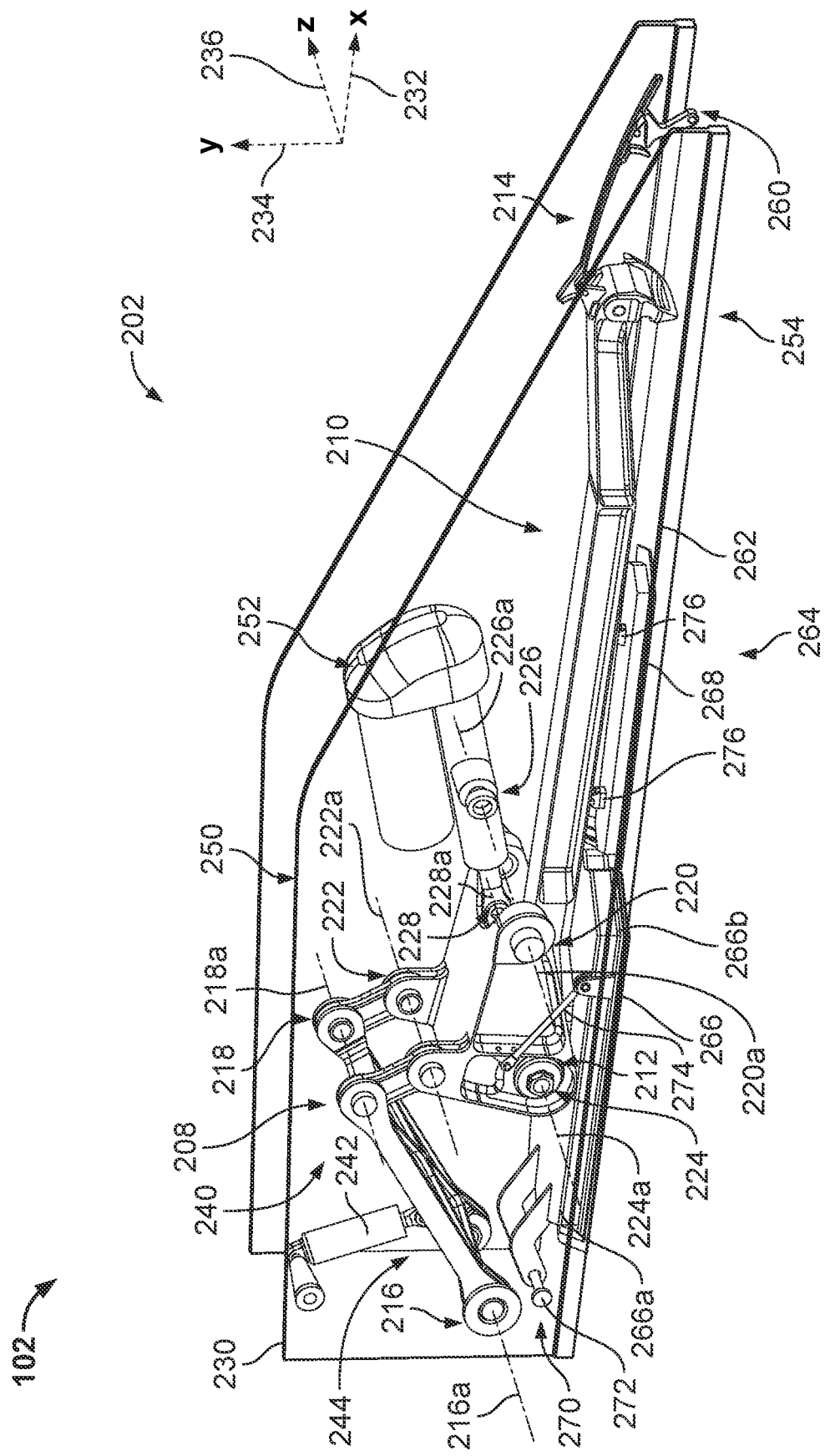
FIG. 2A is a perspective view of the example arresting hook system of FIG. 1 shown in an example stowed position.

As used herein, unless otherwise stated, the term "above" describes the relationship of two parts relative to Earth when an aircraft is resting upon landing gear on the ground. A first part is above a second part, if the second part has at least one part between the Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

DETAILED DESCRIPTION

Arresting hook systems are typically a sub-system included in military aircraft and used during landing on aircraft carriers. However, aircraft arresting systems can also be employed with some civilian aircraft and/or military aircraft for use at airports or other land-based unabridged runways. For example, arresting systems are often employed to stop aircraft when landing on an abridged landing strip such, as, for example, an aircraft carrier, a short-length runway, etc. Additionally, arresting systems can also be used at unabridged runways, for example, after a high speed rejected take-off when using unabridged runways. Arresting gear systems include a hook (referred to herein as a "hook point") which is attached to an end of a hook shank. The hook shank is deployed below an outer mold line (OML) of the aircraft such that the hook point engages with a cable on the runway. As used herein, the "outer mold line" refers to the outer shell of the aircraft.

For instance, to deploy an arresting system during landing, a pilot can lower an arresting hook of an arresting system such that the arresting hook contacts the runway as the aircraft wheels touch down. The hook drags along the surface of the runway and engages with an arresting cable stretched across the runway, transverse to the direction of aircraft travel. The arresting hook system supports arresting loads (e.g., vertical forces, lateral forces, etc.) imposed on the arresting hook. The cable transfers the kinetic energy of the aircraft to an arresting gear system to sufficiently decelerate the aircraft.

Arresting hook systems generally include a hook point, a hook shank, a pivot assembly, an airframe interface (e.g., either fixed or deployable, such as a trapeze), a lateral damper, and vertical damper actuator(s) (VDA(s)). The airframe interface (e.g., the trapeze, the fixed pivot, etc.) couples the pivot assembly and the hook shank to the airframe or primary structure. Some conventional pivot assemblies are configured as a stinger style, which has a short distance between a primary pivot axis (e.g., horizontal or lateral axis) and a vertical pivot axes to minimize the bending moment induced by a side load applied at the vertical pivot axis. Typically, conventional systems with trapezing interfaces also include stinger-style pivot assemblies. As used herein, a "trapeze," "trapezing structure," "trapezing interface," "trapeze assembly," and/or the like refer to an assembly that can cause the pivot assembly and the hook shank to swing or "trapeze" down below the OML of the aircraft based on actuation from a vertical actuator.

Conventional arresting hook systems (e.g., trapeze-style systems, etc.) may be coupled to and/or mounted on the airframe such that a portion of the system (e.g., the pivot assembly, the hook shank, the hook point, etc.) protrudes beyond or outside the OML when the system is in the stowed position. Some known arresting hook systems include a wrist link as a part of the stinger-style pivot assembly to connect the hook shank and the trapezing structure. However, the vertical axis of stinger-style assemblies is often offset relative to the primary pivot axis of the wrist along a longitudinal axis. In other words, the primary pivot axis does not intersect the vertical axis. Such an offset distance between the vertical and horizontal axes causes large moment forces to transfer to the trapeze assembly. As a result, larger trapeze assemblies are needed to counteract such lateral side-loads and/or moment loads, which is associated with an increased system weight. Furthermore, some known arresting hook systems include a single uplock mechanism to latch the pivot assembly and/or the airframe interface to hold the system in the stowed position. However, such uplock mechanisms do not enable positioning the arresting hook system in an inspection or intermediate position needed for servicing and/or inspecting the hook. The inspection position as described herein is between a fully stowed position and a fully deployed position of the hook.

Example arresting hook systems disclosed herein include multiple pivot axes (e.g., lateral, or horizontal axes) that are parallel to a pitch axis of the aircraft. As used herein, the terms "pivot axis" and "pivot axes" refer to one or more axes about which members of the arresting hook system (e.g., the hook shank, etc.) vertically rotate during deployment and/or arrestment. As used herein, the term "primary pivot axis" refers to an axis of the pivot assembly and the hook shank that is substantially parallel to a pitch axis of an aircraft and/or other pivot axes of the arresting hook system. For example, the VDA can rotate (e.g., vertically lower) the hook shank about the primary pivot axis to move the hook shank into the deployed position. As the hook engages an arresting cable, lateral forces can be applied to the hook shank that influence rotation of the hook shank about a vertical axis of the arresting hook system. As used herein, the term "vertical axis" refers to an axis of the pivot assembly and the hook shank orthogonal to the primary pivot axis. Unlike the pivot axes, the vertical axis is not always parallel to a yaw axis of the aircraft. As the VDA deploys the arresting hook system, the hook shank and/or a longitudinal axis rotates about the primary pivot axis while remaining orthogonal to the primary pivot axis. As used herein, the term "longitudinal axis" refers to an axis of the pivot assembly orthogonal to the primary pivot axis and the vertical axis. The longitudinal axis can be aligned with the hook shank. However, as the hook point engages an arresting cable, lateral forces can be applied to the hook shank that influence rotation of the hook shank about the vertical axis such that an angle is formed between the hook shank and the longitudinal axis. Similar to the vertical axis, the longitudinal axis is not always parallel to a roll axis of the aircraft.

As used herein, the term "lateral damper" refers to a damper (e.g., pneumatic damper, hydraulic damper, etc.) that can support lateral forces and counteract rotation of the hook shank about the vertical axis. As used herein, the term "vertical damper actuator" refers to a mechanism that functions as an actuator (e.g., pneumatic damper actuator, hydraulic damper actuator, etc.) and a damper. The VDA can rotate a member (e.g., the hook shank) about the primary pivot axis as well as support (e.g., counteract, dampen, absorb, etc.) vertical forces acting on the member against the direction of motion. The terms "vertical force," "vertical load," and/or "vertical torque" refer to dynamic influences on the hook shank that cause the hook shank to rotate about the primary pivot axis. The terms "lateral force," "lateral load," and/or "lateral torque" refer to dynamic influences on the hook shank which cause the hook shank to rotate about the vertical axis. The terms "longitudinal force" and/or "longitudinal load" refer to dynamic influences (e.g., tensile force, compressive forces, etc.) on the hook shank that are aligned with the longitudinal axis.

The hook shank can be coupled to a pivot assembly and the pivot assembly can be coupled to an airframe interface (e.g., trapeze or fixed pivot). The aircraft interface can be coupled to a primary structure and/or an airframe of the aircraft via pivot joints (e.g., rotatable joints). In some examples, the aircraft interface allows movement (e.g., rotation, deployment, etc.) of the hook shank between a stowed position and an intermediate position. Furthermore, in some examples, the pivot assembly allows movement of the hook shank between the intermediate position and the deployed position for arrestment. The pivot assembly and the aircraft interface serve as the structural load path from the hook shank to the primary structure of the aircraft.

Example arresting hook systems disclosed herein employ a trapeze deployment assembly, a hook deployment assembly, a pivot assembly to pivotally couple the trapeze deployment assembly and the hook deployment assembly, and a latching system for securing the hook in the stowed position and an inspection or intermediate position. In some examples, the trapeze deployment assembly employs a vertical actuator to deploy the trapeze deployment assembly. In some examples, the hook deployment assembly employs a VDA (e.g., a trunnion mounted VDA) pivotally coupled to the airframe or primary structure of an aircraft. In known arresting hook systems, the VDA is pivotally coupled to ("rides on") the airframe interface (e.g., trapeze deployment assembly, etc.) to support vertical loading and to rotate the hook shank about the primary pivot axis from an up/stowed position to a down/deployed position. Disclosed arresting hook systems decouple the VDA from the trapezing assembly such that the VDA is pivotally coupled to primary structure via a trunnion and pivotally coupled to the hook deployment assembly via a piston to improve the damping kinematics of the system. As a result, the trapeze deployment assembly and the hook deployment assembly effectively define two sets of 4-bar linkage assemblies: a first four-bar linkage assembly (a trapezing four-bar linkage) associated with the trapeze deployment assembly and a second four-bar linkage assembly (a damping four-bar linkage) associated with the hook deployment assembly. As used herein, "damping kinematics" refers to the capability of the disclosed arresting hook system to dissipate energy during an arrested landing event. In some examples, the efficiency of the arresting hook system can be measured based on the amount of rotational energy removed from the system per unit of arrestment loads imparted to the hook shank.

The example trapeze deployment assembly, the hook deployment assembly and/or the pivot coupler provide a highly efficient system that has favorable and/or improved VDA kinematics, which reduces weight while improving cable engagement performance, with the system also enabling a reduced VDA stroke length that minimizes weight, installation volume, and deployment complexity. Additionally, decoupling attachment between the VDA and the trapeze deployment assembly simplifies control fluid routing and enables a narrow system envelope in a lateral direction, thereby saving space. Additionally, the trunnion connection provided by the VDA eliminates the design constraint of retracted pin-to-pin length, resulting in a design that is both compact and robust/flexible for a wide variety of design envelopes.

An example pivot coupler assembly (e.g., a pivot assembly) disclosed herein diminishes loads to primary structure(s) of an aircraft. Example couplers disclosed herein employ a zero-length coupling that nearly eliminates a lateral moment into a trapeze supporting the hook. As used herein, "zero-length coupling" means that the lateral axis (e.g., of the hook shank) intersects the primary pivot axis (e.g., of the pivot assembly) so that there is no lateral separation or distance between the lateral axis and the primary pivot axis. As a result of the lateral axis intersecting the pivot axis, no moment arm for a side-load is created, which reduces a moment force that would otherwise need to be reacted by a trapeze assembly. Additionally, some example couplers disclosed herein include a cam surface for the lateral damper (e.g., to act against). This lateral moment, along with friction, are the only lateral axis moments imparted to the trapeze assembly. As a result, the example couplers disclosed herein enable a smaller trapeze, which significantly reduces weight of disclosed systems. An example pivot assembly for an arresting hook disclosed herein includes a cylindrical coupler structured and/or configured to be received within the clevis of an arresting hook shank. The cylindrical coupler has a bore extending in a direction transverse to an axis of the cylindrical coupler for receiving a pin. A linkage arm couples to (e.g., depends from) a shaft extending thru the clevis of the hook shank and cylindrical coupler. The arm extends at an angle relative to the shaft. A pin extends through the cylindrical coupler and the linkage arm shaft and is pivotally coupled to a structure of the trapeze assembly. The axes of the linkage arm shaft and the pin intersect each other.

Some example arresting hook systems disclosed herein employ an uplock or latching system that can robustly retain an example hook in a stowed position. Additionally, the example uplock assembly disclosed herein can maintain the example hook in an intermediate position during inspection. In some examples, uplock assemblies disclosed herein employ a track coupled to a primary or frame structure of an aircraft, a spring latch coupled to a first end of the track, a passive capture feature facing aft located at a second end of the track opposite the first end, and a roller. The roller is coupled to a hook shank and/or the hook. The spring latch can lock a position of the hook shank via engagement between the spring latch and the roller when the hook shaft is retracted after deployment and/or from the deployed position. However, a force of the roller when moving the trapeze deployment assembly to the stowed position enables the roller to detach from the spring latch. During initial deployment from the stowed position to the deployed position, the spring latch system includes a barrier that enables the roller to bypass the spring latch and continue to the fully deployed position. Thus, the spring latch system does not interfere with deployment of the hook deployment assembly from the stowed position to the deployed position.

An example passive capture mechanism for a stowable arresting hook can include a guide member having a forward end portion with a passive capture hook, and an aft end portion with a pivotally mounted bypass element. A bracket is coupled to an arresting hook shank. The bracket includes an end portion having a roller. The roller is structured or configured to roll along the guide between a retracted position within the passive hook and an extended position in which the roller can bypass a directional spring latch mechanism or is captured by the directional spring latch mechanism, depending on the direction of roller movement. For example, when moving from the stowed position to the deployed position, the roller bypasses the directional spring latch mechanism. When moving from the deployed position to the stowed position, the roller is captured by the directional spring latch mechanism to maintain the hook in an intermediate or inspection position (e.g., a partially deployed position).

FIG. 1 is a side view of an example aircraft 100 including an example arresting hook system 102 (e.g., a tailhook) in accordance with teachings of this disclosure. Specifically, the arresting hook system 102 is positioned and/or stowed in a fuselage 104 (e.g., within the fuselage 104) adjacent an aft region 106 of the fuselage 104. The aircraft 100 of the illustrated example includes a first or front landing gear 108 and a second or rear landing gear 110 for landing and supporting the aircraft 100 on a ground surface 112. The arresting hook system 102 is located aft of the rear landing gear 110. The arresting hook system 102 of the illustrated example can be deployed to engage a cable extending across a runway transverse to the direction of movement of the aircraft to reduce a braking or stopping distance of the aircraft 100 during a landing event. For example, the arresting hook system 102 can be employed when landing on an aircraft carrier. In the illustrated example of FIG. 1, the aircraft 100 is a military aircraft. However, other example aircraft including civilian aircraft can employ the example arresting hook system 102 disclosed herein. For example, the arresting hook system 102 disclosed herein can be employed with any aircraft to achieve rapid deceleration during routine landings aboard aircraft carrier flight decks at sea, or during emergency landings or aborted takeoffs at properly equipped airports (e.g., airports that have cable arrestment systems). The aircraft 100 of the illustrated example is described herein in reference to a roll axis 132 of the aircraft 100, a yaw axis 134 of the aircraft 100, and/or a pitch axis 136 of the aircraft 100.

Figure 2B:
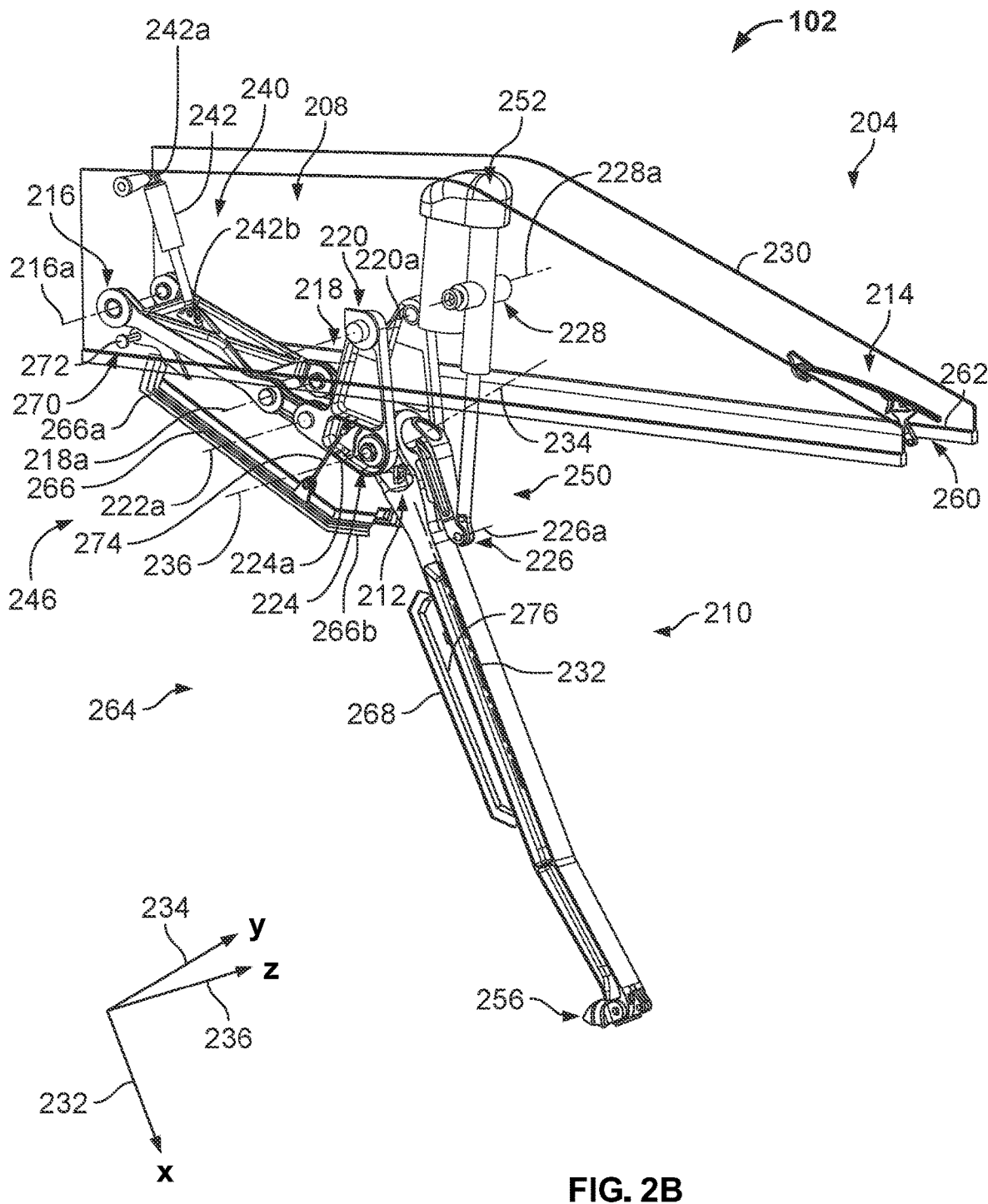
FIG. 2B is a perspective view of the example arresting hook system of FIG. 1 shown in an example deployed position.
Figure 2C:
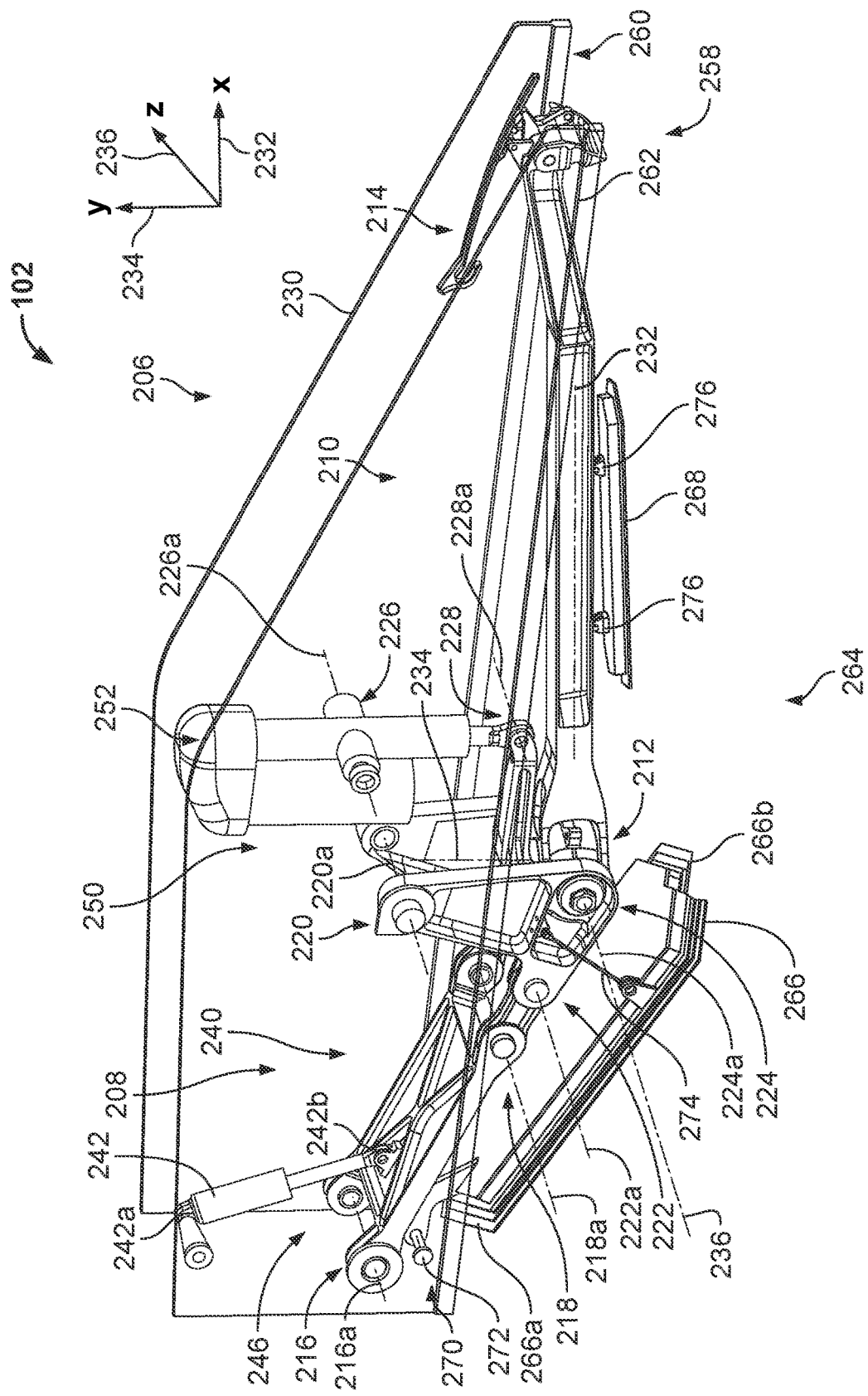
FIG. 2C is a perspective view of the example arresting hook system of FIG. 1 shown in an example inspection position.
Figure 2D:
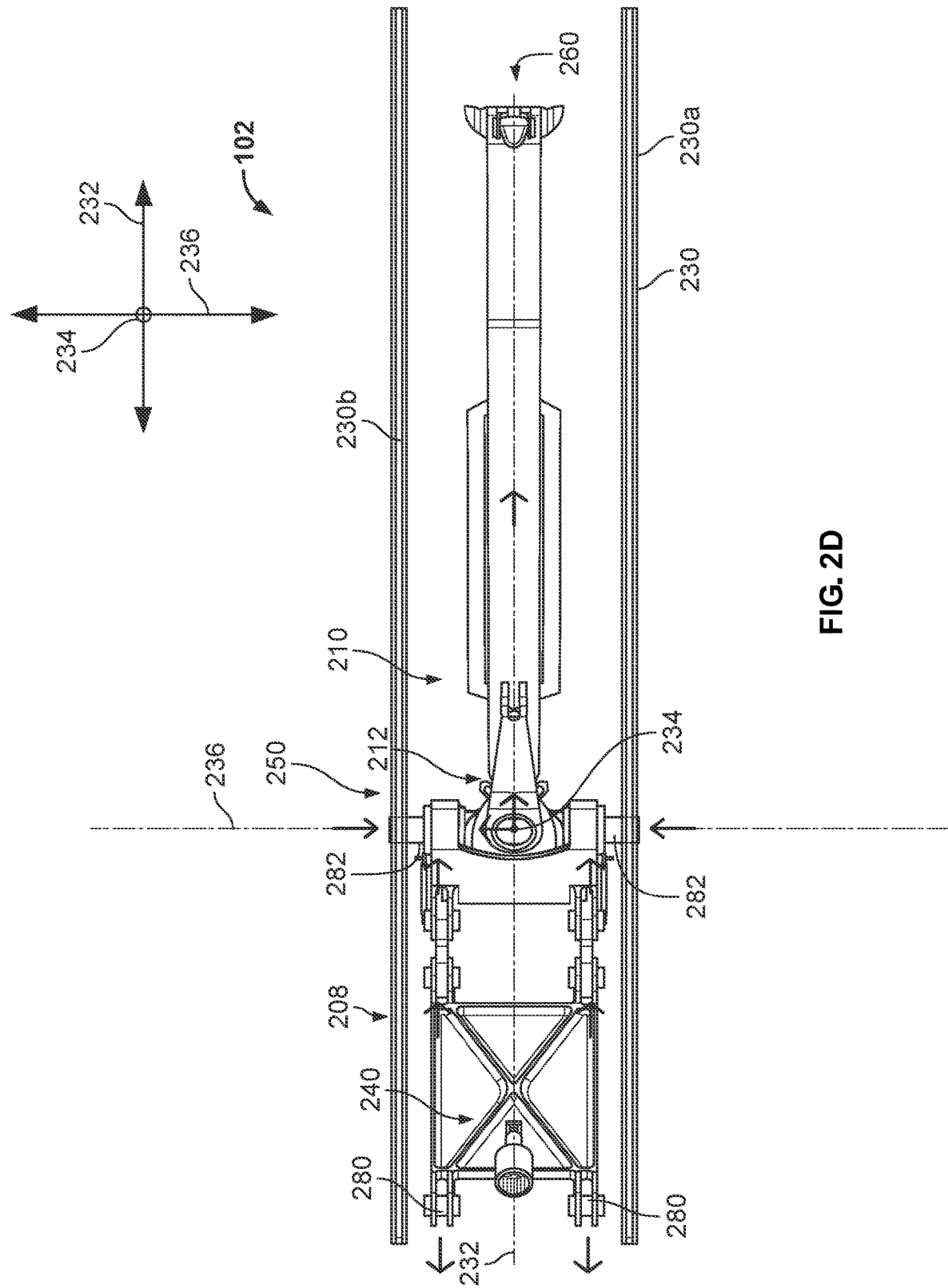
FIG. 2D is a top view of the example arresting hook system of FIG. 1.

FIGS. 2A-2D illustrates the example arresting hook system 102 of FIG. 1. FIG. 2A is a perspective view of the example arresting hook system 102 shown in an example stowed position 202 (e.g., a fully stowed or retracted position). FIG. 2B is a perspective view of the example arresting hook system 102 shown in an example deployed position 204 (e.g., fully deployed, or extended position). FIG. 2C is a perspective view of the example arresting hook system 102 shown in an example intermediate or inspection position 206. The inspection position 206 is between the stowed position 202 and the deployed position 204. FIG. 2D is a top view of the example arresting hook system 102 of FIGS. 2A-2C.

Referring to FIGS. 2A-2C, to move the arresting hook system 102 between the stowed position 202, the deployed position 204 and the inspection position 206, the example arresting hook system 102 of the illustrated example includes a trapeze deployment assembly 208, a hook deployment assembly 210, and a pivot assembly 212 (e.g., a pivot coupler assembly). To assist with retaining the hook in the stowed position 202 and/or the inspection position 206, the arresting hook system 102 of the illustrated example includes a locking assembly 214. In some examples, although not shown, the arresting hook system 102 of the illustrated example includes a primary lock or uplock (e.g., a primary lock 1902 of FIG. 19).

The arresting hook system 102 of the illustrated example includes a first joint 216 defining a first pivot axis 216a, a second joint 218 defining a second pivot axis 218a, a third joint 220 defining a third pivot axis 220a, a fourth joint 222 defining a fourth pivot axis 222a, a fifth joint 224 defining a fifth pivot axis or a primary pivot axis 224a, a sixth joint 226 defining a sixth pivot axis or a VDA pivot axis 226a, and a seventh joint 228 defining a seventh pivot axis or a VDA-linkage arm pivot axis 228a. The joints 216-228 of the illustrated example can be defined by one of more bushings, bearings, pins, clevis connections, trunnions, and/or any other coupling that enables pivotal movement to define the pivot axes 216a-228a. In the illustrated example, the first joint 216, the third joint 220 and the sixth joint 226 are pivotally coupled to a primary structure or frame 230 (e.g., airframe, etc.) of the aircraft 100. The second joint 218, the fourth joint 222, the fifth joint 224 and the seventh joint 228 are not directly coupled to the frame 230. As used herein, the primary structure or frame 230 of an aircraft includes, but is not limited to, a bulkhead, a stringer, a former, a longeron, a beam and/or any other structure of an aircraft for counteracting loads, forces, moments, etc., imparted to the aircraft 100.

The arresting hook system 102 of the illustrated example is described herein in reference to a longitudinal axis 232 (e.g., an x-axis), a vertical axis 234 (e.g., a y-axis), and/or a pivot axis 236 (e.g., a z-axis). For example, the pivot axes 216a-228a of the illustrated example have the same orientation relative to the pivot axis 236. In some examples when the arresting hook system 102 is in between the stowed position 202, the deployed position 204 and the inspection position 206, the longitudinal axis 232 of the illustrated example can be substantially parallel relative to the roll axis 132 of the aircraft 100, the vertical axis 234 can be substantially parallel relative to the yaw axis 134 of the aircraft 100, and/or the pivot axis 236 can be substantially parallel relative to the pitch axis 136 of the aircraft 100. As used herein, "parallel" or "substantially parallel" means perfectly parallel or parallel within 10 degrees of perfectly parallel. For example, first pivot axis axes 216a, the second pivot axis 218a, the third pivot axis 220a, the fourth pivot axis 222a, the fifth pivot axis 224a, the sixth pivot axis 226a and the seventh pivot axis 228a of the illustrated example are substantially parallel relative to each other and/or the pitch axis 136. In some examples when the arresting hook system 102 is in between the stowed position 202, the deployed position 204 and the inspection position 206, the longitudinal axis 232 of the illustrated example can be non-parallel relative to the roll axis 132 of the aircraft 100 and/or the vertical axis 234 can be non-parallel relative to the yaw axis 134 of the aircraft 100. For example, in some examples, the longitudinal axis 232 can be at an angle (e.g., between 15 degrees and 90 degrees) relative to the roll axis 132. For example, in some examples, the vertical axis 234 can be at an angle (e.g., between 15 degrees and 90 degrees) relative to the yaw axis 134.

The arresting hook system 102 of the illustrated example can pivot or rotate about the first pivot axis 216a, the second pivot axis 218a, the third pivot axis 220a, the fourth pivot axis 222a, the fifth pivot axis 224a, the sixth pivot axis 226a and/or the seventh pivot axis 228a to enable the arresting hook system 102 to move between the stowed position 202, the deployed position 204, and/or the intermediate position 206.

The trapeze deployment assembly 208 of the illustrated example includes a first linkage assembly 240 (e.g., a trapeze) and a vertical actuator 242 (e.g., a double-acting actuator, etc.). The vertical actuator 242 of the illustrated example operates the first linkage assembly 240 and/or the trapeze deployment assembly 208. For example, the vertical actuator 242 causes the first linkage assembly 240 of the trapeze deployment assembly 208 to move between a retracted position 244 (FIG. 2A) and an extended position 246 (e.g., FIGS. 2B and 2C). The vertical actuator 242 of the illustrated example has a first end 242a that is coupled or fixed to the frame 230 of the aircraft 100 and a second end 242b of the vertical actuator 242 is coupled to the first linkage assembly 240.

The hook deployment assembly 210 of the illustrated example includes a second linkage assembly 250 and a vertical damper actuator (VDA) 252. The VDA 252 is operatively coupled to the hook deployment assembly 210 via the pivot assembly 212 and causes (e.g., deploys) the hook deployment assembly 210 to move between a non-engagement position 254 (FIG. 2A), an arrestment position 256 (FIG. 2B) (e.g., an engagement position), and a non-engagement intermediate position 258 (FIG. 2C) (e.g., a non-arrestment position) (e.g., in a rotational direction about the primary pivot axis 224a).

The pivot assembly 212 of the illustrated example pivotally couples the trapeze deployment assembly 208 and the hook deployment assembly 210. Additionally, the pivot assembly 212 of the illustrated example operatively couples the VDA 252 and the hook deployment assembly 210. Thus, operation of the VDA 252 causes movement of the hook deployment assembly 210 between the non-engagement stowed position 254, the arrestment position 256 and/or the non-engagement intermediate position 258.

The arresting hook system 102 of the illustrated example is an internally stowed system. As shown in FIG. 2A, when the arresting hook system 102 is in the stowed position 202, the arresting hook system 102 is housed within a bay or opening 260 of the fuselage 104 such that no part of the arresting hook system 102 protrudes beyond an outer mold line (OML) 262 of the fuselage 104. That is, when the arresting hook system 102 is in the stowed position 202, the trapeze deployment assembly 208, the hook deployment assembly 210 and the pivot assembly 212 are disposed above (e.g., within) the OML 262 and/or within the fuselage 104 of the aircraft 100. In some examples, the arresting hook system 102 can include an uplock mechanism (e.g., the primary lock 1902 of FIG. 19) that interfaces directly with the trapeze deployment assembly 208. The uplock mechanism may be a locking actuator that latches onto a hook of the trapeze deployment assembly 208. Additionally or alternatively, the hook deployment assembly 210 engages with (e.g., snaps into, interfaces with, etc.) the locking assembly 214 when the arresting hook system 102 is in the stowed position 202 and/or the inspection position 206. The arresting hook system 102 of the illustrated example can be deployed to at least partially extend beyond or outside of (e.g., below) the OML 262 when the arresting hook system 102 is in the deployed position 204 and/or the inspection position 206. Thus, the arresting hook system 102 of the illustrated example is stowed above the lower OML 262 in-flight and is deployed below the lower OML 262 to engage a cable (during landing) and/or for inspection.

To enclose the arresting hook system 102 within the fuselage 104 when the arresting hook system 102 is in the stowed position 202, the arresting hook system 102 of the illustrated example includes a cover 264. The cover 264 of the illustrated example seals, covers or encloses the opening 260 through which the arresting hook system 102 extends or projects in the deployed position 204 and/or the inspection position 206. In some examples, the cover 264 defines a portion of an outer surface (e.g., an under belly) of the fuselage 104 when the arresting hook system 102 is in the stowed position 202. As a result, the cover 264 improves aerodynamic characteristics of the aircraft 100, thereby improving efficiency and performance. The cover 264 of the illustrated example includes a first door or first panel 266 and a second door or second panel 268. Specifically, the trapeze deployment assembly 208 includes (e.g., supports) the first panel 266 and the hook deployment assembly 210 includes (e.g., supports) the second panel 268. In the stowed position 202, the first panel 266 and the second panel 268 adjoin or engage at least partially enclose the opening 260. In other words, the first panel 266 and the second panel 268 enclose the arresting hook system 102 in the fuselage 104. In some examples, the cover 264 can include a third door or panel that covers the hook deployment assembly 210 and/or the locking assembly 214 when the arresting hook system 102 is in the stowed position 202. In such examples, the third panel can be hinged about an axis near and/or parallel to the roll axis 132 of the aircraft. The third panel can be actuated by a separate actuator during hook deployment.

The first panel 266 has a first end 266a pivotally coupled to the frame 230 and a second end 266b opposite the first end 266a pivotally coupled to the first linkage assembly 240. The first panel 266 is pivotally coupled to the frame 230 via a hinge 270 at the first end 266a. The hinge 270 includes a pin 272 to pivotally couple the first end 266a (e.g., an arm) of the first panel 266 and the frame 230. The second end 266b of the first panel 266 is coupled to the trapeze deployment assembly 208 (e.g., the first linkage assembly 240) via a tether or rod 274 (e.g., a rigid or adjustable rod). The second panel 268 is fixed to the second linkage assembly 250 via fasteners 276 (e.g., bolts, pins, etc.). In the illustrated example, the cover 264 is coordinated with the arresting hook system 102. Thus, the cover 264 moves between a cover closed position 278 (FIG. 2A) when the arresting hook system 102 is in the stowed position 202 and a cover open position 279 (FIG. 2B) when the arresting hook system 102 is in the deployed position 204. In contrast to known arresting hook systems that employ mechanized doors that include actuators, which add significant complexity, weight, and cost to the arresting hook system and the trapezing actuation thereof, the arresting hook system 102 of the illustrated example employs primarily passive or follower doors that are not actuated by separate actuators and/or systems but follow movement of the arresting hooks system 102.

Referring to FIG. 2D, the first linkage assembly 240 is pivotally coupled to the frame 230 via a first set of pins 280 (e.g., and/or bushings) and a second set of pins 282 (e.g., and/or bushings) spaced from the first set of pins 280. The pivot assembly 212 pivotally couples the hook deployment assembly 210 and the second linkage assembly 250 to enable rotation of the hook deployment assembly 210 relative to the frame 230. As described in greater detail below, the arresting hook system 102 of the illustrated example reacts forces imparted in directions aligned with the roll axis 132, a longitudinal axis 232, the pivot axis 236, and/or the third pivot axis 220a. Furthermore, the arresting hook system 102 reacts moments imparted about a vertical axis 234 orthogonal to the longitudinal axis 232a and the primary pivot axis 224a (FIGS. 2A-2C). As mentioned, the third pivot axis 220a is substantially parallel with the pitch axis 136 of the aircraft. In some examples, the longitudinal axis 232 and the vertical axis 234 are parallel to the roll axis 132 and the yaw axis 134, respectively. However in the illustrated example of FIG. 2D, the longitudinal axis 232 is not parallel to the roll axis 132.

In the illustrated example of FIG. 2D, the trapeze deployment assembly 208 of the illustrated example reacts forces in directions aligned with the roll axis 132 and/or the third pivot axis 220a. The pivot assembly 212 of the illustrated example reduces moment forces imparted about the third pivot axis 220a and/or moment forces imparted about the vertical axis 234. The arresting hook system 102 is symmetrical about the roll axis 132. Additionally, the arresting hook system 102 of the illustrated example enables a narrow system envelope in the pivot axis 236, thereby saving space. Specifically, the arresting hook system 102 requires the opening 260 to be relatively narrow between a first side 230a of the frame 230 and a second side 230b of the frame 230 defining the opening 260.

Figure 3A:
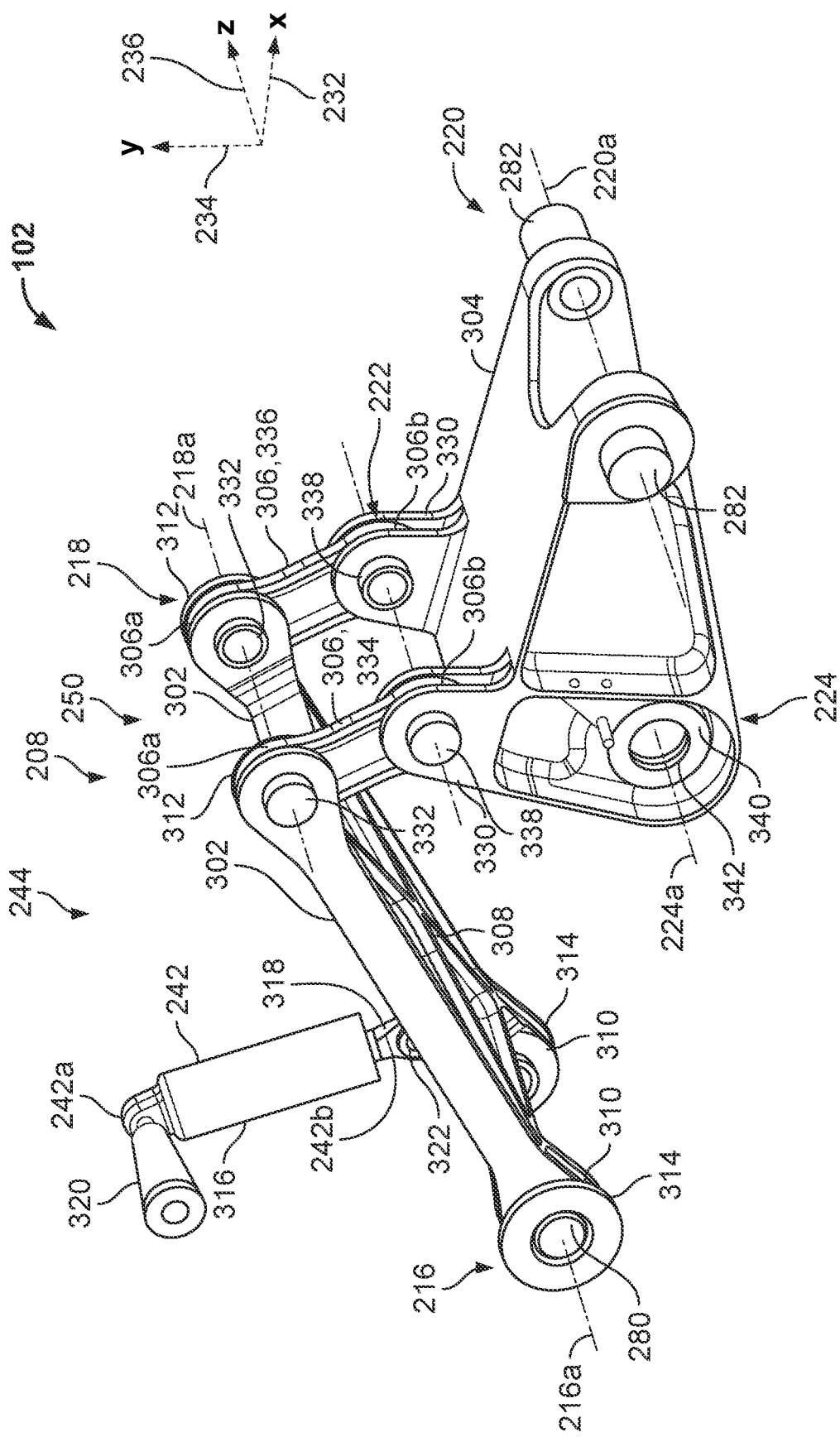
FIG. 3A is a perspective view of an example trapeze deployment assembly of the example arresting hook system of FIGS. 2A-2C shown in an example retracted position.
Figure 3B:
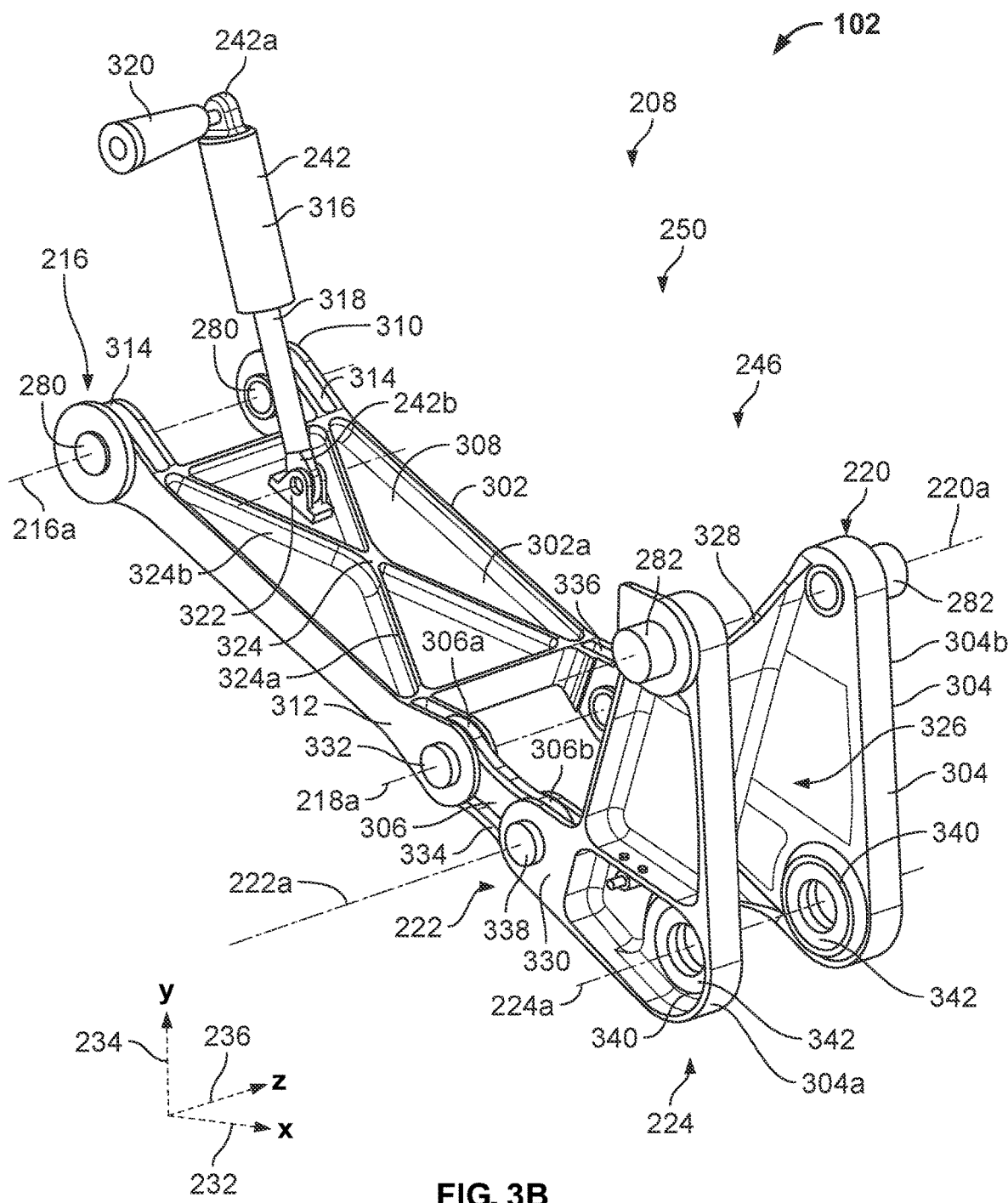
FIG. 3B is a perspective view of the example trapeze deployment assembly of the example arresting hook system of FIGS. 2A-2C shown in an example extended position.

FIG. 3A is a perspective view of the trapeze deployment assembly 208 of FIGS. 2A-2C shown in the retracted position 244. FIG. 3B is a perspective view of the trapeze deployment assembly 208 of FIGS. 2A-2C shown in the extended position 246. The trapeze deployment assembly 208 includes a forward body or trapeze plate 302, an aft plate or aft body 304, a coupling 306 (e.g., one or more coupling bodies), and the vertical actuator 242.

The trapeze plate 302 includes a trapeze platform 308 and defines the first joint 216 and the second joint 218 opposite the first joint 216. The first joint 216 of the illustrated example includes clevis joints 310 and the second joint 218 of the illustrated example includes clevis joints 312. The trapeze plate 302 of the illustrated example is coupled to the primary structure and/or the frame 230 (FIG. 2A) of the aircraft 100 via the first joint 216 (e.g., revolute joint, pin joint, hinge joint, etc.). The first joint 216 includes the first set of pins 280 (FIG. 2D) and bearings or bushings 314. The clevis joints 310 receive the first set of pins 280 and the bushings 314. The first joint 216 defines the first pivot axis 216a oriented substantially parallel relative to the pivot axis 236. The first joint 216 is stationary or fixed relative to the frame 230 such that the first pivot axis 216a does not translate (e.g., move in a linear direction) relative to the frame 230. However, the trapeze plate 302 is rotatable relative to the frame 230 about the first pivot axis 216a. Specifically, the first set of pins 280 (e.g., and/or the bearings or bushings 314) are disposed within the first joint 216 of the trapeze plate 302 to enable rotation of the trapeze plate 302 relative to the frame 230. Additionally, the vertical actuator 242 of the illustrated example is coupled to the trapeze plate 302. For example, the vertical actuator 242 includes a housing or first cylinder 316 that houses or receives a first piston 318. The first cylinder 316 defines the first end 242a of the vertical actuator 242 that couples to the frame 230 and the first piston 318 defines the second end 242b of the vertical actuator 242 that couples to an inner or upper surface 302a of the trapeze plate 302. Specifically, the first end 242a of the vertical actuator 242 is coupled (e.g., pivotally coupled) to the frame 230 via a fitting 320 (e.g., bearing, bushing, etc.). The second end 242b of the first piston 318 is coupled to the trapeze platform 308 via a bracket 322 (e.g., a clevis bracket). As such, the vertical actuator 242 can be described as an end-mounted double-acting actuator capable of extending and retracting the piston 318. Operation of the vertical actuator 242 causes rotation of the trapeze plate 302 about the first pivot axis 216a, which in turn causes the movement (e.g., rotational and/or translational movement) of the second joint 218 relative to the frame 230. The vertical actuator 242 of the illustrated example is a hydraulic actuator. However, the vertical actuator 242 can be a pneumatic actuator, an electric actuator and/or any other actuator(s).

The trapeze plate 302 is a rigid body. Specifically, the trapeze plate 302 of the illustrated example is a solid rectangular plate having ribs 324 (or ridges) (FIG. 3B) to provide structural support to the trapeze deployment assembly 208. The ribs 324 are advantageously positioned to redistribute material to areas of the trapeze plate 302 that are most prone to high stresses and/or fatigue. As such, areas surrounding the ribs 324 can have reduced (or thinned) material to conserve weight of the trapeze deployment assembly 208. In other words, the ribs 324 enable the trapeze plate 302 to withstand high tension and torsional loading associated with an arresting event while reducing weight of the trapeze deployment assembly 208. The ribs 324 of the illustrated example include a first rib 324a and a second rib 324b extending between diagonally opposing corners of the trapeze plate 302. As shown, the first rib 324a intersects the second rib 324b adjacent or at a midpoint of the trapeze plate 302. In some examples, the trapeze plate 302 includes additional ribs extending across the trapeze plate 302 in any desired pattern.

The aft body 304 defines the third joint 220, the fourth joint 222 and a fifth joint 224. The third joint 220 pivotally couples the aft body 304 to the frame 230 of the aircraft 100 to enable rotational movement of the aft body 304 about the third pivot axis 220a. The fourth joint 222 couples to the second joint 218 via the coupling 306. The second joint 218 enables rotational movement of the trapeze plate 302 relative to the aft body 304 about the second pivot axis 218a defined by the second joint 218 and/or the fourth pivot axis 222a defined by the fourth joint 222. The fourth joint 222 enables rotational movement of the aft body 304 relative to the trapeze plate 302 about the fourth pivot axis 222a defined by the fourth joint 222 and/or the second pivot axis 218a defined by the second joint 218. The fifth joint 224 pivotally couples to the pivot assembly 212 (FIG. 2A) to pivotally couple the trapeze deployment assembly 208 and the hook deployment assembly 210 (FIGS. 2A-2C). The fifth joint 224 enables rotation about the primary pivot axis 224a.

In the illustrated example, the aft body 304 is coupled to the frame 230 (FIG. 2A) (or any other airframe) of the aircraft 100 via the third joint 220. The third joint 220 includes the second set of pins 282. The third joint 220 pivotally fixes the aft body 304 to the frame 230 such that the third joint 220 allows rotation of the aft body 304 relative to the frame 230 about the third pivot axis 220a. For example, the aft body 304 is rotatable about the third pivot axis 220a via the second set of pins 282 (e.g. and/or a combination of pins and bearings or bushings). Similar to the first joint 216, the third joint 220 does not move or translate relative to the frame 230. In the illustrated examples, the aft body 304 is a solid triangular plate or structure defining a triangular or L-shaped profile. Specifically, the aft body 304 includes a first side plate 304a (e.g., a first lateral plate) spaced from a second side plate 304b (e.g., a second lateral plate) to define a cavity 326 therebe-tween. A plate 328 couples the first side plate 304a and the second side plate 304b to form the aft body 304. At least a portion of the arresting hook system 102 nests within the cavity 326 when the arresting hook system 102 is in the stowed position 202 (FIG. 2A). The cavity 326 enables the trapeze deployment assembly 208 to fold and/or collapse (e.g., above the OML 262 (FIG. 2A)) while the cavity 326 of the aft body 304 receives at least a portion of the pivot assembly 212 (FIG. 2A) and/or at least a portion of the hook deployment assembly 210 (FIG. 2A) such that the side plates 304a and 304b flank or surround the at least the portion of the pivot assembly 212 and/or the at least the portion of the hook deployment assembly 210. As such, the arresting hook system 102 of the illustrated example occupies a reduced volume when in the stowed position 202 (FIG. 2A) based on the configuration of the cavity 326 of the aft body 304. The fourth joint 222 of the illustrated example includes clevis joints 330. The clevis joints 330 are oriented toward the clevis joints 312 of the second joint 218.

The coupling 306 pivotally couples (e.g., links) the trapeze plate 302 and the aft body 304. In the illustrated example, the trapeze plate 302 is pivotally coupled (or joined) to the coupling 306 via the second joint 218 (e.g., revolute joint, pin joint, hinge joint, etc.). The second joint 218 includes a second set of pins 332 to pivotally couple the trapeze plate 302 and a first end 306a of the coupling 306 to enable rotation about the second pivot axis 218a. The second joint 218 is not directly coupled to the frame 230 and, thus, can translate relative to the frame 230 as the trapeze plate 302 rotates about the first joint 216 (e.g., in response to actuation of the vertical actuator 242). The coupling 306 of the illustrated example include a first link 334 and a second link 336 spaced from the first link 334 in a direction along an orientation parallel to the pivot axis 236. For instance, the first link 334 has a first end (e.g., one of the first ends 306a) coupled to a first one of the clevis joints 312 of the second joint 218 via a first one of the pins 332 and the second link 336 includes a first end coupled to a second one of the clevis joints 312 via a second one of the pins 332. The pins 332 couple the first link 334 and the second link 336 to respective ones of the clevis joints 312 to enable rotation of the coupling 306 relative to the trapeze plate 302 about the second pivot axis 218a. However, in some examples, the coupling 306 can be a unitary body.

The aft body 304 is coupled to the coupling 306 via the fourth joint 222 (e.g., revolute joint, pin joint, hinge joint, etc.). The fourth joint 222 includes a fourth set of pins 338 to pivotally couple the aft body 304 and the second end 306b of the coupling 306 to enable rotation about the fourth pivot axis 222a. The fourth joint 222 is not directly coupled to the frame 230 and, thus, can translate relative to the frame 230 as the aft body 304 rotates about the third joint 220 (e.g., in response to actuation of the vertical actuator 242). For instance, the first link 334 has a second end coupled to a first one of the clevis joints 330 of the fourth joint 222 via a first one of the fourth set of pins 338 and the second link 336 includes a second end coupled to a second one of the clevis joints 330 via a second one of the fourth set of pins 338. The pins 338 couple the first link 334 and the second link 336 to respective ones of the clevis joints 330 to enable rotation of the coupling 306 relative to the aft body 304 about the fourth pivot axis 222a. The aft body 304 pivotally couples the hook deployment assembly 210 and the trapeze deployment assembly 208 via the pivot assembly 212 (FIGS. 2A-2D). Specifically, the pivot assembly 212 couples to the fifth joint 224 of the aft body 304. The fifth joint 224 enables rotation of the hook deployment assembly 210 about the fifth pivot axis 224*a*. The fifth joint 224 of the illustrated example is not fixed to the frame 230 and, thus, moves or translates relative to the frame 230 when the arresting hook system 102 moves between the stowed position 202 (FIG. 2A) and the deployed position 204 (FIG. 2B). The aft body 304 of the illustrated example includes apertures that receive bearings for defining the fifth joint 224 and the fifth pivot axis 224*a*.

Figure 4:
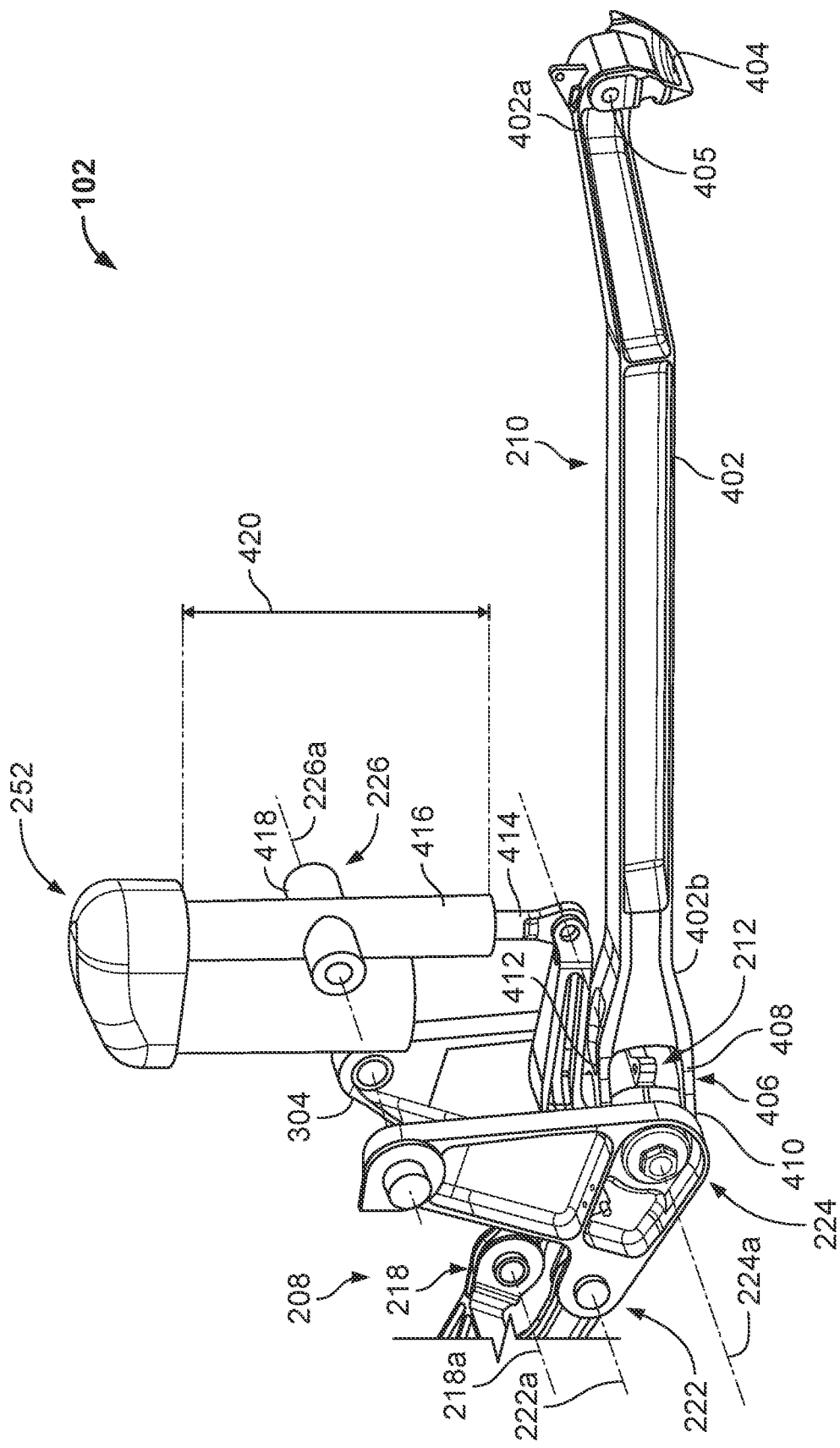
FIG. 4 is a perspective view of an example hook deployment assembly of the example arrestment hook system of FIGS. 2A-2C.

FIG. 4 is a perspective view of the example hook deployment assembly 210 of the arrestment hook system 102 of FIGS. 2A-2C. The hook deployment assembly 210 of the illustrated example includes a hook shank 402, a hook 404 and the VDA 252. The hook shank 402 of the illustrated example is an elongated body (e.g., a beam) positioned in an orientation perpendicular to the primary pivot axis 224*a*. The hook shank 402 of the illustrated example includes a first end 402*a* and a second end 402*b* opposite the first end 402*a*. The first end 402*a* of the hook shank 402 supports the hook 404. For example, the hook 404 of the illustrated example is removably coupled to the first end 402*a* via fasteners 405. However, in some examples, the hook 404 is integrally formed with, or permanently fixed (e.g., via welding) to, the hook shank 402 as a unitary structure. The hook 404 of the illustrated example does not move (e.g., rotate or translate) relative to the hook shank 402. The second end 402*b* includes a connector 406 to couple to the pivot assembly 212. The connector 406 of the illustrated example is a hook shank clevis 408 (e.g., or a C-shaped connector). The connector 406 and/or the hook shank clevis 408 of the illustrated example includes a first plate 410 spaced from a second plate 412 to define a cavity 408*a* between the first plate 410 and the second plate 412 to receive the pivot assembly 212. The connector 406 (e.g., the hook shank clevis 408) couples to the pivot assembly 212, which pivotally couples the hook shank 402 and the aft body 304 of the trapeze deployment assembly 208. The pivot assembly 212 enables vertical pivotal movement of the hook shank 402 relative to the aft body 304 and/or the frame 230 (FIG. 2A) about the primary pivot axis 224*a* defined by the fifth joint 224.

The VDA 252 of the illustrated example is pivotally coupled to the frame 230. For example, the VDA 252 of the illustrated example is pivotally coupled to the frame 230 via the sixth joint 226 to enable rotation of the VDA 252 relative to the frame 230 about the sixth pivot axis 226*a*. The VDA 252 of the illustrated example includes a second piston 414 slidably disposed within a housing or second cylinder 416. Specifically, the second cylinder 416 of the VDA 252 of the illustrated example is pivotally coupled to the frame 230.

To pivotally couple the VDA 252 and the frame 230 about the sixth joint 226, the VDA 252 includes a trunnion 418 protruding from opposing sides of the second cylinder 416. In some examples, the trunnion 418 fits within and/or is coupled to the frame 230 via a bushing or bearing such that the VDA 252 rotates about the sixth pivot axis 226*a*. In the illustrated example, the second cylinder 416 has a length 420. The trunnion 418 of the illustrated example is positioned approximately at or adjacent to a midpoint of the length 420. In some examples, approximately at a midpoint means that the trunnion 418 is located near or exactly at the midpoint (e.g., precisely or within 10 percent of half of the length 420). In some examples, approximately adjacent to the midpoint means that the trunnion 418 can be located closer to the midpoint of the length 420 than respective ends of the second cylinder 416. However, in some examples, the trunnion 418 can be positioned at any point along the length 420, including ones of the respective ends of the second cylinder 416. Thus, positions of the axes 220*a*, 224*a*, 226*a*, 228*a* can be adjusted based on the position of the trunnion 418 along the length 420. The axes 218*a*, 222*a*, 224*a*, 226*a* define the second linkage assembly 250 (e.g., second bar linkage, damping four-bar linkage, etc.) and the positioning of the hook 404 as the aft body 304 rotates. Furthermore, the positions of the axes 218*a*, 222*a*, 224*a*, 226*a* affect the motion profile of the arresting hook system 102 during deployment and the arrestment kinematic arrangement of the arresting hook system 102 during engagement with the arresting cable. In other words, the deployed position of the hook 404 and the performance of the arresting hook system 102 are based on the position of the trunnion 418 (e.g., along a longitudinal direction of the cylinder 416). As such, the position of the trunnion 418 along the length 420 can be determined based on desired deployed position(s) and desired performance of the arresting hook system 102. Conventional arresting hook systems with non-trunnion mounted dampers have limited hook positions and damping kinematics relative to teachings disclosed herein.

The second piston 414 is operatively coupled to the hook shank 402 via the pivot assembly 212. Thus, the second cylinder 416 is pivotally coupled to the frame 230 via the sixth joint 226 and the second piston 414 is coupled to the pivot assembly 212. Operation of the VDA 252 enables movement of the hook shank 402 and/or the hook 404 between the non-engagement position 254 (FIG. 2A) and the arrestment position 256 (FIG. 2B) (e.g., in response to the arresting hook system 102 moving between the stowed position 202 and the deployed position 204). In some examples, the VDA 252 is a damper actuator. For example, the damper actuator can be similar to a damper actuator of landing gear, landing strut, oleo strut, or the like. Thus, the VDA 252 can use fluid (e.g., oil, etc.) for velocity dependent resistance (i.e., damping). Furthermore, the VDA 252 can use gas (e.g., air, nitrogen, etc.) for position dependent resistance (i.e., actuation).

Figure 5A:
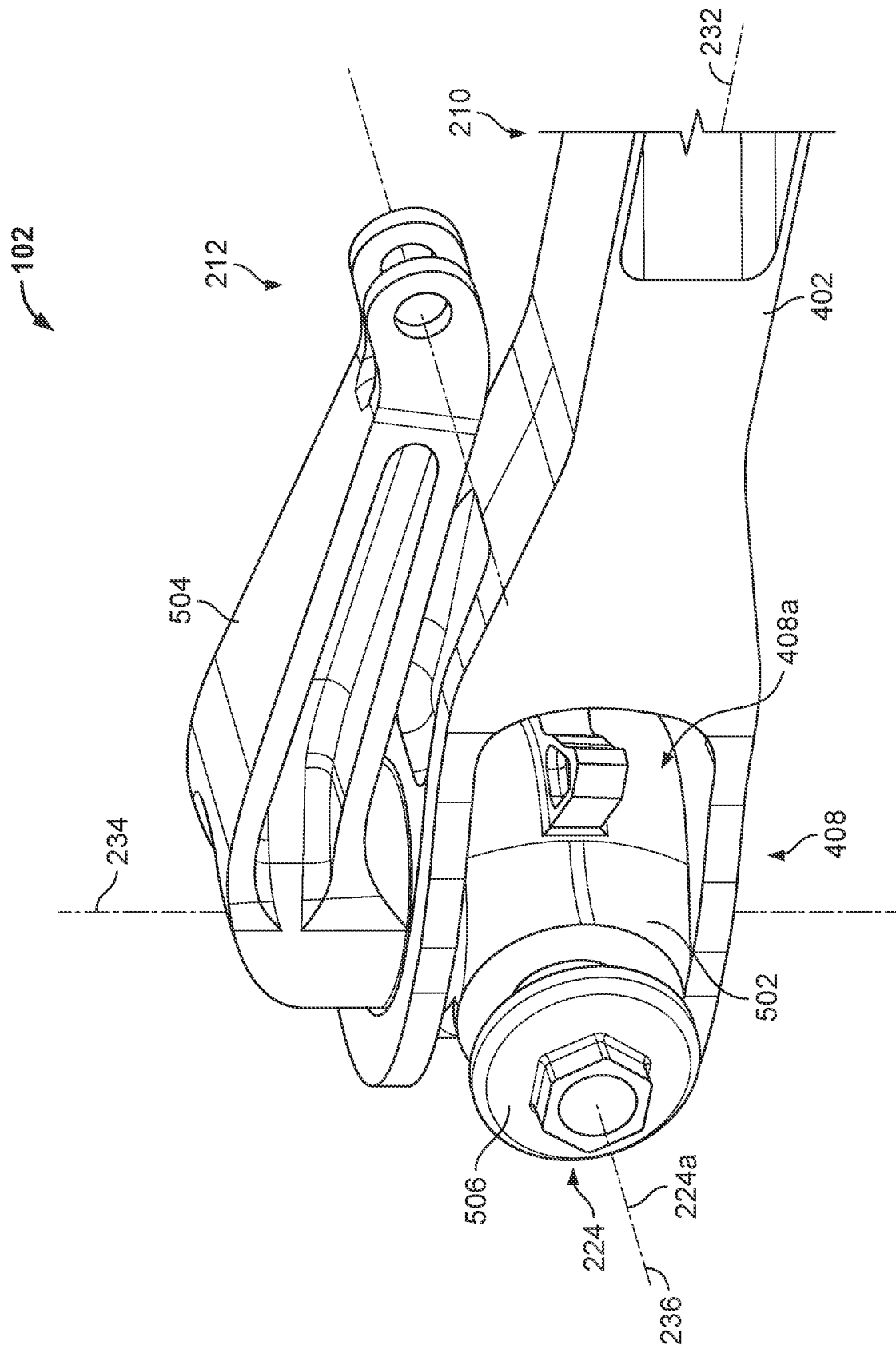
FIG. 5A is a perspective view of an example pivot assembly of the example arresting hook system of FIGS. 2A-2C.

FIG. 5A is a perspective view of the example pivot assembly 212 of the arresting hook system 102 of FIGS. 2A-2C. The pivot assembly 212 of the illustrated example includes a coupler 502, a linkage arm 504 and a pin 506. Specifically, the hook shank clevis 408 is configured to receive the pivot assembly 212. Specifically, a cavity 408*a* of the hook shank clevis 408 is structured to receive the coupler 502 and the linkage arm 504 extends from the hook shank clevis 408 and/or the coupler 502. As described in greater detail below, the pivot assembly 212 restricts or inhibits translational movement of the hook 404 and/or the hook shank 402 in a lateral direction along the primary pivot axis 224*a* and/or rotational movement of the hook 404 and/or the hook shank 402 about the vertical axis 234. Specifically, the coupler 502 couples to the hook shank 402 and the trapeze deployment assembly 208 (FIG. 2A). The linkage arm 504 operatively couples the VDA 252 (FIG. 4) and the hook deployment assembly 210. The coupler 502 and the pin 506 define the fifth joint 224 when the coupler 502 and the pin 506 couple to the aft body 304 via the apertures 340 and the bearings 342 (FIG. 3B).

Figure 5C:
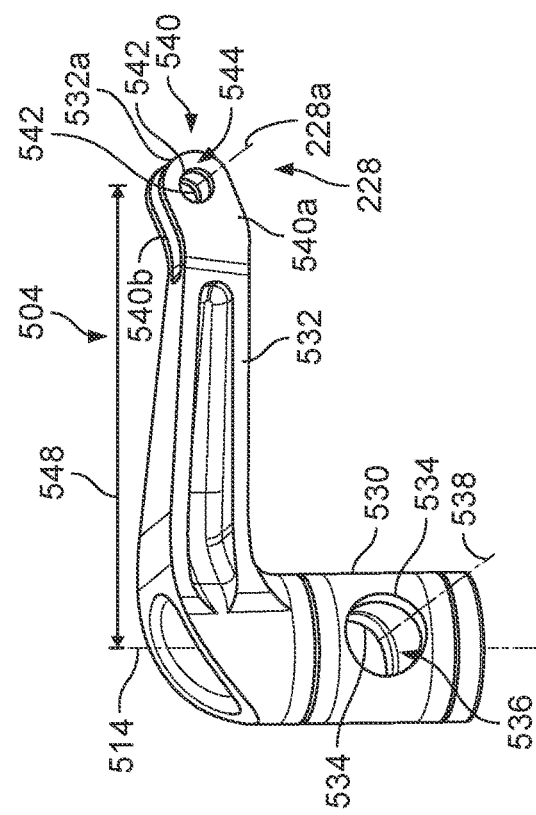
FIG. 5C is a perspective, side view of an example linkage arm of the example pivot assembly of FIG. 5A.
Figure 5D:
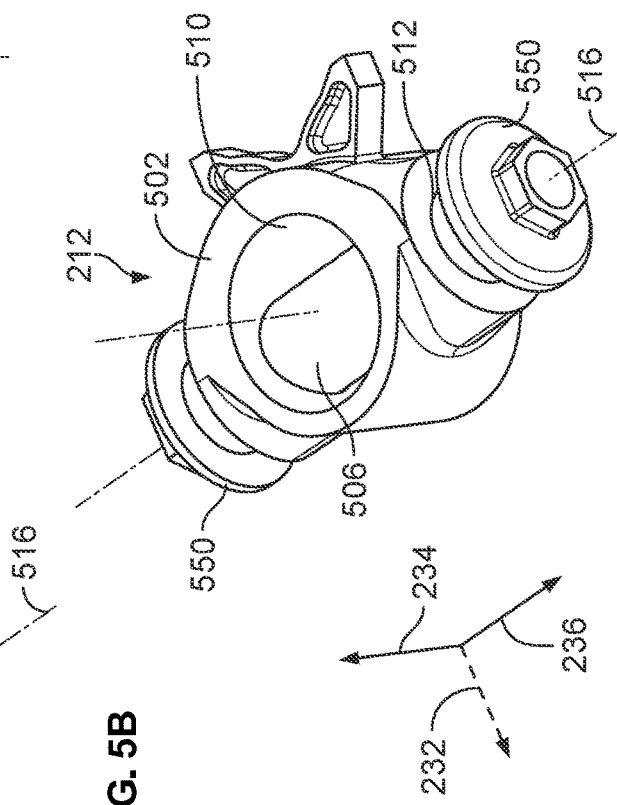
FIG. 5D is a perspective view of the example coupler and an example pin of the example pivot assembly of FIG. 5A.
Figure 5B:
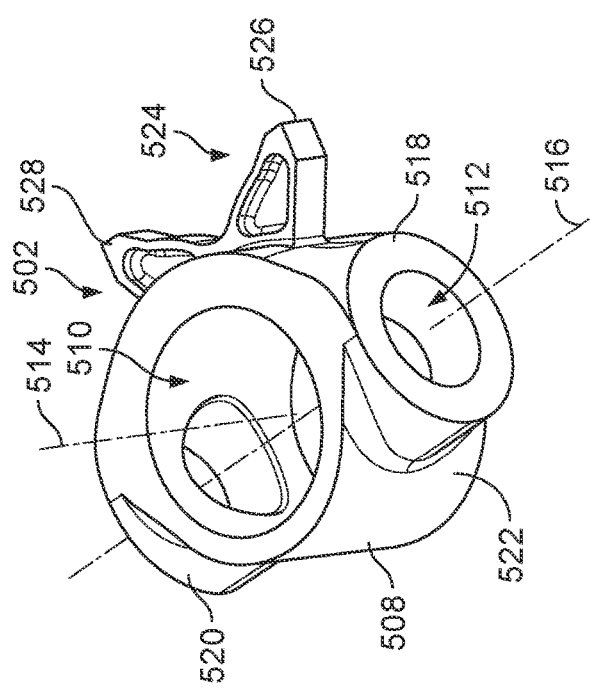
FIG. 5B is a perspective view of an example coupler of the example pivot assembly of FIG. 5A.

FIG. 5B is a perspective view of the coupler 502 of FIG. 5A. The coupler 502 of the illustrated example has a body 508 (e.g., a cylindrical body). The body 508 of the illustrated example includes a first opening 510 (e.g., a vertical opening or through hole) and a second opening 512 (e.g., a horizontal or transverse bore). The first opening 510 is transverse relative to the second opening 512. Specifically, the first opening 510 defines a first axis 514 and the second opening 512 defines a second axis 516. The first axis 514 is transverse relative to the second axis 516. In the illustrated example, the first axis 514 intersects the second axis 516. Specifically, the first axis 514 is non-parallel relative to the second axis 516. In the illustrated example, the first axis 514 is substantially perpendicular relative to the second axis 516. In some examples, substantially perpendicular means perfectly perpendicular (e.g., the first axis 514 and the second axis 516 have a 90 degree relationship) or the first axis 514 is within 10 degrees of perfectly perpendicular relative to the second axis 516.

In some examples, the first axis 514 corresponds to the vertical axis 234 and the second axis 516 corresponds to the primary pivot axis 224a. In other examples, the first opening 510 extends in a direction parallel to the lateral axis 234a and the second opening 512 extends in a direction parallel to the primary pivot axis 224a. In other words, the first axis 514 is parallel to the lateral axis 234a (e.g., a vertical axis in the orientation of FIG. 5B) and the second axis 516 is parallel relative to the primary pivot axis 224a and/or the pivot axis 236 (e.g., a lateral axis in the orientation of FIG. 5B). The first opening 510 has a first dimension (e.g., a first diameter) and the second opening 512 has a second dimension (e.g., a second diameter). In the illustrated example, the first dimension is greater than the second dimension. However, in some examples, the first dimension is equal to or smaller than the second dimension.

The body 508 includes a first boss 518 and a second boss 520 opposite the first boss 518. The first boss 518 and the second boss 520 extend from an outer surface 522 of the body 508 in opposite directions along the second axis 516. The coupler 502 includes a cam 524 that protrudes from the outer surface 522. Specifically, the cam 524 extends from the outer surface 522 along the longitudinal axis 232a (FIG. 2D) in a direction (e.g., a longitudinal direction) rearward of the coupler 502 and/or the aircraft 100 when the coupler 502 is coupled to the aircraft 100. The cam 524 includes a first arm 526 and a second arm 528. In the illustrated example, the cam 524 is a lateral damping cam to engage with a lateral damper inside of the hook shank 402 (FIG. 4), as described further below in connection with FIG. 5E.

FIG. 5C is a perspective, side view of the linkage arm 504 of FIGS. 2A-2C and 5A. The linkage arm 504 of the illustrated example includes a shaft 530 and an arm 532 extending from the shaft 530. For example, the linkage arm 504 has an L-shaped profile. The shaft 530 includes apertures 534 defining a third opening 536 (e.g., a through hole or transverse bore) having a third axis 538. The third axis 538 of the illustrated example is parallel relative to the second axis 516. In the illustrated example, the second opening 512 of the coupler 502 and the third opening 536 of the linkage arm 504 coaxially align when the linkage arm 504 is coupled to the coupler 502. The arm 532 extends from the shaft 530 in a rearward direction or in a direction along the longitudinal axis 232a (FIG. 2D) toward the hook 404 (FIG. 4). An end 532a of the arm 532 opposite the shaft 530 receives the second piston 414 and provides the seventh joint 228. Specifically, the end 532a of the arm 532 includes a connector 540 to couple to or receive the second piston 414 of the VDA 252. Specifically, the connector 540 of the illustrated example is a clevis connector (e.g., a link arm clevis). However, in other examples, the connector 540 can be a plate, a slot, and/or any other connector 540 to couple to a rod end of the second piston 414. The connector 540 of the illustrated example includes lateral plates 540a and 540b having apertures 542 defining a fourth opening 544 defining the seventh pivot axis 228a. The seventh pivot axis 228a enables pivotal rotation between the second piston 414 of the VDA 252 and the arm 532 of the pivot assembly 212.

The seventh pivot axis 228a is spaced from the first axis 514 a distance 548 in the orientation of the longitudinal axis 232a (FIG. 2D). The distance 548 is based on a length of the arm 532. For example, the distance 548 is substantially equal to the length of the arm 532. The shaft 530 of the illustrated example has a shaft diameter. The shaft diameter of the illustrated example is less than the first diameter of the first opening 510 of the coupler 502.

FIG. 5D is a perspective view of the coupler 502 and the pin 506 of the pivot assembly 212 of FIGS. 2A-2C and 5A. The linkage arm 504 is not shown in FIG. 5D for clarity. FIG. 5E is a perspective, cutaway view of the pivot assembly 212 of FIGS. 2A-2C and 5A. FIG. 5F is a cross-sectional view of the pivot assembly 212 of FIGS. 2A-2C and 5A taken along the pivot axis 236. As noted above, the hook shank 402 includes a cavity 549 within the second end 402b. In the illustrated example, a lateral damper 550 is disposed in the cavity 549. The cam 524 engages the lateral damper 550 to oppose lateral displacement and dynamic motion of the hook shank 402. Thus, the lateral damper 550 can provide a centering force to the hook shank 402 via the cam 524 and the pivot assembly 212.

The pin 506 of the illustrated example couples or fixes the coupler 502 and the linkage arm 504. Specifically, the shaft 530 of the linkage arm 504 is positioned in the first opening 510 of the coupler 502 such that the second opening 512 of the coupler 502 aligns (e.g., coaxially aligns) with the third opening 536 of the shaft 530 of the linkage arm 504. To couple the coupler 502 and the linkage arm 504, the pin 506 extends through the second opening 512 of the coupler 502 and the third opening 536 of the linkage arm 504. The pin 506 of the illustrated example is a cylindrical body having fasteners 551 (e.g., bolts or retainers) at respective ends of the pin 506 to clamp or engage the respective side plates 304a and 304b of the aft body 304 (see FIG. 3A). The fasteners 551 engage respective outer surfaces of the aft body 304. When the pivot assembly 212 is assembled, the pin 506 retains and/or couples the coupler 502 and the linkage arm 504 with the hook shank 402 to inhibit and/or restrict lateral and/or rotational movement between the hook shank 402 and the pivot assembly 212 about the longitudinal axis 232, the vertical axis 234 and/or the primary pivot axis 224a. Additionally, the pin 506, the second opening 512 of the coupler 502 and the third opening 536 of the linkage arm 504 define the primary pivot axis 224a (FIG. 2A). The VDA 252 couples to the pivot assembly 212 via the seventh joint 228.

Thus, the pivot assembly 212 is structured to cause the primary pivot axis 224a (e.g., an axis in the pivot axis 236 orientation) of the trapeze deployment assembly 208 to intersect a vertical axis 552 of the linkage arm 504 (e.g., an axis in the vertical axis 234 orientation) of the hook deployment assembly 210 when the pivot assembly 212 pivotally couples the trapeze deployment assembly 208 and the hook deployment assembly 210. As a result, the intersection of the primary pivot axis 224a and the vertical axis 552 is to at least one of reduce or eliminate a lateral bending moment into the trapeze deployment assembly 208, thereby enabling use of a smaller trapeze deployment assembly 208 and reduce aircraft weight to improve efficiency and/or reduce costs.

Figure 6A:
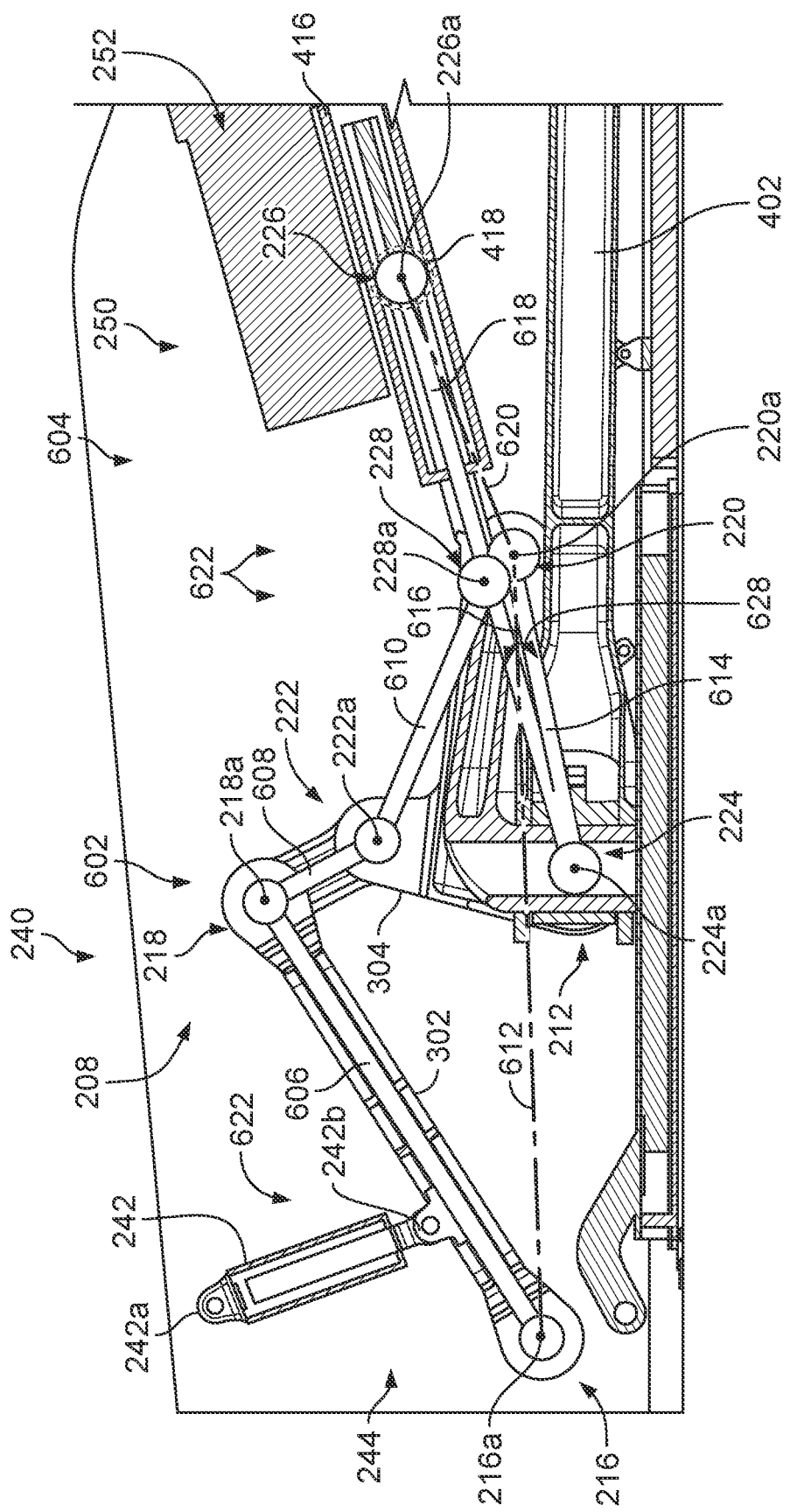
FIG. 6A is a partial side view of the example arresting hook system of FIGS. 2A-2C shown in the example stowed position.
Figure 6B:
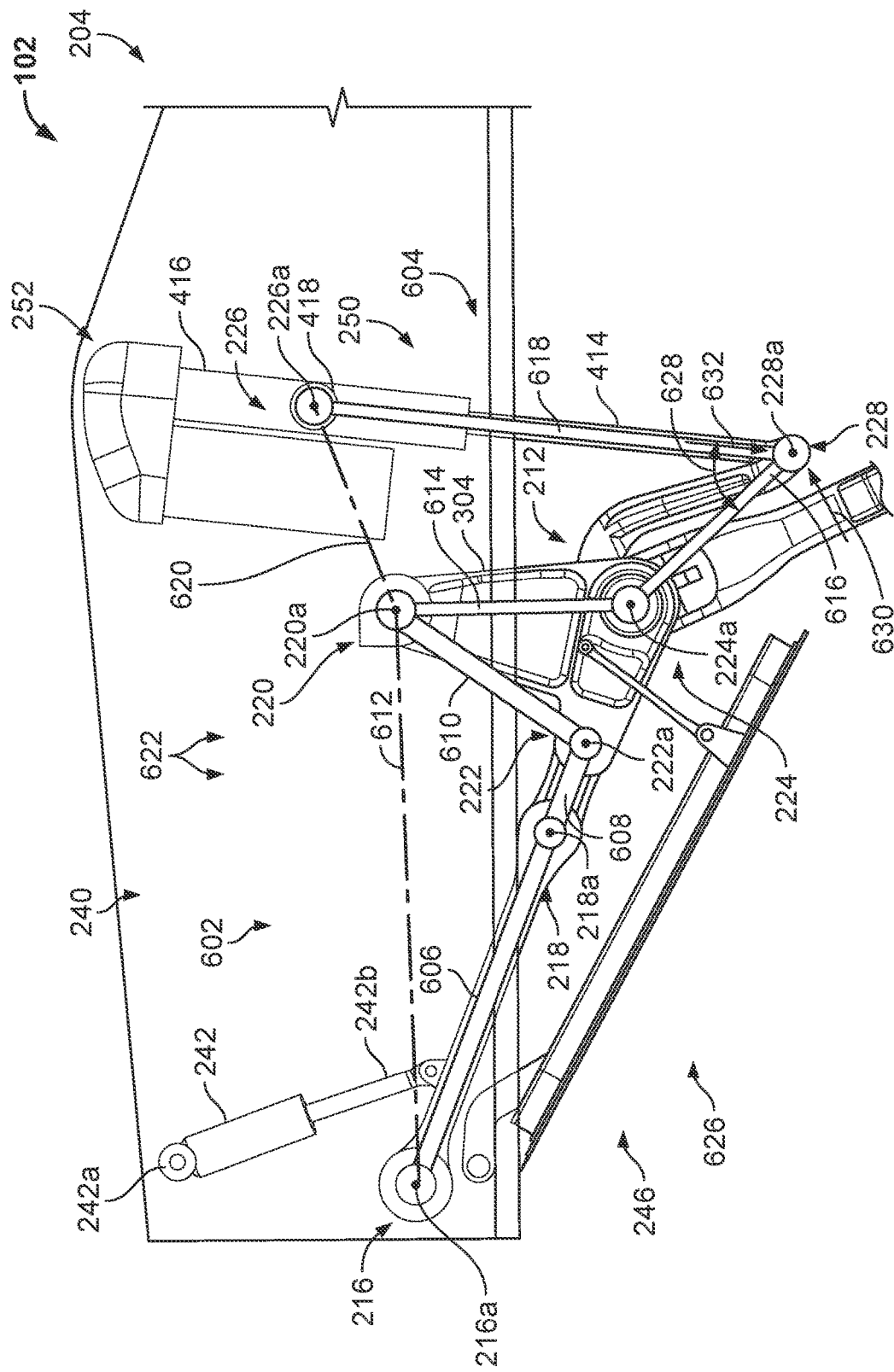
FIG. 6B is a partial side view of the example arresting hook system of FIGS. 2A-2C shown in the example deployed position.

FIG. 6A is a partial side view of the example arresting hook system 102 of FIGS. 2A-2C shown in the stowed position 202. FIG. 6B is a partial side view of the example arresting hook system 102 of FIGS. 2A-2C shown in the deployed position 204. FIG. 6C is a partial side view of the example arresting hook system 102 of FIGS. 2A-2C shown in the inspection position 206. Referring to FIGS. 6A-6C, the first linkage assembly 240 of the illustrated example defines a first bar linkage 602 and the second linkage assembly 250 of the illustrated example defines a second bar linkage 604, schematically shown in FIGS. 6A-6C by solid and dashed lines. The first bar linkage 602 is operatively coupled to the second bar linkage 604.

The first bar linkage 602 of the illustrated example includes a first forward link 606, a first coupler link 608, a first aft link 610, and a first ground link 612. The first forward link 606 is between the first joint 216 and the second joint 218 of the trapeze platform 308. The first coupler link 608 of the illustrated example is between the second joint 218 of the trapeze platform 308 and the fourth joint 222 of the aft body 304. The first aft link 610 of the illustrated example is between the fourth joint 222 of the aft body 304 and the fifth joint 224 of the aft body 304. The first ground link 612 (dashed line) of the illustrated example is between the third joint 220 of the aft body 304 and the first joint 216 of the trapeze platform 308. More specifically, the first forward link 606 extends between the first pivot axis 216*a* and the second pivot axis 218*a*. The first coupler link 608 extends between the second pivot axis 218*a* and the fourth pivot axis 222*a*. The first aft link 610 extends between the fourth pivot axis 222*a* and the third pivot axis 220*a*. In some examples, the first forward link 606 can be referred to as a driving link of the trapeze deployment assembly 208 because the actuation of the vertical actuator 242 and the rotation of the first forward link 606 causes actuation of other links of the first bar linkage 602.

The second bar linkage 604 of the illustrated example includes a second forward link 614, a second coupler link 616, a second aft link 618, a second ground link 620. The second forward link 614 of the illustrated example is between the third joint 220 and the fifth joint 224 of the aft body 304. The second coupler link 616 of the illustrated example is between the fifth joint 224 and the seventh joint 228 of the linkage arm 504. In some examples, the second forward link 614 can be referred to as the driving link of the second bar linkage 604. The second aft link 618 of the illustrated example is between the seventh joint 228 and the sixth joint 226 of the second cylinder 416 of the VDA 252 (e.g., a pivot joint of the VDA 252). Thus, VDA 252 (e.g., the second cylinder 416 and the second piston 414) defines the second aft link 618. The second ground link 620 (dashed lines) of the illustrated example is between the third joint 220 of the aft body 304 and the sixth joint 226 of the second cylinder 416. More specifically, the second forward link 614 of the illustrated example is between the third pivot axis 220*a* and the primary pivot axis 224*a*. The second coupler link 616 of the illustrated example is between the primary pivot axis 224*a* and the seventh pivot axis 228*a*. The second aft link 618 of the illustrated example is between the seventh pivot axis 228*a* and the sixth pivot axis 226*a*. The second ground link 620 of the illustrated example is between the sixth pivot axis 226*a* and the third pivot axis 220*a*.

It should be appreciated that a length of the second aft link 618 can be adjusted based on a position of the second piston 414 within the second cylinder 416. Thus, as described further below, the damping kinematics of the second bar linkage 604 can change based on the length of the second aft link 618. In some examples, the second bar linkage 604 of FIG. 6B can be considered to be a different linkage than the second bar linkage 604 of FIG. 6C because of the different lengths of the second aft link 618. However, the second aft link 618 of FIG. 6B includes the same components (e.g., the second piston 414, the second cylinder 416, etc.) as the second aft link of FIG. 6C.

Because of the triangular configuration and rigid structure of the aft body 304, the first aft link 610 and the second forward link 614 are fixed together at the third joint 220. That is, the first aft link 610 and the second forward link 614 are rotatably interlocked with the aft body 304. Thus, as the aft body 304 rotates about the third pivot axis 220*a*, the first aft link 610 and the second forward link 614 also rotate about the third pivot axis 220*a*. Additionally, the third joint 220 is fixed to the fourth joint 222 and the fifth joint 224. Thus, rotation of the aft body 304 about the third pivot axis 220*a* causes movement (rotational and/or translational movement) of the fourth joint 222 and the fifth joint 224. In other words, the first aft link 610 and the second forward link 614 are rotatably interlocked via the aft body 304.

The combination of the first bar linkage 602 and the second bar linkage 604 can referred to herein as a linkage assembly 622 having a seven-bar or eight-bar linkage assembly. In the arresting hook system 102 disclosed herein, the linkage assembly 622 is achievable based on the trunnion-mounted manner in which the VDA 252 is coupled the frame 230. Because the first aft link 610 and the second forward link 614 are both defined by the aft body 304, the first aft link 610 and the second forward link 614 can be considered shared or coordinated links that are rotatably interlocked (e.g., rotate simultaneously about the third joint 220) and can be considered a single link of a seven-bar linkage assembly.

In the illustrated example, a physical body or link is not included to define the first ground link 612 and/or the second ground link 620. Rather, it should be appreciated that because the first joint 216 and the third joint 220 are fixed or coupled to the frame 230 of the aircraft 100, the first ground link 612 is formed therebetween. Likewise, it should be appreciated that because the third joint 220 and the sixth joint 226 are fixed or coupled to the frame 230 of the aircraft 100, the second ground link 620 is formed therebetween. In some examples, the linkage assembly 622 includes a physical ground bar or link for the first ground link 612 and/or the second ground link 620.

Referring to FIG. 6A, when the arresting hook system 102 is in the stowed position 202, the trapeze deployment assembly 208 provides a compact configuration or envelope. The arresting hook system 102 is capable of achieving this compact configuration due to the linkage assembly 622. For instance, the compact configuration can be provided because the trapeze deployment assembly 208 folds into the cavity 326 (FIG. 3B) of the aft body 304, which receives the pivot assembly 212. For example, the pivot assembly 212 and/or portions of the hook shank 402 (e.g., the hook shank clevis 408) nest within the cavity 326 of the aft body 304 when the arresting hook system 102 is in the stowed position 202. Additionally, the VDA 252 rotates about the sixth pivot axis 226*a* to an initial rotatable position or stored position 624. In the stored position 624, the second coupler link 616 substantially aligns (e.g., is substantially parallel) with the second aft link 618. Additionally, the third joint 220 is further aft of the seventh joint 228 and the fifth joint 224. For instance, the third joint 220 is positioned between the seventh joint 228 and the sixth joint 226. Also, the seventh joint 228 is positioned between the third joint 220 and the fifth joint 224. In the stowed position 202, the arresting hook system 102 is entirely within or above the OML 262 (e.g., within the fuselage 104).

Referring to FIG. 6B, the trapeze deployment assembly 208 is in an "over-center" position 626 when the arresting hook system 102 is in the deployed position 204 (e.g., the first actuator 218 has fully actuated, when the trapeze deployment assembly 208 is in the extended position 246). As used herein, the over-center position 626 refers to a position of the trapeze deployment assembly 208 when the trapeze plate 302 is aligned (e.g., colinear) with the coupling 306. In other words, the over-center position 626 refers to a position of the trapeze deployment assembly 208 when the first forward link 606 is colinear or substantially parallel with the first coupler link 608. The over-center position 626 allows the trapeze plate 302 (e.g., the first forward link 606), the coupling 306 (e.g., the first coupler link 608), the aft body 304, and the first ground link 612 to function as a triangular structural arrangement. Such a triangular arrangement includes a first side defined between the first pivot axis 216a and the primary pivot axis 224a, a second side defined between the primary pivot axis 224a and the third pivot axis 220a, and a third side defined between the third pivot axis 220a and the first pivot axis 216a. As such, when in the over-center position 626, the trapeze deployment assembly 208 is capable of carrying and/or transmitting loads (e.g., tensile, compressive, bending, etc.) from the hook shank 402 to the frame 230 (or another primary structure) of the aircraft 100.

Additionally, in known arresting hook systems, the pivot assembly (e.g., Y-frame structure, stringer style, etc.) and/or the hook shank can rotate downward for deployment without any trapezing, unfolding, translating, and/or extending motions during deployment. By contrast, the trapeze deployment assembly 208 of the arresting hook system 102 of the illustrated example rotates downward and unfolds and/or extends in a rearward direction (e.g., toward the aft of the aircraft 100 along the roll axis 132 of FIG. 2A and/or the longitudinal axis 232a of FIG. 2D). It should be appreciated that the performance of the arresting hook system 102 is at least partially based on how far in the rearward direction the hook 404 is located when the arresting hook system 102 is in the deployed position 204. The cable capture rate (e.g., likelihood of successful arrestment) of the aircraft 100 is affected by the rearward distance of the hook 404 relative to the rear landing gear 110. Thus, the performance of the arresting hook system 102 improves the farther aft the hook 404 moves during deployment.

As the trapeze deployment assembly 208 of the illustrated example moves to the extended position 246 (e.g., lowers), the hook shank 402 and the pivot assembly 212 move aft (e.g., in the rearward direction) during deployment due to the configuration of the trapeze deployment assembly 208. As such, the hook 404 of the illustrated example, when in a stowed or the non-engagement position 254, is forward (e.g., in the roll axis 132 orientation) when compared to a stowed position (or non-engagement position) of a hook of known arresting hook systems. Additionally, the hook 404 of the illustrated example, when in the deployed or arrestment position 256, is located aft (e.g., in the roll axis 132 orientation) when compared to a deployed or arresting position of a hook of known arresting hook systems. Thus, the trapeze deployment assembly 208 enables the arresting hook system 102 of the illustrated example to have an increased longitudinal distance (e.g., in the roll axis 132 orientation) between the stowed position 202 of the hook 404 and the deployed position 204 of the hook 404, which improves the performance (e.g., cable capture rate) of the arresting hook system 102 and conserves space for other onboard systems or sub-systems.

When the hook 404 of the illustrated example is in the arrestment position 256 (FIG. 2B) and engages an arresting cable during landing, tensile loading on the hook shank 402 transfers to the trapeze deployment assembly 208 via the pivot assembly 212, and a magnitude of the tensile loading acts aft and away from the trapeze deployment assembly 208. Due to the over-center position 626 the trapeze plate 302 and the coupling 306, the trapeze deployment assembly 208 can efficiently transfer loading to the frame 230. Additionally, the angle of the applied arrestment load is substantially parallel (e.g., within +/−15 degrees) to the on-center alignment of the trapeze plate 302 (e.g., the first forward link 606) and the coupling 306 (e.g., the first coupler link 608). Thus, a first portion of the arrestment load is applied to the trapeze plate 302 and the coupling 306, and a second portion of the arrestment load is applied to the aft body 304. In some examples, the first portion can be greater than the second portion. The aft body 304 provides a stabilizing force to react loads on the hook shank 402 that are non-parallel to the trapeze plate 302 and the coupling 306 (e.g., the on-center alignment). Furthermore, the aft body 304 provides a shear reaction against a reaction force 632 (e.g., damping force) of the VDA 252. However, known arresting hook systems with a trapezing interface include the VDA coupled directly to (e.g., riding on) a trapeze such that the trapeze bears some of the compressive loading, which may be unfavorable from a performance and/or structural standpoint.

Mounting the VDA 252 via the trunnion 418 is advantageous over known manners for mounting the hook shank damper actuator, which typically include mounting an end of a cylinder (e.g., the second cylinder 416) to the frame 230 via a bushing similar to the vertical actuator 242. The VDA 252 of the illustrated example is mounted via the trunnion 418 to support the cylinder 416 from buckling due to arrestment loads (e.g., compressive loads, etc.). Thus, the VDA 252 can support higher loads based on the trunnion 418 and position of the VDA pivot axis 226a. Additionally, the VDA 252 of the illustrated example provides a strut for the hook shank 402 via the connection between the second piston 414 and the linkage arm 504 of the pivot assembly 212 (e.g., the seventh joint 228) as the hook 404 (FIG. 4) touches a ground landing surface and engages the arresting cable (or pendant). Thus, the VDA 252 counteracts vertical forces to restrict or inhibit the hook 404 from bouncing off of a ground landing surface and over the arresting cable. Furthermore, the VDA 252 reacts the inertia of the hook shank 402 associated with the rapid pivot of the hook shank 402 due to the engagement. As such, the VDA 252 inhibits or prevents "up-strike" of the hook shank 402 against (e.g., into) the fuselage 104 (FIG. 1). In some examples, the VDA 252 rotates about the sixth pivot axis 226a toward aft body 304 when the hook shank 402 rotates rearward (e.g., toward the aft of the aircraft 100).

The trunnion 418 of the VDA 252 enables the second bar linkage 604 to support (e.g., react vertical arrestment loads) the hook shank 402. For example, mounting the VDA 252 to the frame 230 via the trunnion 418 enables more effective transmission angles that result in favorable damping kinematics. As used herein, a "transmission angle" is a transmission angle 628 between the second aft link 618 and the second coupler link 616. When the arresting loads are applied to the hook shank 402, an arresting load 630 is applied to the second coupler link 616 at the seventh joint 228. The second aft link 618 counteracts this arresting load with the reaction force 632 acting along the second aft link 618 toward the seventh joint 228. Thus, the second aft link 618 and the second coupler link 616 define the transmission angle 628 of the second bar linkage 604. In known arresting hook systems, the damper actuator(s) (e.g., the VDA 252) is mounted on and/or coupled to a trapeze deployment assembly. Although such a configuration can eliminate coordination between trapeze actuation and hook shank actuation, it can also require a significant stroke length (e.g., or piston length) to fully deploy a hook shank, which increases the size and/or weight of an arresting hook system.

It should be appreciated that the moment force imparted to the hook deployment assembly 210 is increased (e.g., maximized) when the transmission angle 628 is at approximately ninety degrees. Furthermore, a damping force the VDA 252 can output is based on the air spring pre-charge and the tuning of an internal relief valve. The amount of rotational energy the arresting hook system 102 is able to remove (i.e., damping kinematics) is based on the damping force, the transmission angle 628 at full extension, and the transmission angle 628 at full up-swing. As such, the damping kinematics of the arresting hook system 102 are adjustable based on the location of the trunnion 418 and the value of the resulting transmission angle 628. In the illustrated examples, as the hook shank 402 rotates upward during arrestment, the transmission angle 628 progressively increases. In some examples, the transmission angle 628 is ninety degrees after the hook shank 404 has reached the midpoint of upward rotation/travel. Thus, the arresting hook system 102 provides improved damping kinematics along the majority of the upward rotation of the hook shank 402 during arrestment. In some examples, the transmission angle 628 is approximately 45 degrees when the arresting hook system 102 is in the deployed position 204. In some examples, the transmission angle 628 is approximately 120 degrees when the arresting hook system 102 is in the inspection position 206.

Because known arresting hook systems couple a hook shank damper actuator (e.g., the VDA 252) directly to a trapezing structure, a transmission angle formed between the actuator and the hook shank at the end of the piston stroke is relatively small (e.g., approximately between 10 degrees and 30 degrees). In some other known systems, a piston stroke length of the hook shank damper actuator is significantly increased to make up for the penalty of the small transmission angle, which can increase the complexity, height, volume, weight, and/or up-strike potential of the arresting hook system. Furthermore, the small transmission angle of known systems at an end of stroke length position can cause greater pressures in the hook shank damper actuator due to a high hold-down force coupled with a poor moment arm at end of stroke.

In contrast to known systems, the transmission angle 628 of the arresting hook system 102 has more favorable damping kinematics. As such, the arresting hook system 102 can better maintain the arrestment position 256 (e.g., a "hook down" position) when the hook 404 touches the ground, which significantly increases performance characteristic(s) (e.g., a cable capture rate) of the arresting hook system 102. Furthermore, the increased transmission angle 628 enables smaller stroke length of the second piston 414 and improves efficiency of the VDA 252 by increasing an amount of energy absorbed, reducing (e.g., minimize) up-swing occurrence, reducing pressure spikes, and/or preventing or reducing up-strike occurrences.

Additionally, operatively coupling or directly decoupling the seventh joint 228 and/or the sixth joint 226 from the trapeze deployment assembly 208 allows for greater design flexibility of the arresting hook system 102. For example, when different kinematics of an arresting hook system are needed, a position of the VDA 252 can be adjusted without moving or changing a position of the seventh joint 228 (e.g., without changing a length of the linkage arm 504). Thus, the arresting hook system 102 does not need to be significantly redesigned when implemented in a different aircraft, when different performance is needed during a product development cycle, etc. In some examples, the configuration of the linkage assembly 622 (and, in particular, the second bar linkage 604) enables design flexibility for the arresting hook system 102, such that minimal changes to a configuration (e.g., a diameter of the second piston 414) or a position of the VDA 252 relative to the seventh joint 228 to adjust the performance (e.g., damping kinematics) of the arresting hook system 102.

Referring to 6C, the first end 242a of the vertical actuator 242 is mounted on or coupled to the frame 230 via a bearing 634 such that the first joint 216 is positioned at a first distance 636 from the OML 262. The third joint 220 of the aft body 304 is coupled to the frame 230 such that the third joint 220 is positioned at a second distance 638 from the OML 262. In some examples, the second distance 638 is different than (e.g., greater than) the first distance 636. However, in some other examples, the second distance 638 can be equal to, or less than, the first distance 636. The first distance 636 and/or the second distance 638 cause at least a portion of the trapeze deployment assembly 208 to be disposed below the OML 262 when the arresting hook system 102 is in the inspection position 206 of FIGS. 2C and 6C and/or the deployed position 204 of FIGS. 2B and 6B. More specifically, when the trapeze deployment assembly 208 is in the extended position 246 (e.g., is unfurled), the fifth joint 224 is positioned below the OML 262. In the illustrated example, the second joint 218, the fourth joint 222, the fifth joint 224 and the seventh joint 228 are positioned below the OML 262 when the trapeze deployment assembly 208 is in the extended position 246. Furthermore, reducing the first distance 636 and/or the second distance 638 relative to the OML 262 substantially improves the lateral loading capability of the trapeze deployment assembly 208. The hook shank 402 can impart lateral loads on the fifth joint 224 when the hook 404 engages the arresting cable at an off-center angle. For example, a crosswind may cause the aircraft 100 to be askew relative to a landing strip during landing, which can cause lateral loading or side loading to act on the hook shank 402. Such lateral loading acts as a moment force on the arresting hook system 102, which can in turn cause bending in the associated components thereof. Because the first distance 636 and the second distance 638 are relatively close to the OML 262, components of the trapeze deployment assembly 208 (e.g., the trapeze plate 302, the aft body 304, etc.) can be fabricated with shorter or truncated lengths (e.g., in a longitudinal or the roll axis 132 direction), which can improve the bending strength of the trapeze deployment assembly 208.

Moreover, it should be appreciated that extending the hook 404 further below the OML 262 improves engagement performance between the arresting hook system 102 and the arresting cable. Thus, by providing shorter distances between the first distance 636 and the OML 262 and/or the second distance 638 and the OML 262 enables positioning the hook 404 to a lower position below the OML 262, which can improve performance characteristics (e.g., cable capture rate) of the arresting hook system 102. In other words, the vertical positions of the first joint 216 and/or the third joint 220 provided by the first distance 636 and the second distance 638, respectively, relative to the OML 262 reduce the chances for the hook 404 to up-swing into the OML 262.

Figure 7A:
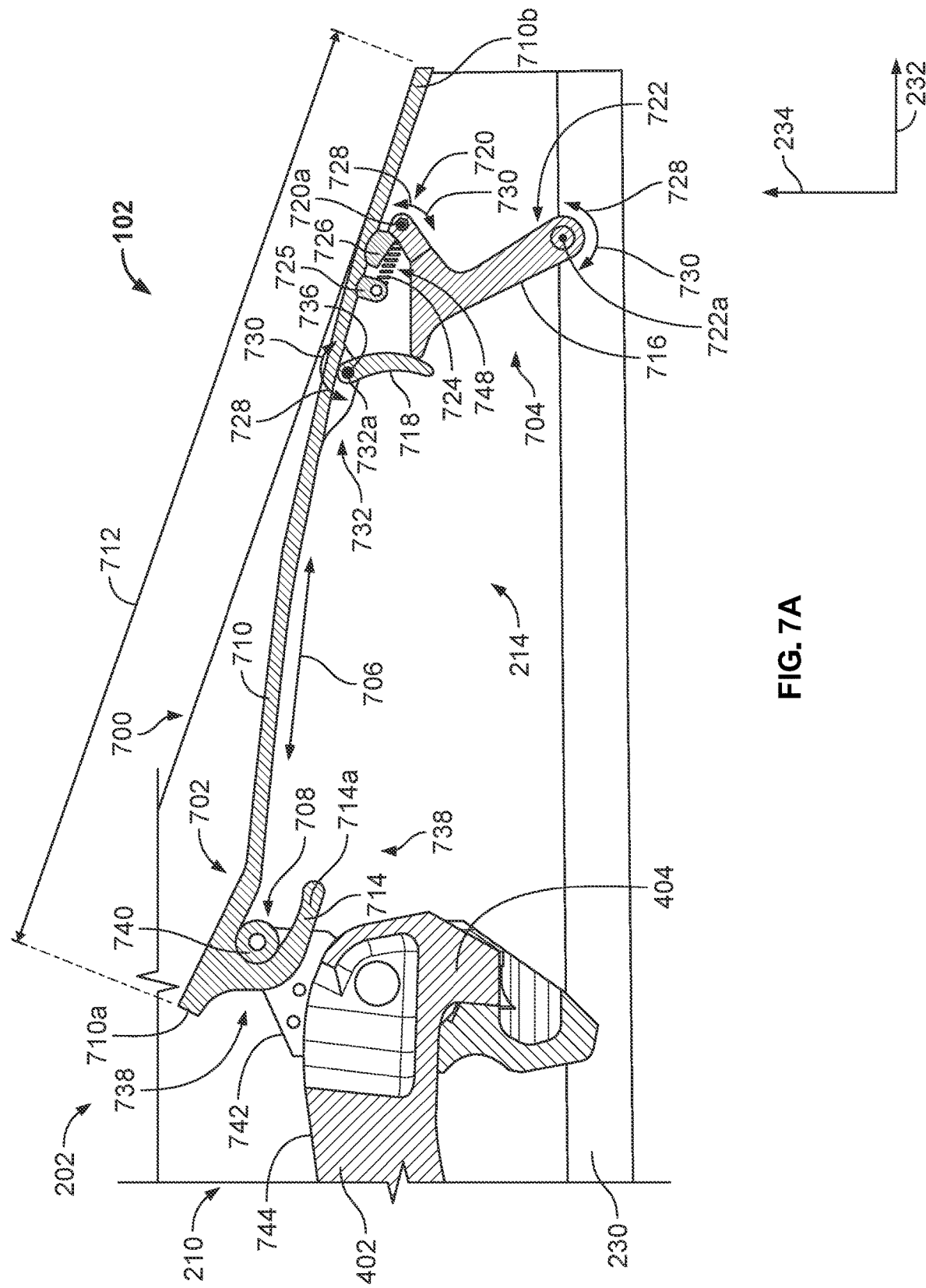
FIG. 7A is a partial, side view of an example locking assembly of the example arresting hook system of FIGS. 2A-2C and the example arresting hook system shown in the example stowed position.
Figure 7B:
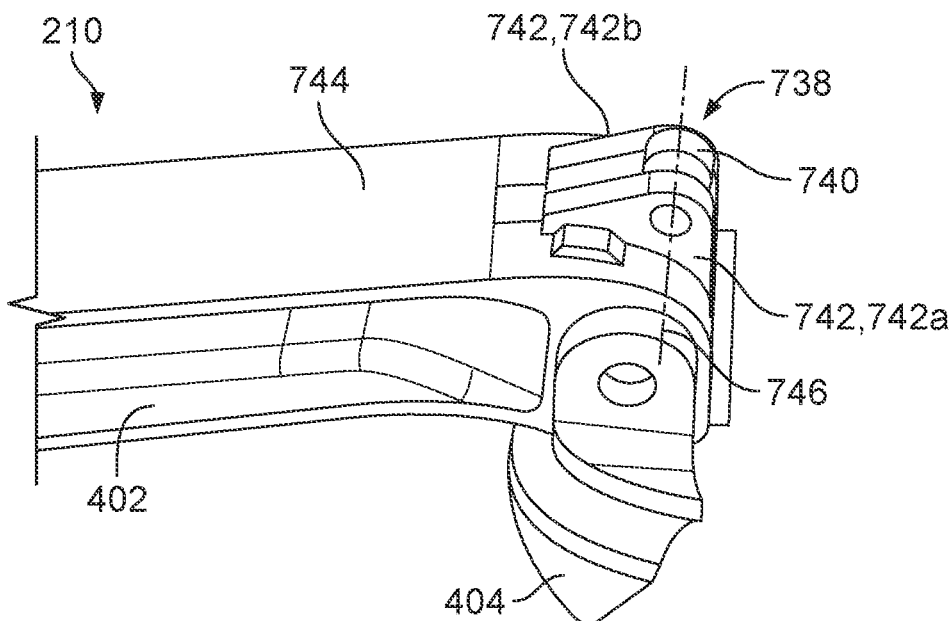
FIG. 7B is a partial perspective view of the example hook deployment assembly of FIGS. 2A-2C.

FIG. 7A is a partial, side view of the locking assembly 214 with arresting hook system 102 of FIGS. 2A-2C in the stowed position 202. FIG. 7B is a perspective, partial view of the hook deployment assembly 210 of FIGS. 2A-2C. FIG.

7C is a partial, perspective side view of the locking assembly 214 with the arresting hook system 102 of FIGS. 2A-2C in the inspection position 206.

The locking assembly 214 of the illustrated example is coupled to the frame 230 of the aircraft 100 (e.g., via one or more brackets). In the illustrated example, the locking assembly 214 is located towards an aft region of the arresting hook system 102. Specifically, the locking assembly 214 of the illustrated example includes a dual lock 700. Specifically, the locking assembly 214 includes a first lock or passive lock 702 and a second lock or directional lock 704 (or bypass lock). The passive lock 702 is oriented toward the directional lock 704. Specifically, the passive lock 702 and the directional lock 704 are positioned in a travel path 706 of the hook 404. The passive lock 702 of the illustrated example includes a capture hook or pocket 708 (e.g., oriented toward the directional lock 704). The locking assembly 214 of the illustrated example includes a track 710 defining a length 712 between a first end 710a and a second end 710b opposite the first end 710a. The first end 710a of the track 710 includes the passive lock 702 and the second end 710b includes the directional lock 704. The passive lock 702 of the illustrated example is a hook-shaped end (e.g., a C-shaped end, a capture hook, etc.) formed at the first end 710a of the track 710. The passive lock 702 is formed by a portion 714a of the track that curls and wraps toward the directional lock 704 and/or the track 710.

The directional lock 704 includes a latch 716 and a selector 718. The latch 716 (e.g., a spring-loaded latch) and the selector 718 are each pivotally coupled to rotate relative to the frame 230. The latch 716 is coupled to rotate relative to the frame 230 about a first latch joint 720 defining a first latch pivot axis 720a and a second latch joint 722 defining a second latch pivot axis 722a, different than the first latch joint 720 and/or the first latch pivot axis 720a. A spring 724 is coupled to the latch 716 and the track 710. Specifically, the spring 724 has a first end fixed to an anchor 725 coupled to the track 710 and a second end opposite the first end coupled to the first latch joint 720. A stop 726 is coupled or formed with the track 710 to prevent further rotation of the latch 716 in a first rotational direction 728 (e.g., a counter-clockwise direction in the orientation of FIG. 7A) opposite a second rotational direction 730 (e.g., a clockwise direction in the orientation of FIG. 7A) when the latch 716 is in engagement with the stop 726 as shown in FIG. 7A. The selector 718 is coupled to the track 710 via a selector joint 732. The selector joint 732 defines a selector pivot axis 732a about which the selector 718 rotates relative to the frame 230 and/or the track 710 (e.g., in the first rotational direction 728 and/or the second rotational direction 730). The selector 718 is positioned forward of the of the latch 716 in the orientation of the roll axis 132. The selector pivot axis 732a is different and/or spaced from the first latch pivot axis 720a and the second latch pivot axis 722a in the orientation of to the roll axis 132 and/or the yaw axis 134. The selector 718 of the illustrated example includes a spring hinge 736 (e.g., a torsion spring) to bias the selector 718 toward the latch 716. The first latch joint 720, the second latch joint 722 and the selector joint 732 of the illustrated example are formed by one or more pins, bushings, bearings, etc.

Figure 7C:
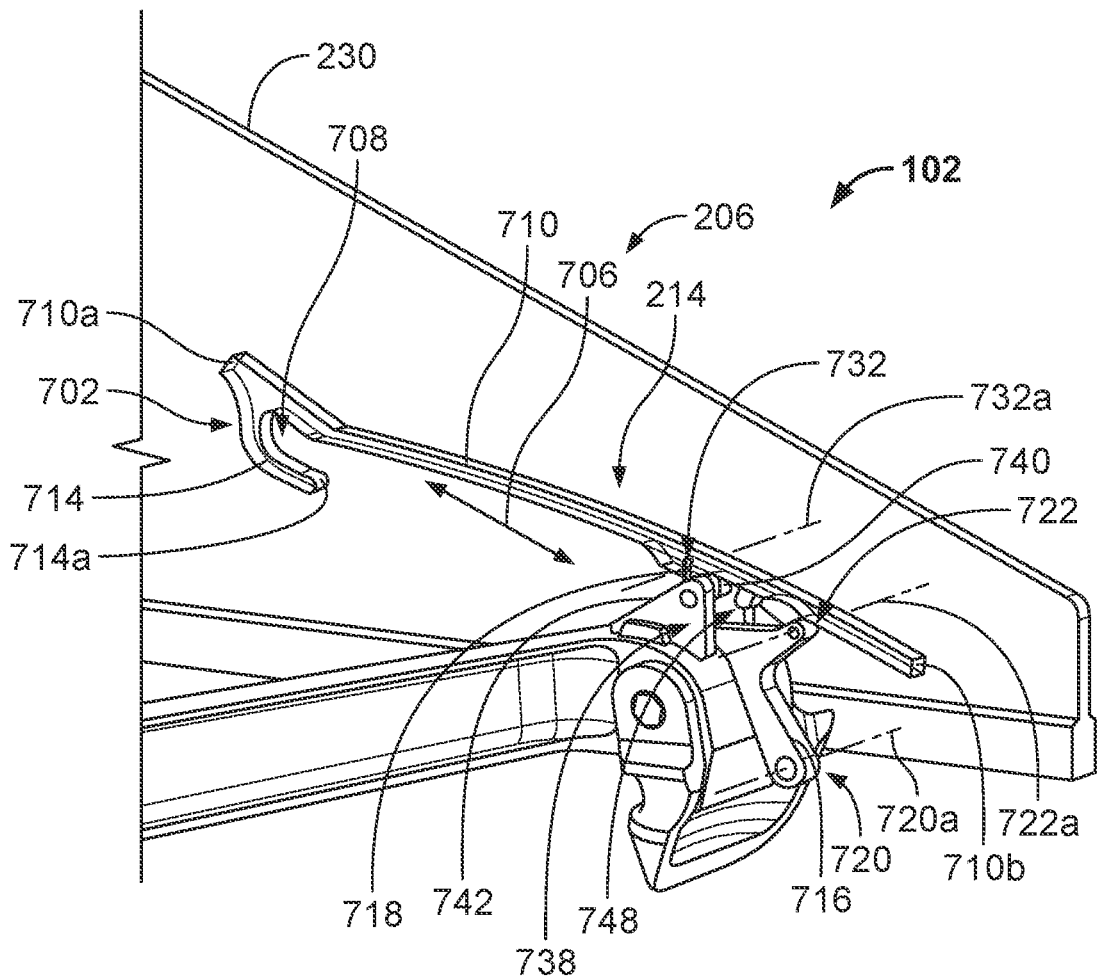
FIG. 7C is a partial, perspective side view of the example locking assembly of the example arresting hook system of FIGS. 2A-2C and the example arresting hook system shown in the example inspection position.

In the examples of FIGS. 7B and 7C, the locking assembly 214 of the illustrated example includes a guide 738. Specifically, the guide 738 of the illustrated example is coupled to the hook shank 402 adjacent to the hook 404. The guide 738 moves along the track 710 with the hook shank 402 when the arresting hook system 102 moves between the stowed position 202 and the deployed position 204. Specifically, the guide 738 interacts with the passive lock 702 when the arresting hook system 102 is in the stowed position 202 and the directional lock 704 when the arresting hook system 102 is in the inspection position 206. Additionally, the directional lock 704 enables the guide 738 to bypass the directional lock 704 during a deployment event when the arresting hook system 102 moves from the stowed position 202 to the deployed position 204. The guide 738 of the illustrated example includes a roller 740 and a bracket 742. The guide 738 (e.g., the roller 740) is coupled to the hook shank 402 via the bracket 742 (e.g., an upper surface 744 of the hook shank 402 in the orientation of FIG. 7B). The bracket 742 of the illustrated example includes a first bracket plate 742a and a second bracket plate 742b spaced from the first bracket plate 742a such that the roller 740 is positioned therebetween. The roller 740 is axially coupled to the bracket 742 and can roll relative to the bracket 742 about a roll axis 746 when the roller 740 engages (e.g., rolls) with the track 710 (e.g., between the passive lock 702 and the directional lock 704). When the selector 718 is positioned against the latch 716 as shown in FIGS. 7A and 7C, the selector 718 and the latch 716 define a capture chamber 748. The capture chamber 748 receives the guide 738 (e.g., the roller 740) when the arresting hook system 102 is in the inspection position 206 (FIG. 7C).

FIGS. 8A-18 illustrate the example arresting hook system 102 at different operational positions. The arresting hook system 102 may be actuated to the deployed position 204 when the aircraft 100 approaching a runway. In operation, as described in greater detail in connection with FIGS. 8A-18, operation of the vertical actuator 242 and the VDA 252 cause the arresting hook system 102 to move between the stowed position 202 and the deployed position 204. For example, to deploy the hook 404, the vertical actuator 242 is actuated to move the trapeze deployment assembly 208 between the retracted position 244 and the extended position 246 (e.g., the over-center position 626) and the VDA 252 is actuated to move the hook deployment assembly 210 between the non-engagement position 254 (FIG. 2A) and the arrestment position 256 (FIG. 2B). For example, the vertical actuator 242 causes the hook 404 to move along the roll axis 132 (e.g., in a generally horizontal direction) between the passive lock and the bypass lock. The VDA 252 causes the hook 404 to move along the yaw axis 134 (e.g., in a generally vertical direction) between the directional lock 704 and the ground surface 112 (FIG. 1). In the illustrated example, the vertical actuator 242 is actuated prior to actuation of the VDA 252. In other words, the vertical actuator 242 is actuated first, and then the VDA 252 is actuated. However, in some examples, the vertical actuator 242 and the VDA 252 can be actuated simultaneously. In some examples, the VDA 252 can be actuated during actuation of the vertical actuator 242.

Figure 8A:
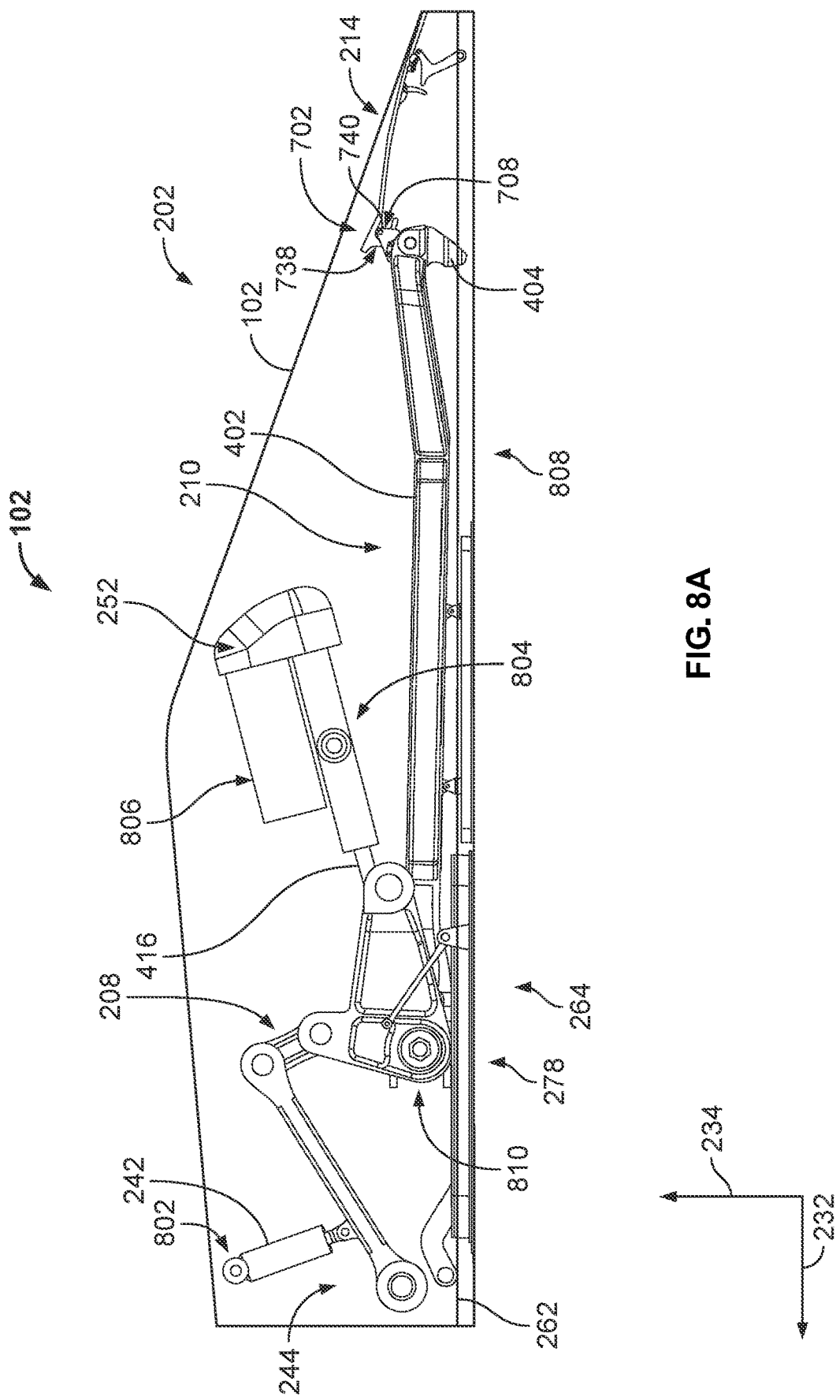
FIG. 8A is a side view of the example arresting hook system shown in the stowed position 202.
Figure 8B:
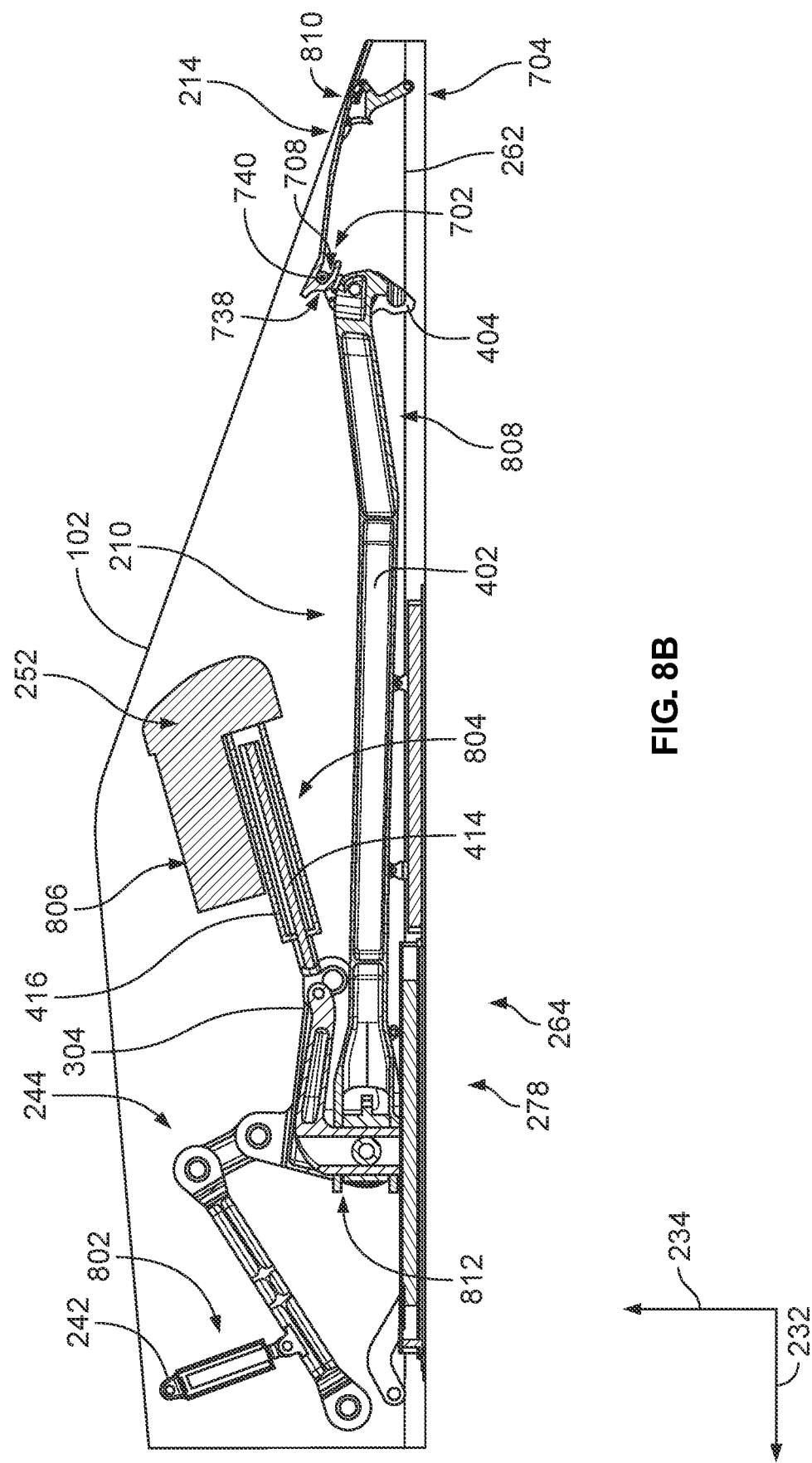
FIG. 8B is a cross-sectional view of FIG. 8A.

FIG. 8A is a side view of the arresting hook system 102 shown in the stowed position 202. FIG. 8B is a cross-sectional view of FIG. 8A. In the stowed position 202, the vertical actuator 242 (e.g., the first piston 318) is in a first retracted position 802 and the VDA 252 (e.g., the second piston 414) is in a second retracted position 804. When the vertical actuator 242 is in the first retracted position 802, the trapeze deployment assembly 208 is positioned in the retracted position 244. Additionally, in the stowed position 202, the VDA 252 is in a second retracted position 804. Furthermore, the second cylinder 416 is in a first rotational position 806. When the VDA 252 is in the second retracted position 804 and the second cylinder 416 is in the second rotational position 806, the hook deployment assembly 210 is in a stowed captured position 808. Specifically, the trapeze deployment assembly 208 and the hook deployment assembly 210 are located within the fuselage 104 or above the lower OML 262. Furthermore, the guide 738 is engaged with, or captured by, the passive lock 702 (e.g., the roller 740 is positioned in the pocket 708). Thus, the passive lock 702 of the locking assembly 214 captures the guide 738 (e.g., the roller 740) to retain or support (e.g., a weight of) the hook 404. The guide 738 is spaced away from the directional lock 704 (e.g., the guide 738 is not engaged with the directional lock 704) and the directional lock 704 is in an initial position 810. Although not shown, the arresting hook system 102 of the illustrated example includes a primary lock (e.g., a primary lock 1902 of FIG. 19) that interacts or couples to the aft body 304. Additionally, the cover 264 is in the closed position 278. In the stowed position 202, the pivot assembly 212 is in an initial position or nesting position 812. In the nesting position 812, the pivot assembly 212 is at a forward most position along the roll axis 132 (e.g., a horizontal position in the orientation of FIG. 8A). Stated differently, in the stowed position 202, the pivot assembly 212 is closer to the vertical actuator 242 in a direction along the roll axis 132 compared to a distance between the vertical actuator 242 and the pivot assembly 212 when the arrestment hook system 102 is in the deployed position.

FIG. 9A is a side view of the arresting hook system 102 shown in a first intermediate position 900. FIG. 9B is a partially, enlarged view of the arrestment hook system 102 of FIG. 9A. Specifically, FIGS. 9A and 9B show the arrestment hook system 102 moving in a direction from the stowed position 202 toward the deployed position 204. In the illustrated example, the vertical actuator 242 (e.g., the first piston 318) is in a partially extended position 902 and the VDA 252 is in the second retracted position 804. With the first piston 318 in the partially extended position 902, the trapeze deployment assembly 208 is between the retracted position 244 and the extended position 246. As the first piston 318 moves from the first retracted position 802 of FIG. 8A to the partially extended position 902, the first piston 318 imparts a force 904 on the trapeze plate 302 causing the trapeze plate 302 to rotate in the second rotational direction 730 about the first pivot axis 216a, which causes the aft body 304 to rotate in the first rotational direction 728 about the third pivot axis 220a via the coupling 306. In turn, the aft body 304 causes the pivot assembly 212 to move (e.g., vertically) below the OML 262. Specifically, the first bar linkage 602 (FIG. 6A) and/or the second bar linkage 604 (FIG. 6A) causes the pivot assembly 212 to extend outside or below the OML 262.

Additionally, in response to movement of the trapeze deployment assembly 208 via actuation of the vertical actuator 242 from the first retracted position 802 toward the partially extended position 902, the pivot assembly 212 moves in an aft direction along the roll axis 132 (e.g., away from the vertical actuator 242 and toward the locking assembly 214), thereby causing the hook shank 402 to move in an aft direction along the roll axis 132. In other words, rotation of the aft body 304 in the first rotational direction 728 about the third pivot axis 220a causes the pivot assembly 212 to away from the vertical actuator 242 along the roll axis 132 and rotation of the aft body 304 in the second rotational direction 730 about the third pivot axis 220a causes the pivot assembly 212 to move toward the vertical actuator 242 along the roll axis 132. As a result, rotation of the aft body 304 in the first rotational direction 728 about the third pivot axis 220a causes the pivot assembly 212 to impart a force 906 against the hook shank 402, which causes the hook 404 to disengage with the passive lock 702 and move toward the directional lock 704. For example, the guide 738 (e.g., the roller 740) disengages or exits the pocket 708 and rolls against a surface 908 of the track 710 from the passive lock 702 toward the directional lock 704.

Although the VDA 252 of the illustrated example of FIG. 9A is in the second retracted position 804 (e.g., fully retracted position), the hook deployment assembly 210 moves relative to the frame 230 via the trapeze deployment assembly 208. To enable movement of the hook deployment assembly 210 relative to the frame 230 when the second piston 414 is in the second retracted position 804, the second cylinder 416 rotates relative to the frame 230 about the sixth pivot axis 226a via the trunnion 418 to a second rotational position 910. In particular, the second cylinder 416 rotates in the first rotational direction 728 about the sixth pivot axis 226a and second piston 414 rotates in the first rotational direction 728 about the seventh pivot axis 228a.

Furthermore, rotation of the aft body 304 in the first rotational direction 728 about the third pivot axis 220a causes the cover 264 to move from the cover closed position 278 (FIG. 8A) toward the cover open position 279 (FIG. 2B). For example, the aft body 304 causes the rod 274 to impart a force 912 to the second end 266b of the first panel 266 to cause the first end 266a of the first panel 266 to rotate about the hinge 270 in the second rotational direction 730. The second panel 268 moves in response to movement of the hook deployment assembly 210. Specifically, the first panel 266 and the second panel 268 move between the cover closed position 278 and the cover open position 279 in response to rotation of aft body 304 about the third pivot axis 220a.

FIG. 10A is a side view of the arresting hook system 102 shown in a bypass position 1000. FIG. 10B is a partially, enlarged view of the arrestment hook system 102 of FIG. 10A. Specifically, FIGS. 10A and 10B show the arresting hook system 102 in the bypass position 1000 along a deployment path in which the arresting hook system 102 moves from the stowed position 202 (FIG. 2A) toward the deployed position 204 (FIG. 2B). In the illustrated example, the vertical actuator 242 is a first fully extended position 1002 (e.g., an end of stroke extended position) and the VDA 252 is in the second retracted position 804 (e.g., an end of stroke retracted position). In other words, the VDA 252 has not yet been activated when the arresting hook system 102 is in the bypass position 1000 of FIGS. 10A and 10B. Additionally, the pivot assembly 212 is in a fully extended position 1003. In the fully extended position 1003, pivot assembly 212 is farther aft along the roll axis 132 compared to the nesting position 812 (FIG. 8A). In the illustrated example, the trapeze deployment assembly 208 is in the extended position 246 (e.g., a fully extended position) and the trapeze deployment assembly 208 cannot move the pivot assembly 212 and/or the hook deployment assembly 210 further in the aft direction along the roll axis 132.

To enable the hook deployment assembly 210 to move aft along the roll axis 132 while the VDA 252 is in the second retracted position 804, the second cylinder 416 rotates about the sixth pivot axis 226a (e.g., via the trunnion 418) to a third rotational position 1004. In particular, the second cylinder 416 rotates about the sixth pivot axis 226a in the first rotational direction 728 and the second piston 414 rotates relative to the frame 230 in the first rotational direction 728 about the seventh pivot axis 228a as the aft body 304 rotates about the third pivot axis 220a to position the second cylinder 416 in the third rotational position 1004 and enable the trapeze deployment assembly 208 to move to the extended position 246. Although the second cylinder 416 rotates from the first rotational position 806 of FIG. 8A, the second rotational position 910 of FIG. 9A, to the third rotational position 1004 of FIG. 10A, the second piston 414 is in the second retracted position 804 (FIG. 8A). In other words, the second piston 414 is not actuated prior to the first piston 318 reaching the first fully extended position 1002.

With the vertical actuator 242 in the first fully extended position 1002, the trapeze deployment assembly 208 is unfolded to the extended position 246. In other words, the pivot assembly 212 is in the over-center position 626. In response to moving from the retracted position 244 to the extended position 246, the trapeze deployment assembly 208 causes the hook shank 402 and, thus, the hook 404 of the hook deployment assembly 210 to move into engagement with the directional lock 704 along the roll axis 132. As the arrestment hook system 102 moves to the bypass position 1000, the guide 738 engages the directional lock 704. In particular, referring to FIG. 10B, the guide 738 (e.g., the roller 740) of the illustrated example engages a front surface 1006 of the selector 718 and causes the selector 718 to rotate in the first rotational direction 728 about the selector pivot axis 732a. The selector 718 pivots about the selector pivot axis 732a into engagement with the latch 716, thereby causing the latch 716 to rotate in the second rotational direction 730 about the first latch pivot axis 720a provided by the first latch joint 720 and the second latch pivot axis 722a provided by the second latch joint 722. Specifically, the latch 716 pivots in the second rotational direction 730 about the first latch pivot axis 720a and the second latch pivot axis 722a in response to the guide 738 engaging the selector 718 and rotating the selector 718 into engagement with the latch 716 when the arrestment hook system 102 moves from the stowed position 202 toward the deployed position 204. As the selector 718 pivots into engagement with the latch 716, the selector 718 moves to a blocking position 1008 to prevent the latch 716 from capturing the hook 404 when the arrestment hook system 102 moves from the stowed position 202 to the deployed position 204. As a result, the selector 718 blocks or restricts access to the capture chamber 748 of the directional lock 704 and causes the guide 738 to move past the capture chamber 748 and allows the arresting hook system 102 to move toward the deployed position 204. The directional lock 704 enables the hook 404 to bypass the directional lock 704 when the arrestment hook system 102 moves from the stowed position 202 to the deployed position 204. In some examples, actuation of the vertical actuator 242 between the first retracted position 802 and the first fully extended position 1002 causes the arresting hook system 102 to move between the stowed position 202 and the bypass position 1000.

Figure 11A:
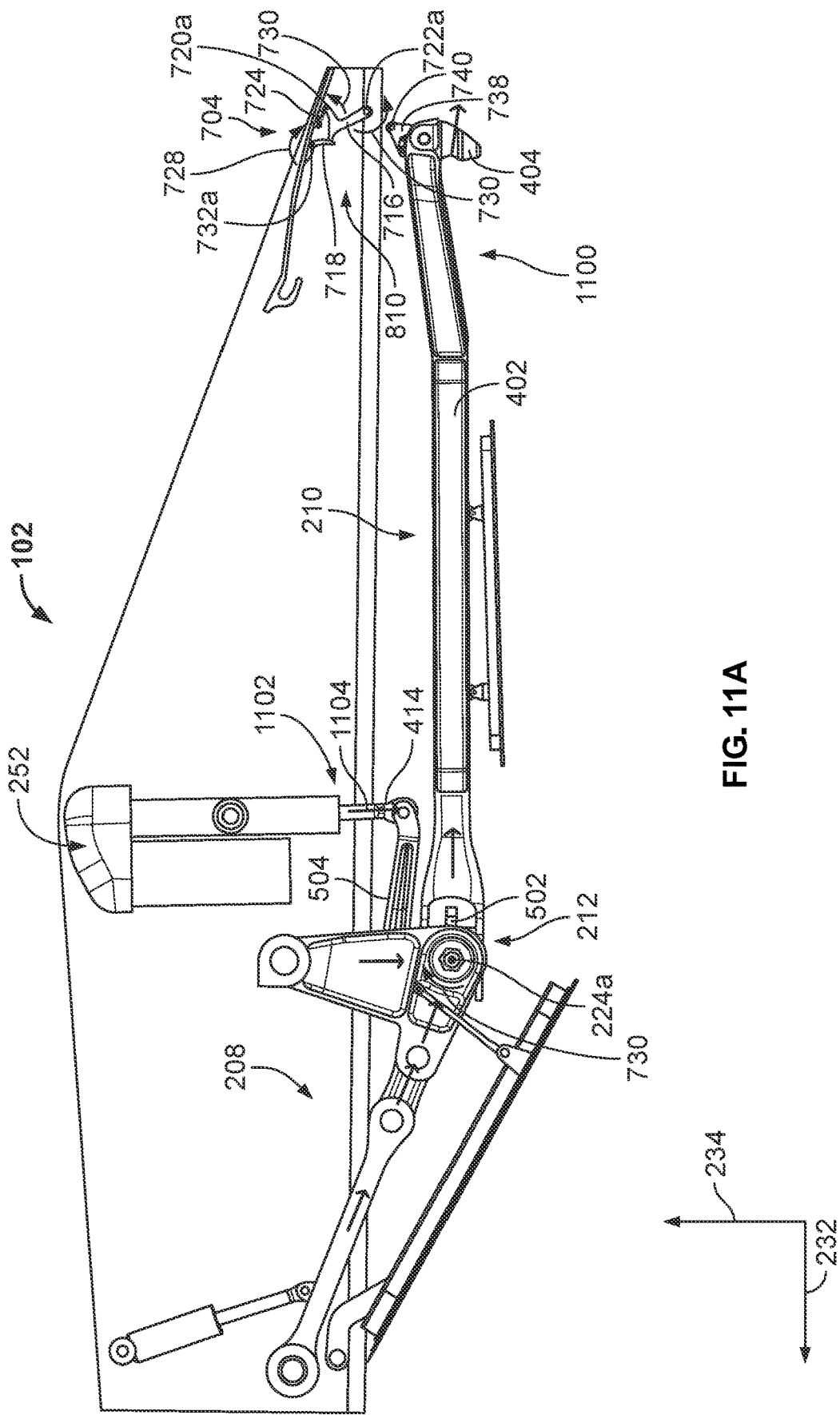
FIG. 11A is a side view of the example arresting hook system shown in another intermediate position between the example bypass position and the example deployed position.
Figure 11B:
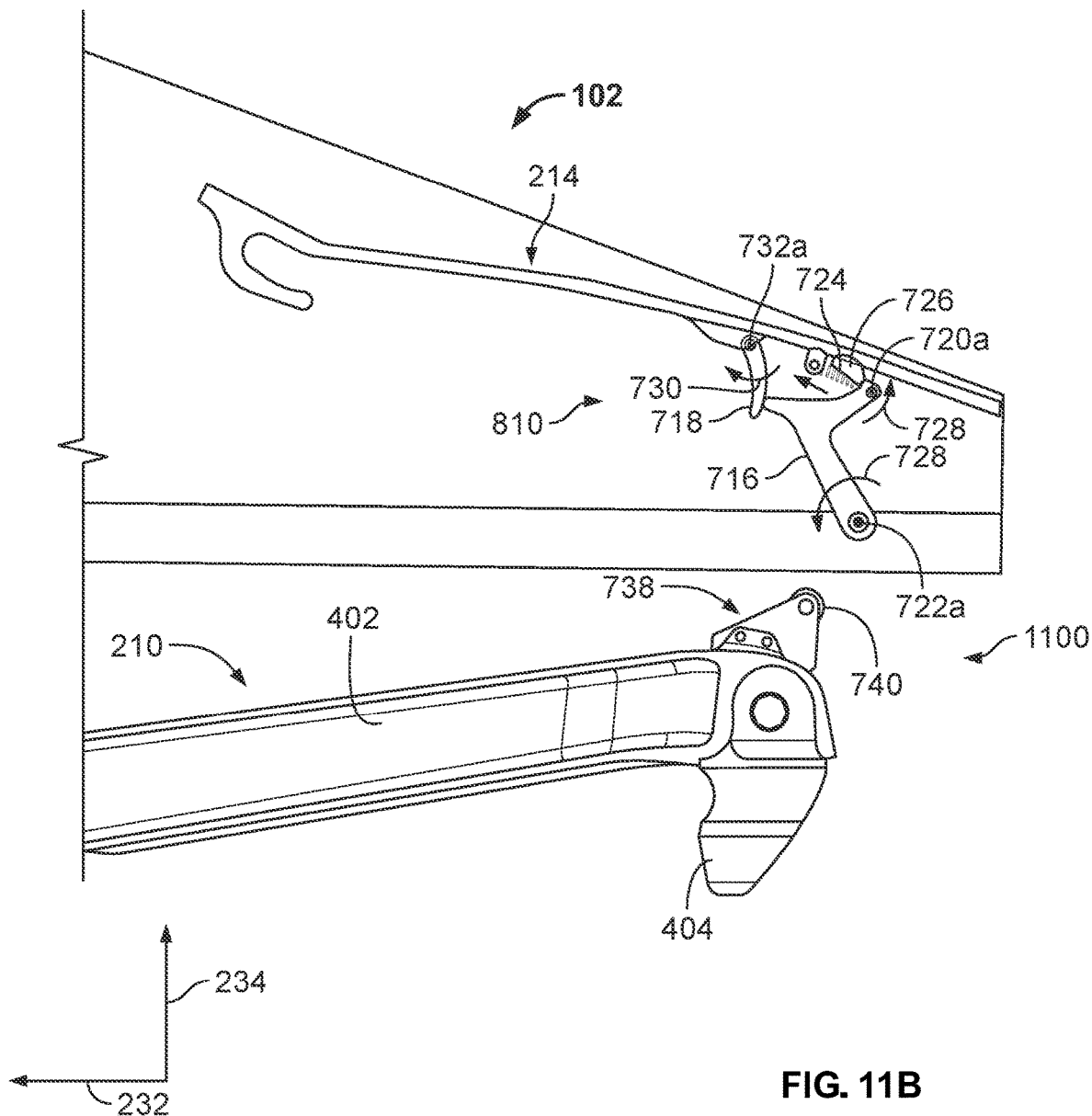
FIG. 11B is a partially enlarged view of FIG. 11A.

FIG. 11A is a side view of the arresting hook system 102 shown in another intermediate position 1100 (e.g., in a travel path between the bypass position 1000 and the deployed position 204). FIG. 11B is a partial, enlarged view of FIG. 11A. To move the hook deployment assembly 210 from the bypass position 1000 of FIG. 10A to the deployed position 204, the arresting hook system 102 of the illustrated example employs the VDA 252. Specifically, the VDA 252 is actuated to a partially extended position 1102 to move the hook 404 from the bypass position 1000 to the intermediate position 1100 when the arresting hook system 102 moves toward the deployed position 204. Thus, as the arresting hook system 102 engages the directional lock 704, the VDA 252 (e.g., the second piston 414) is actuated from the second retracted position 804 to cause the hook deployment assembly 210 to extend from the bypass position 1000 toward the deployed position 204. Specifically, actuation of the VDA 252 from the second retracted position 804 to the partially extended position 1102 causes movement of the hook 404 in a direction along the yaw axis 134. Specifically, the second piston 414 imparts a force 1104 (e.g., a downward force) against the linkage arm 504 of the pivot assembly 212. The coupler 502 enables the hook shank 402 to rotate in the second rotational direction 730 about the fifth pivot axis 224a, thereby causing the hook shank 402 and, thus, the hook 404 to move toward the deployed position 204. Referring to FIG. 11B, when the guide 738 (e.g., the roller 740) releases the directional lock 704, the spring 724 of the directional lock 704 causes the latch 716 to rotate in the first rotational direction 728 about the first latch pivot axis 720a and the second latch pivot axis 722a until the latch 716 engages the stop 726. In turn, the latch 716 causes the selector 718 to move in the second rotational direction 730 about the selector pivot axis 732a. In other words, the directional lock 704 is in the initial position 810.

Figure 12A:
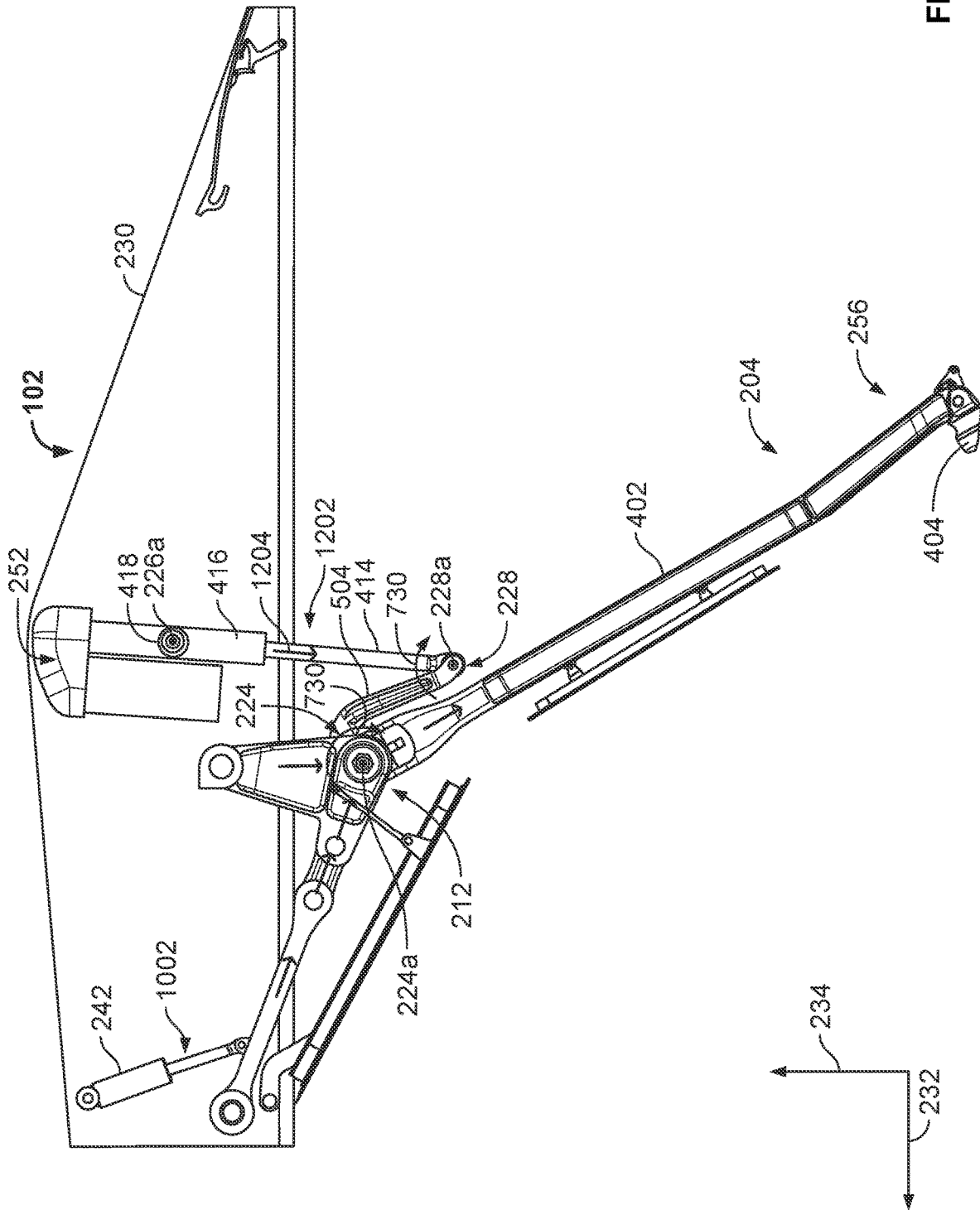
FIG. 12A is a side view of the example arresting hook system of FIGS. 2A-2C shown in the example deployed position.
Figure 12B:
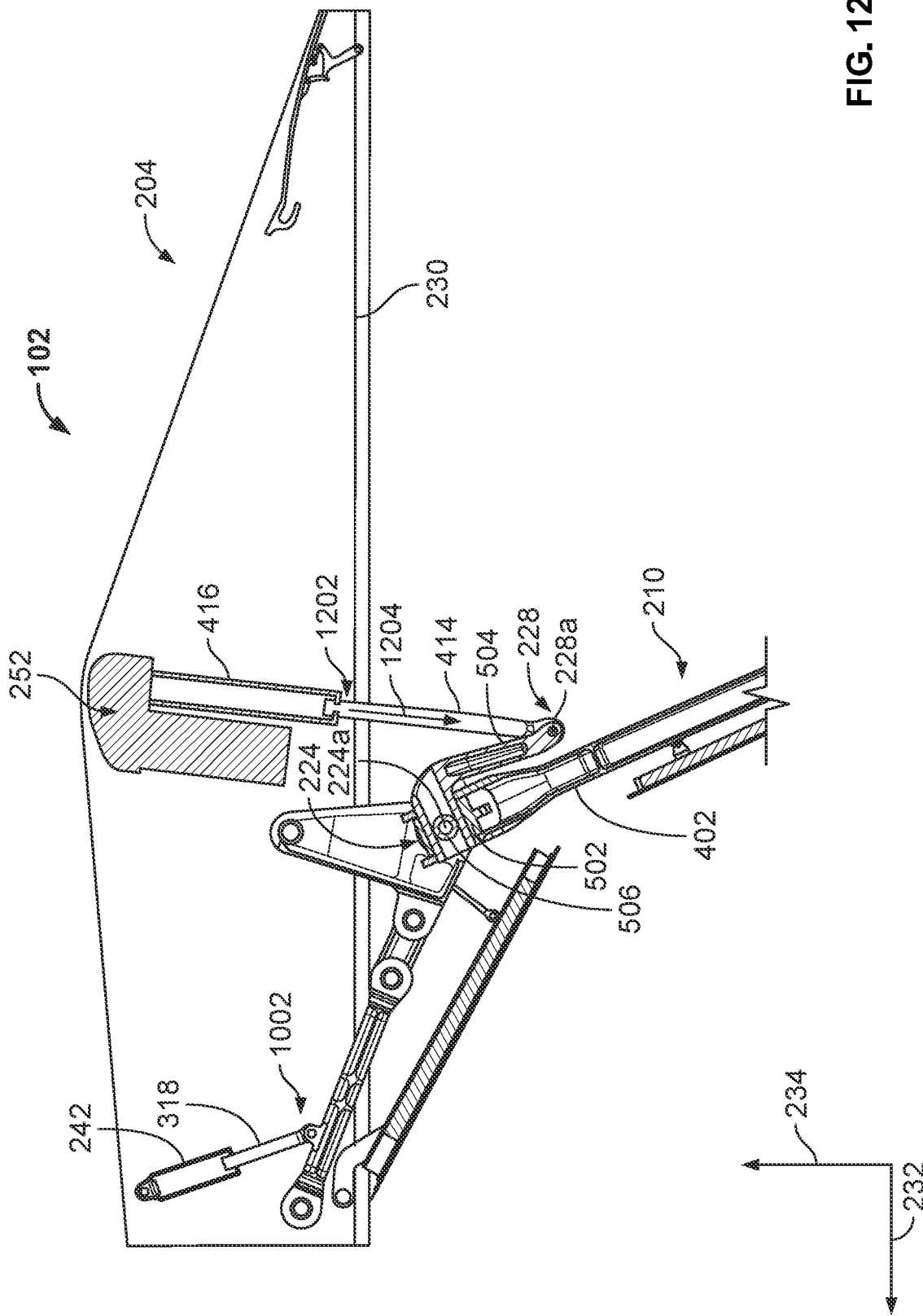
FIG. 12B is a partial, cross-sectional view of FIG. 12A.

FIG. 12A is a side view of the arresting hook system 102 shown in the deployed position 204. FIG. 12B is a partial, cross-sectional view of FIG. 12A. To move the hook 404 to the arresting position, the VDA 252 is actuated to a second fully extended position 1202. As the VDA 252 continues to be actuated from the partially extended position 1102 of FIG. 11A to the second fully extended position 1202, the hook shank 402 rotates about the fifth pivot axis 224a via the pivot assembly 212 in the second rotational direction 730. In some examples, the linkage arm 504 can pivot in the second rotational direction 730 about the seventh pivot axis 228a. The vertical actuator 242 is in the first fully extended position 1002. In other words, as the VDA 252 moves to the second fully extended position 1202, the second piston 414 imparts a force 1204 (e.g., a force in a direction of the yaw axis 134) to the seventh joint 228 and/or the linkage arm 504 of the pivot assembly 212. In turn, the second piston 414 causes the hook shank 402 to pivot in the second rotational direction 730 about the fifth pivot axis 224a of the fifth joint 224, causing the hook shank 402 and, thus, the hook 404 to move relative to the frame 230 in a direction along the yaw axis 134. In other words, the coupler 502 and the linkage arm 504 rotate about the pin 506 to enable the hook shank 402 to pivot relative to the fifth pivot axis 224a because the hook shank 402 is fixed to the coupler 502 and/or the linkage arm 504 via the hook shank clevis 408. Thus, actuation of the VDA 252 from the second retracted position 804 to the second fully extended position 1202 causes the arresting hook system 102 to move between the bypass position 1000 and the deployed position 204. When the arresting hook system 102 is in the deployed position 204, the hook 404 is in the arrestment position 256 (e.g., a cable capturing position). In the deployed position 204 and/or the arrestment position 256, the hook 404 can engage a cable during a landing event.

Figure 13:
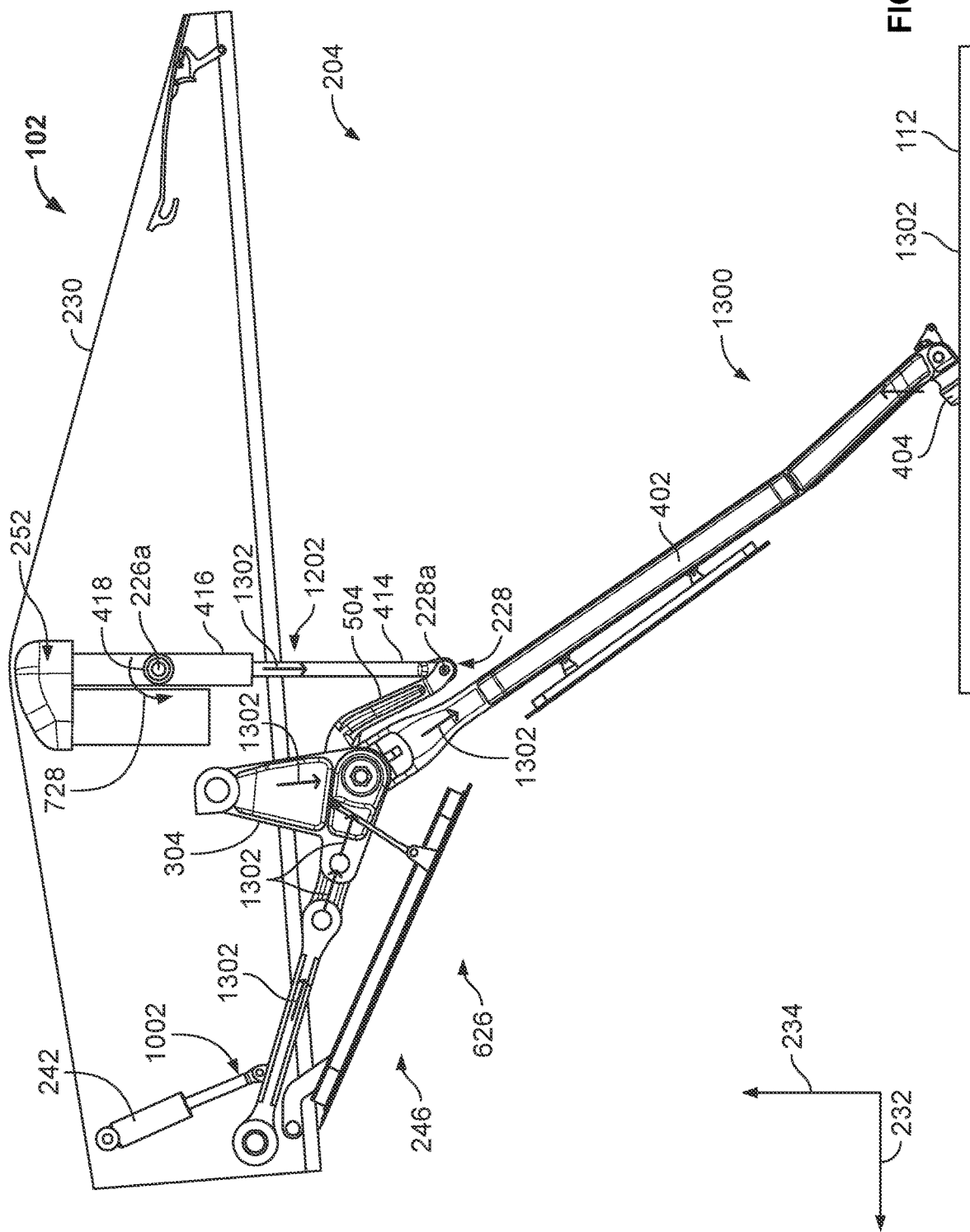
FIG. 13 is a side view of the example arresting hook system of FIGS. 2A-2C shown in an example hold down position.

FIG. 13 is a side view of the arresting hook system 102 shown in a hold down position 1300. In the hold down position 1300, the vertical actuator 242 is in the first fully extended position 1002 and the VDA 252 is in the second fully extended position 1202. The VDA 252 of the illustrated example provides a strut for the hook shank 402 via the connection (e.g., the seventh joint 228) between the second piston 414 and the linkage arm 504 of the pivot assembly 212 as the hook 404 (FIG. 4) touches the ground surface 112 during a landing event. Thus, the VDA 252 counteracts forces to restrict or prevent the hook 404 from bouncing off of the ground surface 112 and over an arresting cable. In some examples, to counteract and/or reduce forces imparted to the trapeze deployment assembly 208 and the hook deployment assembly 210 when the hook engages a cable and/or the hook engages (e.g., bounces off) of the ground surface 112 during a landing event, the second cylinder 416 of the illustrated example can rotate about the sixth pivot axis 226a in the first rotational direction 728 such that the second cylinder 416 is rotated toward the aft body 304. Thus, although the VDA 252 is in the second fully extended position 1202, the second cylinder 416 can rotate about the sixth pivot axis 226a via the trunnion 418 and/or the second piston 414 can pivot relative to the seventh pivot axis 228a relative to the frame 230 to react, dissipate, absorb and/or counteract certain forces. In such instance, the trapeze deployment assembly 208 remains in the over-center position 626 and/or the extended position 246. In the deployed position 204, the arrestment hook system 102 provides loads 1304 to hold down the hook 404 during the landing event.

Figure 14A:
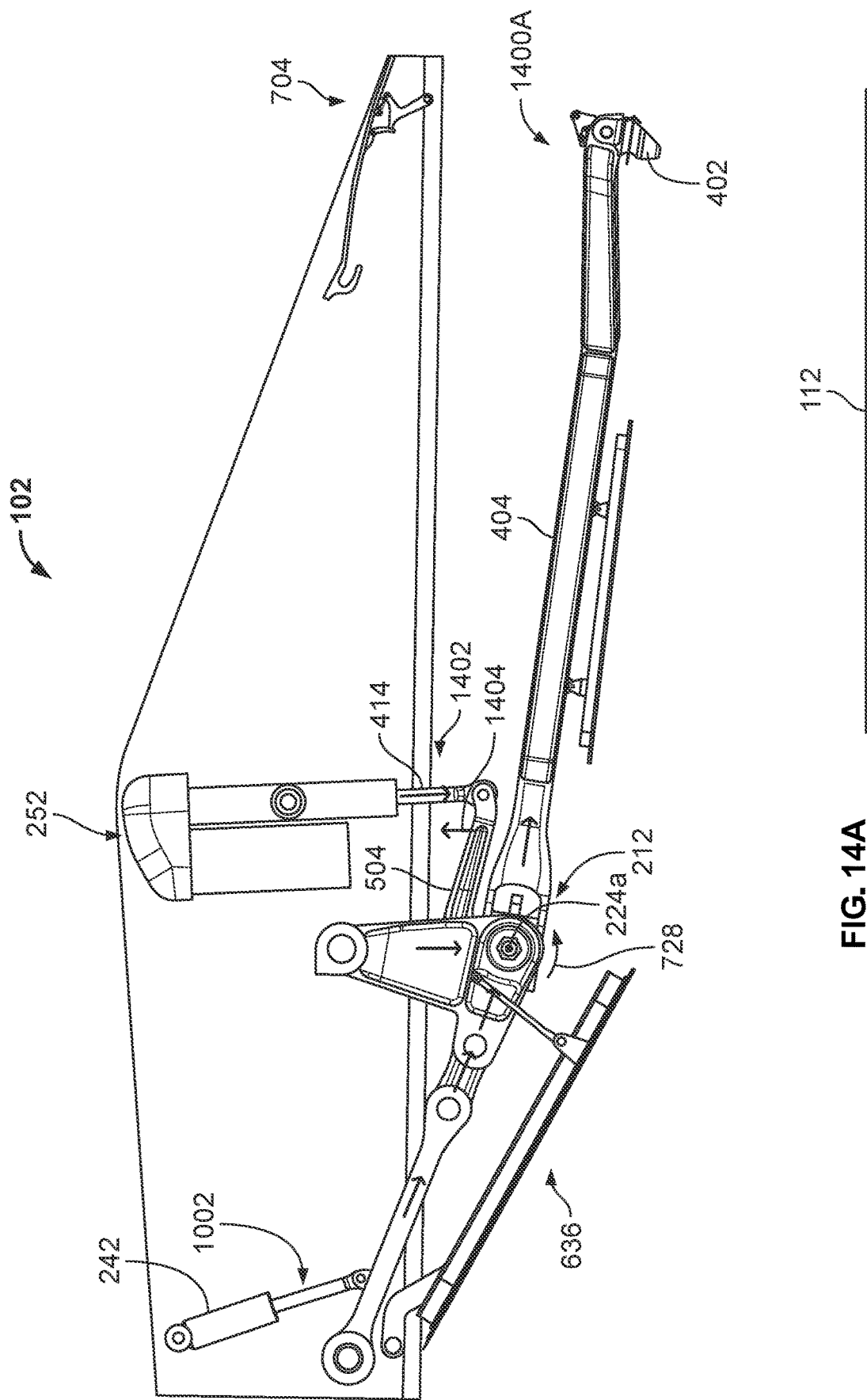
FIG. 14A is a side view of the example arresting hook system of FIGS. 2A-2C shown in an another intermediate position.

FIG. 14A is a side view of the arresting hook system 102 in another intermediate position 1400A. After deployment of the arresting hook system 102 (e.g., after a landing event), the arresting hook system 102 can be returned from the deployed position 204 to the stowed position 202. In particular, the VDA 252 is moved from the second fully extended position 1202 (e.g., at which the arresting hook system 102 is in the deployed position 204) toward the second retracted position 804, the hook 404 moves along the yaw axis 134 from the ground surface 112 toward the directional lock 704. Specifically, the second piston 414 imparts an upward force 1404 against the linkage arm 504 causing the pivot assembly 212 and the hook shank 402 to pivot about the fifth pivot axis 224a in the first rotational direction 728. Additionally, the vertical actuator 242 remains in the first fully extended position 1002 while the VDA 252 is retracted to move the arresting hook system 102 from the deployed position 204 toward the stowed position 202.

Figure 14B:
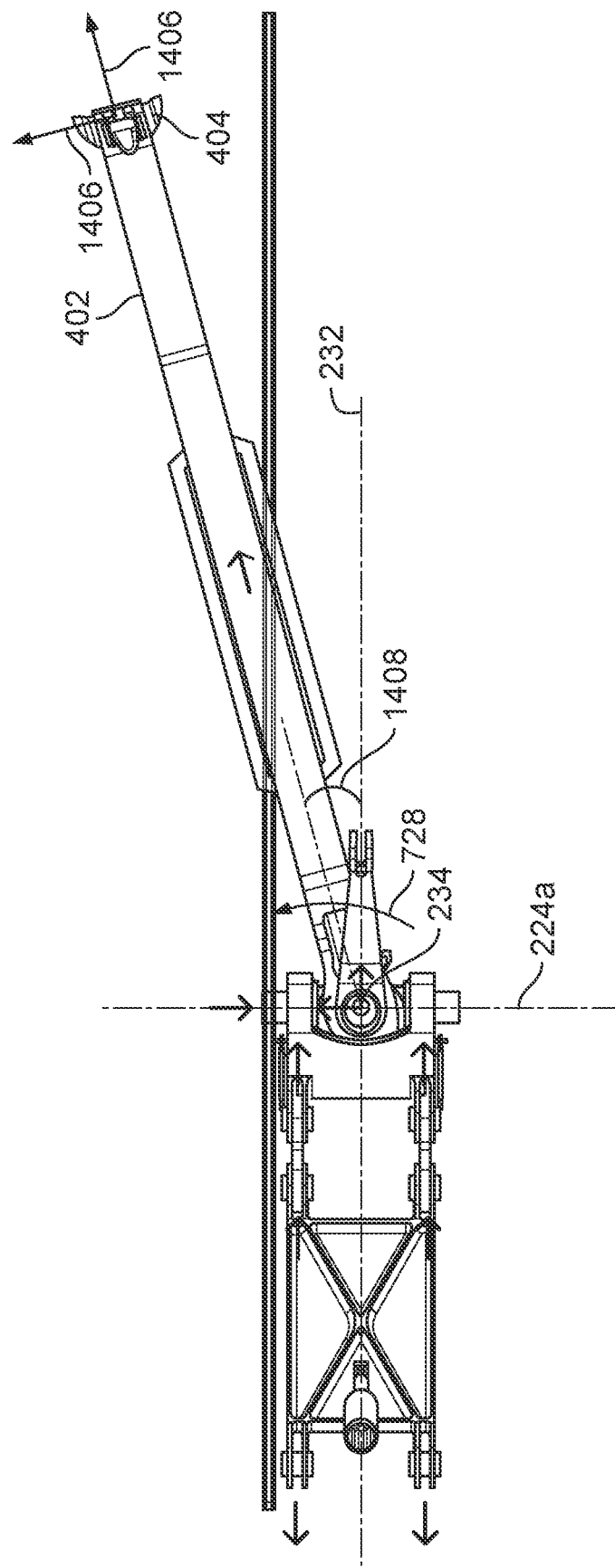
FIG. 14B is a top view of the example arresting hook system of FIGS. 2A-2C shown in an another intermediate position.

FIG. 14B is a top view of the arresting hook system 102 in another intermediate position 1400B. During arrestment with an arresting cable (e.g., during a landing event), the arresting hook system 102 can be move from the deployed position 204 to the intermediate position 1400B based on arrestment forces 1406 that the arresting cable applies to the hook 404. In the illustrated example of FIG. 14B, the arrestment forces 1406 cause the hook shank 402 to rotate in the first rotational direction 728 about the vertical axis 234. As such, the hook shank 402 of FIG. 14B is skewed at an angle 1408 relative to the longitudinal axis 232. In other examples, the arrestment forces 1406 can cause the hook shank 402 to rotate in the second rotational direction 730 or to not rotate about the vertical axis 234.

Figure 15A:
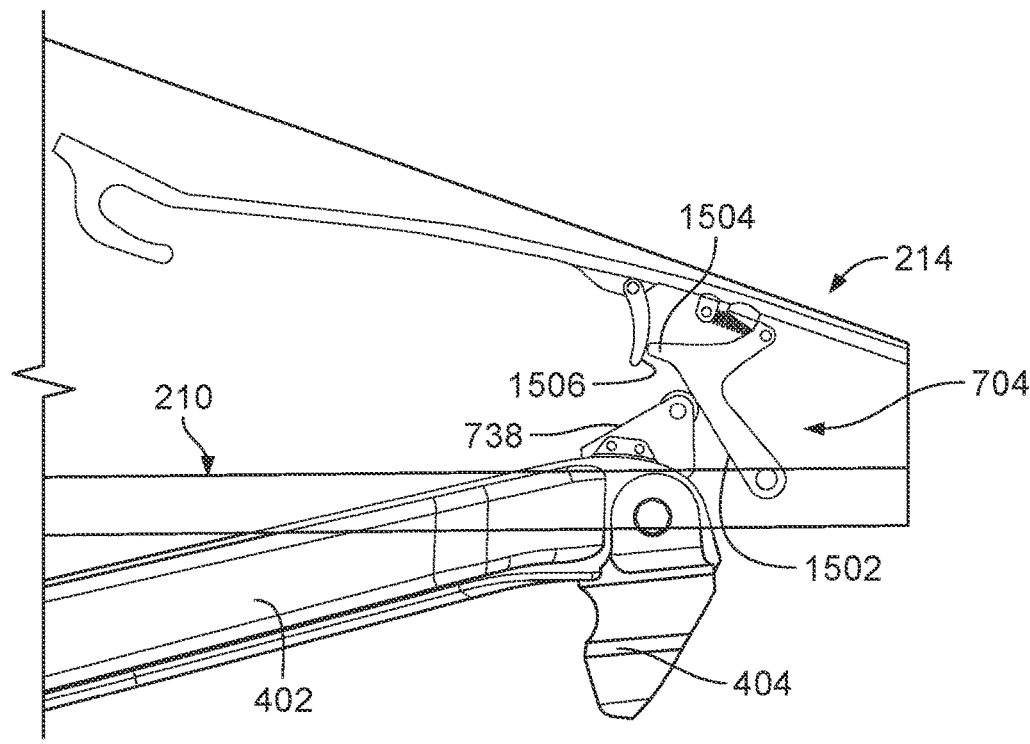
FIGS. 15A and 15B are a partial, enlarged views of the example arresting hook system of FIGS. 2A-2C at different positions prior to the example inspection position.
Figure 15B:
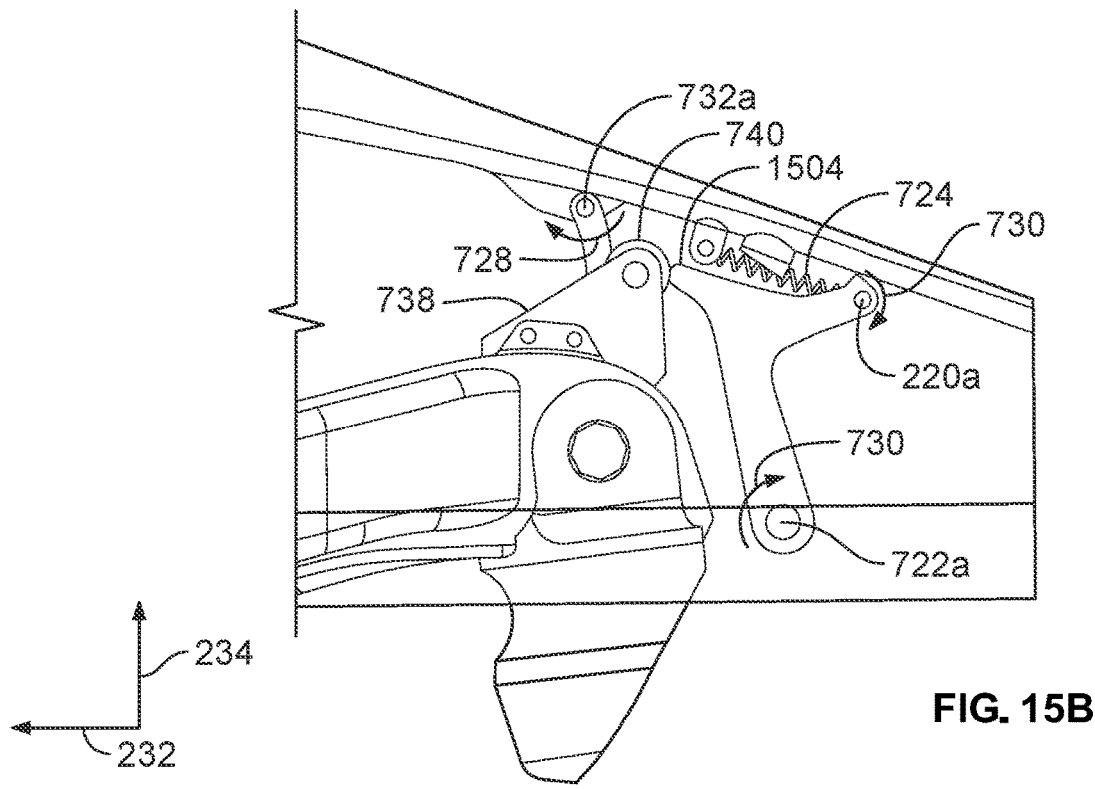

FIGS. 15A and 15B are a partial, enlarged views of the arresting hook system 102 at different position prior to the inspection position 206. Specifically, as the second piston 414 retracts to the second retracted position 804, the guide 738 contacts the latch 716 of the directional lock 704 along a body 1502 of the latch 716. As the second piston 414 moves to the second retracted position 804, the guide 738 engages a trigger area 1504 of the latch 716 to cause the latch 716 to rotate in the first rotational direction 728 about the first latch pivot axis 720a and the second latch pivot axis 722a. The guide 738, upon continued retraction of the VDA 252, engages a rear surface 1506 of the selector 718 opposite the front surface 1006 and releases the latch 716.

FIG. 16A is a side view of the arresting hook system 102 of the illustrated example shown in the inspection position 206. FIG. 16B is a partial enlarged view of FIG. 16A. After the guide 738 releases the latch 716 from the position of FIG. 15B, the spring 724 causes the latch 716 to rotate in the first rotational direction 728 about the first latch pivot axis 720a and the second latch pivot axis 722a such that the latch 716 engages the stop 726 and captures, traps or otherwise encloses the guide 738 (e.g., the roller 740) in the capture chamber 748. The rear surface 1506 of the selector 718 encloses the guide 738 in the capture chamber 748. As a result, the arrestment hook system 102 of the illustrated example is in the inspection position 206.

In the inspection position 206, the vertical actuator 242 is in the first fully extended position 1002 and the VDA 252 is in the second retracted position 804. Thus, as the VDA 252 retracts from the second fully extended position 1202 of FIG. 12A to the second retracted position 804 of FIG. 16A, the VDA 252 causes the hook 404 to move from the arrestment position 256 (e.g., the deployed position 204) to the inspection position 206. In other words, the directional lock 704 is directional and does not allow the guide 738 to bypass the capture chamber 748. Instead, when the arresting hook system 102 moves from the deployed position 204 toward the stowed position 202, the directional lock 704 captures the guide 738 to retain the arrestment hook system 102 in the inspection position 206. Thus, the directional lock 704 retains the hook 404 in the inspection position 206 in response to the hook deployment assembly 210 moving in a direction from the deployed position 204 toward the stowed position 202. In the inspection position 206, the trapeze deployment assembly 208 is in the extended position 246 (e.g., the over-center position 626) and the cover 264 is in a partially open position. The inspection position 206 allows ground crew to inspect aspects of the hook 404 after a landing event. Specifically, the vertical actuator 242 in the first fully extended position 1002 via the trapeze deployment assembly 208, the VDA 252 in the second retracted position 804 via the hook deployment assembly 210, and/or the directional lock 704 supports the arresting hook system 102 in the inspection position 206. The directional lock 704 maintains or supports the hook 404 to prevent the hook 404 from lowering or moving toward the deployed position 204 during an inspection event.

FIG. 17A is a side view of the arresting hook system 102 shown in an example release position 1700. FIG. 17B is a partial, enlarged view of FIG. 17A. For example, the release position 1700 is provided when the arresting hook system 102 moves from the inspection position 206 to the stowed position 202. In the illustrated example, the VDA 252 is in the second retracted position 804 and the vertical actuator 242 is retracted from the first fully extended position 1002 toward the first retracted position 802. To move the arresting hook system 102 to the stowed position 202, the first piston 318 is retracted to impart a force 1702 (e.g., an upward force) to the trapeze plate 302 to cause, via the coupling 306, the aft body 304 to rotate in the second rotational direction 730 about the third pivot axis 220a. In turn, rotation of the aft body 304 in the second rotational direction 730 causes the fourth joint 222 to move toward the OML 262. In turn, the hook 404 moves in a forward direction 1704 toward the vertical actuator 242 along the roll axis 132. Additionally, the second cylinder 416 pivots in the second rotational direction 730 about the sixth pivot axis 226a. As a result, the guide 738 engages the rear surface 1506 (FIG. 17B) of the selector 718 and causes the selector 718 to rotate in the second rotational direction 730 about the selector pivot axis 732a to allow the guide 738 to exit the capture chamber 748 and/or disengage from the directional lock 704 (e.g., and to the release position 1700).

Figure 18:
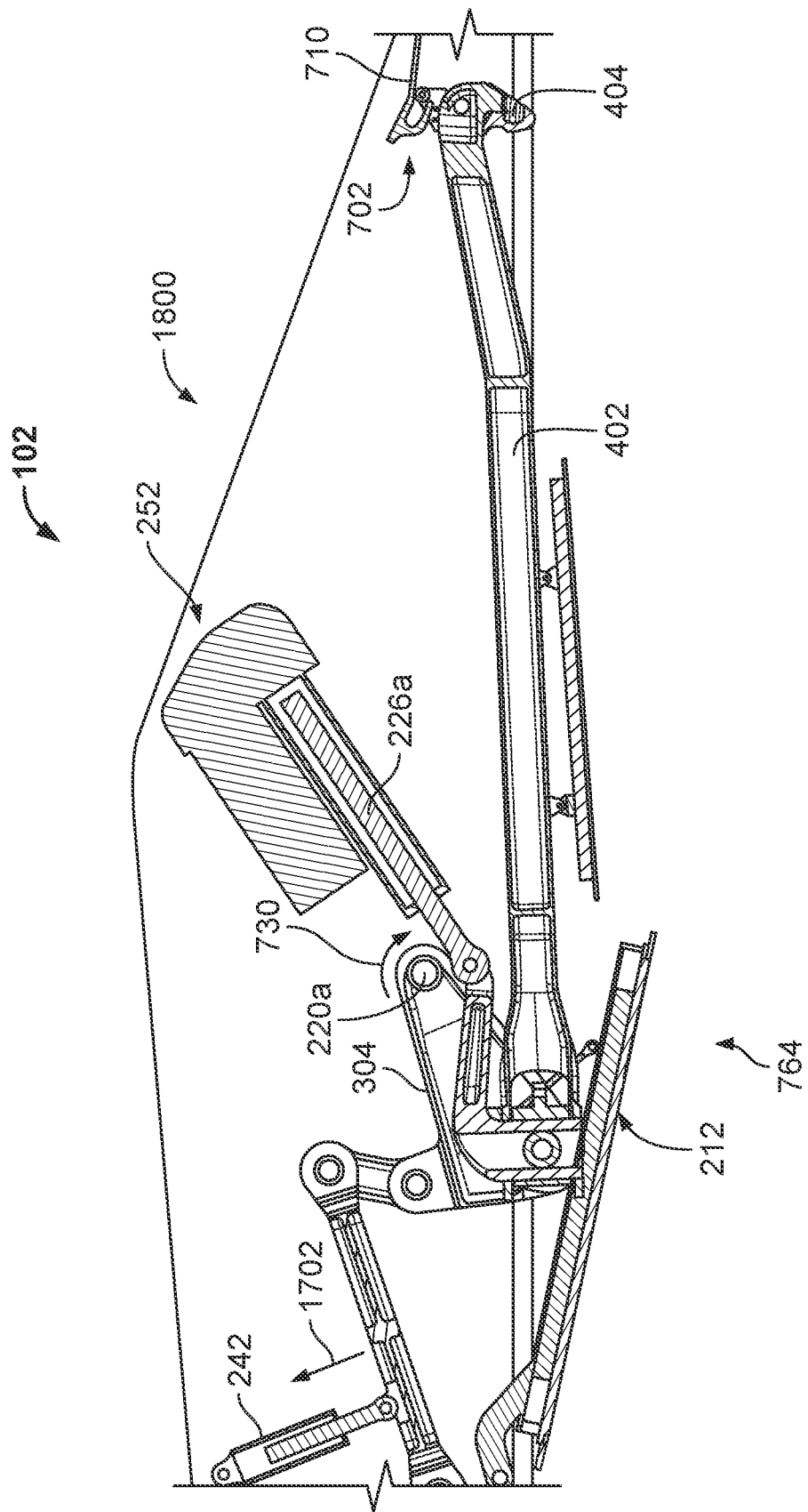
FIG. 18 is a side view of the example arresting hook system of FIGS. 2A-2C shown in another intermediate position 1800 between the example inspection position and the example stowed position 202.

FIG. 18 is a side view of the arrestment hook system 102 shown in another intermediate position 1800 between the inspection position 206 and the stowed position 202 as the vertical actuator 242 retracts toward first retracted position 802. As the vertical actuator 242 continues to retract to the first retracted position 802, the aft body 304 continues to rotate in the second rotational direction 730 about the third pivot axis 220a, thereby causing the pivot assembly 212 and/or the hook shank 402 to move toward the vertical actuator 242 along the roll axis 132 and causing the guide 738 to move along the track 710 toward the passive lock 702. Additionally, rotation of the aft body 304 in the second rotational direction 730 causes the cover 764 to move toward the cover closed position 278. Referring to FIG. 8A, upon retraction of the vertical actuator 242, the arrestment hook system 102 moves to the stowed position 202, the guide 738 is captured by the passive lock 702, and the cover 760 moves to the cover closed position 278.

Figure 19:
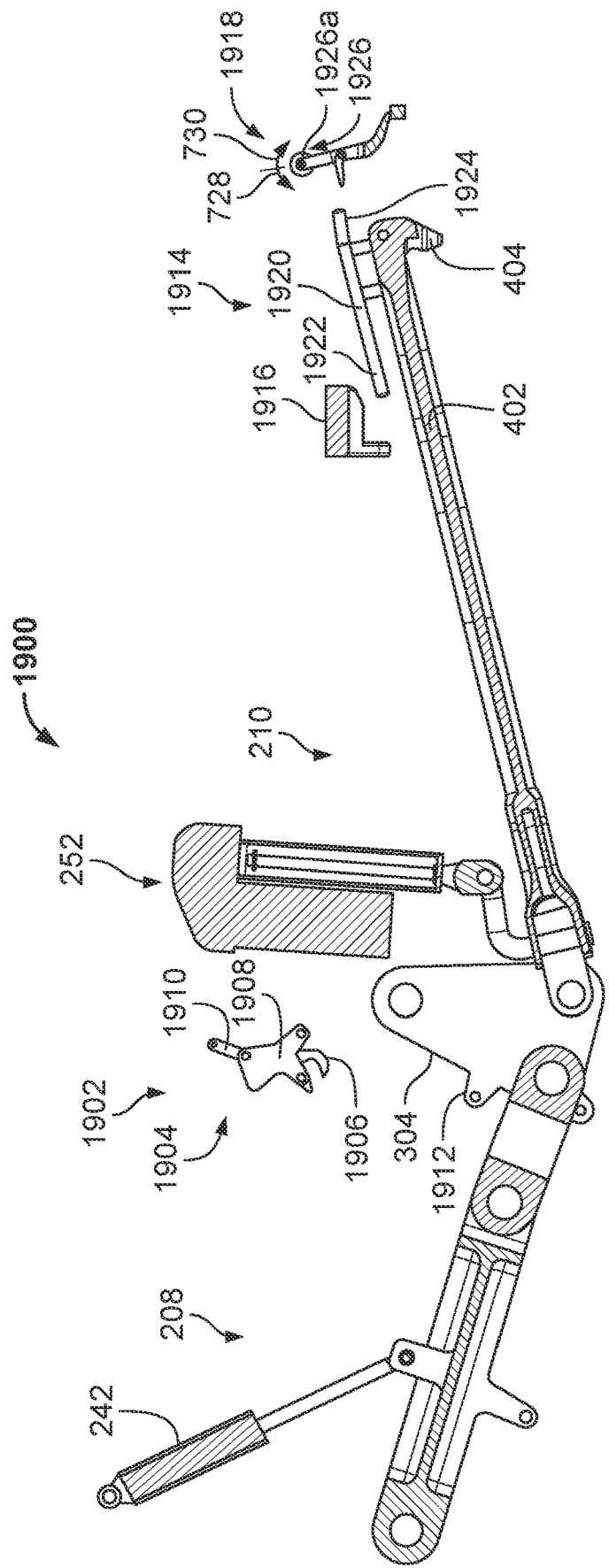
FIG. 19 is a side view of another example arresting hook system 1900 disclosed herein.

FIG. 19 is a side view of another example arresting hook system 1900 disclosed herein. Many of the components of the example arresting hook system 1900 are substantially similar or identical to the components described above in connection with the arresting hook system 102 of FIGS. 1-18. As such, those components will not be described in detail again below. Instead, the interested reader is referred to the above corresponding descriptions for a complete written description of the structure and operation of such components. To facilitate this process, similar or identical reference numbers will be used for like structures in FIGS. 19-25 as used in FIGS. 1-18. For example, the arresting hook system 1900 of the illustrated example includes a trapeze deployment assembly 208, a hook deployment assembly 210, a vertical actuator 242 and a VDA 252. The arresting hook system 1900 of the illustrated example includes the primary lock 1902. The primary lock 1902 (e.g., an uplock) includes a lock assembly 1904 that includes a hook 1906, a body 1908 and a release lever 1910. The hook 1906 engages a flange 1912 formed on an aft body 304 of the trapeze deployment assembly 208 when the arresting hook system 1900 is in a stowed position 202. To release the primary lock 1902, the release lever 1910 is pivoted relative to the body 1908 to cause the hook 1906 to release or disengage from the flange 1912 of the aft body 304. The release lever 1910 can be operated by a controller, an actuator, a cable, pull-cord, and/or any other suitable actuator.

Additionally, the arresting hook system 1900 of the illustrated example includes another lock assembly 1914. The lock assembly 1914 of the illustrated example includes a passive lock 1916 and a bypass or directional lock 1918 spaced from the passive lock 1916. A hook shank 402 of the illustrated example includes a guide 1920 to interact (e.g., engage) with the passive lock 1916 and the directional lock 1918. The guide 1920 of the illustrated example has a first portion or first end 1922 and a second portion or second end 1924 opposite the first end 1922. The first end 1922 is located upstream from a hook 404 of the hook shank 402 and the second end 1924 is located downstream of the hook 404. Stated differently, the first end 1922 is oriented toward the passive lock 1916 to interact with the passive lock 1916 and the second end 1924 is oriented toward the directional lock 1918 to interact with the directional lock 1918. The passive lock 1916 is fixed to a frame (e.g., the frame 230) of an aircraft (e.g., the aircraft 100 of FIG. 1). The directional lock 1918 is pivotally coupled to the frame 230 about a latch joint 1926 defining a latch pivot axis 1926a that enables the directional lock 1918 to rotate relative to the frame in a first rotational direction 728 and a second rotational direction 730.

Figure 20:
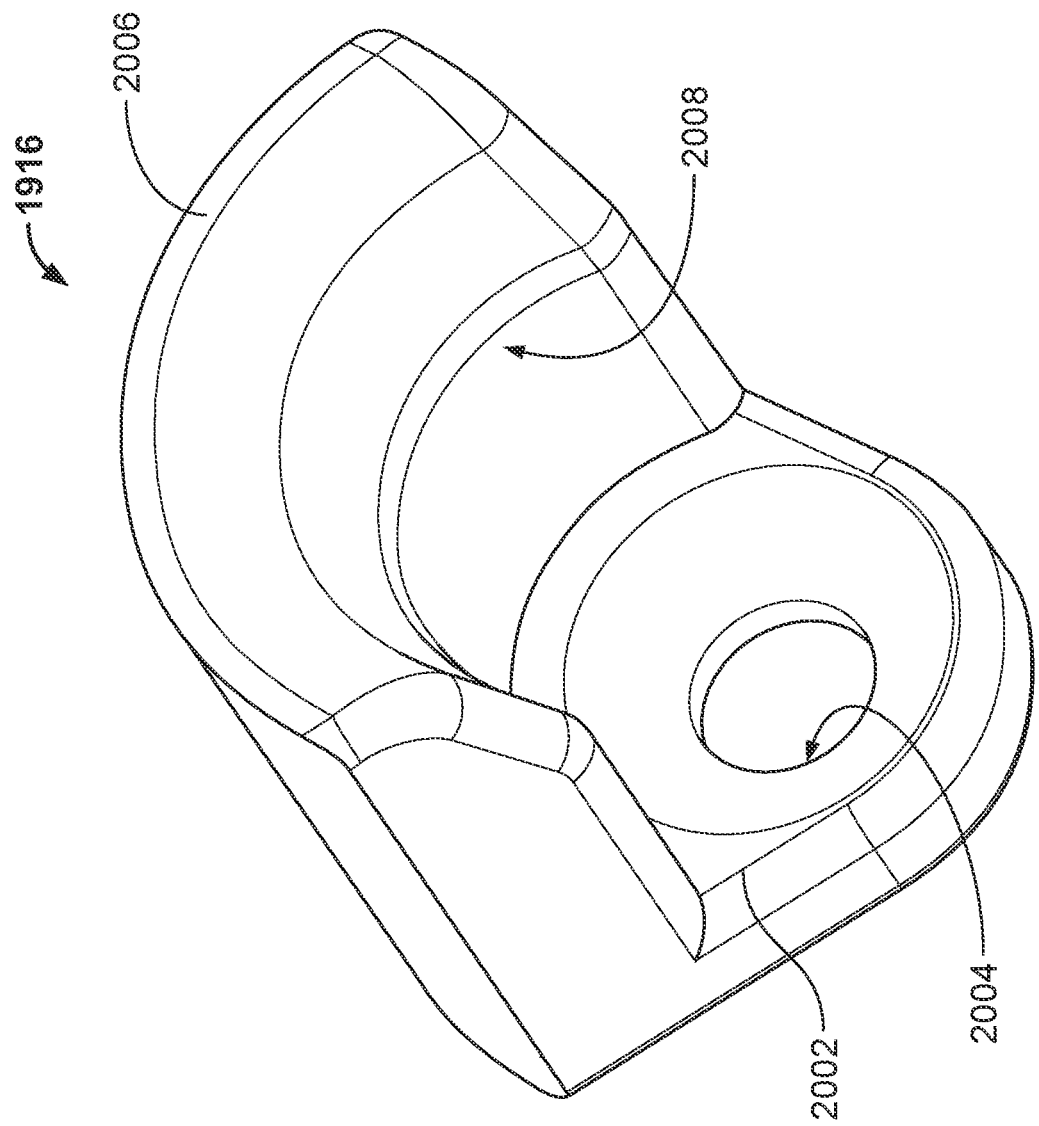
FIG. 20 is a perspective view of an example passive lock of the example arresting hook system of FIG. 19.

FIG. 20 is a perspective view of the passive lock 1916 of the example arresting hook system of FIG. 19. The passive lock 1916 of the illustrated example includes a base wall 2002 (e.g., a plate) defining a retainer aperture 2004. A guide wall 2006 (e.g., a partial or semi-annular wall) extends in a direction away from the base wall 2002 and defines a pocket 2008. The guide wall 2006 guides the first end 1922 of the guide 1920 toward the retainer aperture 2004.

Figure 21B:
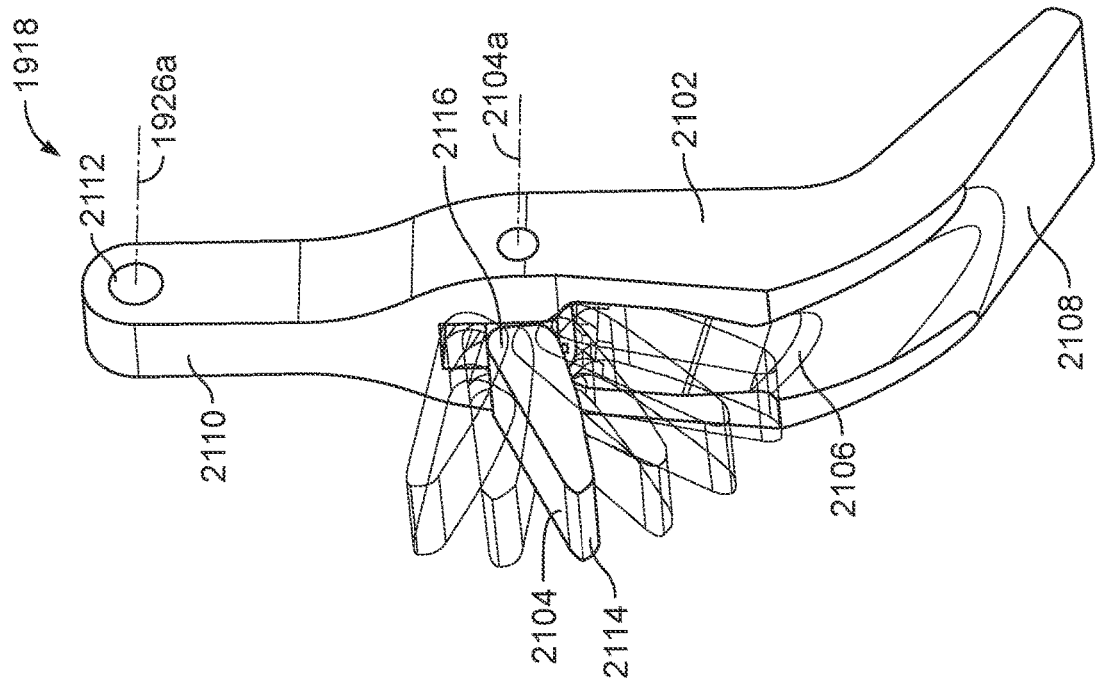
FIGS. 21A and 21B are perspective views of an example directional lock of the example arresting hook system of FIG. 19.
Figure 21A:
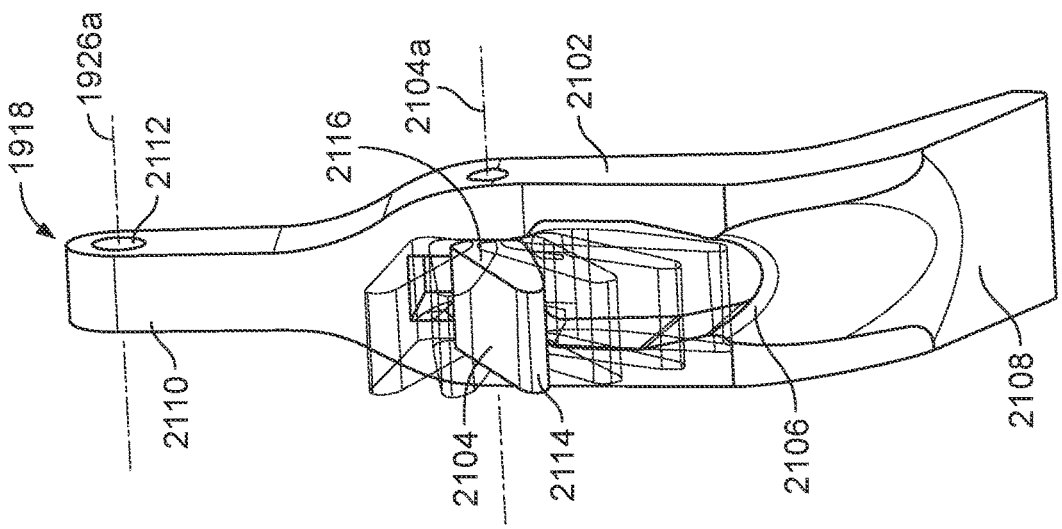

FIGS. 21A and 21B are perspective views of the directional lock 1918 of the example arresting hook system of FIG. 19. The directional lock 1918 of the illustrated example includes a latch body 2102 and a selector 2104. The latch body 2102 of the illustrated example includes a capture aperture 2106, a deflection region 2108 (e.g., a deflector), and a pivot region 2110 that defines a pivot aperture 2112 for pivotally coupling the directional lock 1918 to the frame 230. The pivot aperture 2112 defines the latch pivot axis 1926a of the latch joint 1926 of FIG. 19. The selector 2104 of the illustrated example is a flap 2114 (e.g., an arm) having a first end 2116 pivotally coupled to the latch body 2102. The selector 2104 pivots relative to the latch body 2102 about a selector pivot axis 2104a to cover or block the capture aperture 2106 and uncover the capture aperture 2106. Although not shown, the selector 2104 includes a biasing element (e.g., a torsion spring) to bias the selector 2104 in a direction away from the capture aperture 2106.

Figure 22A:
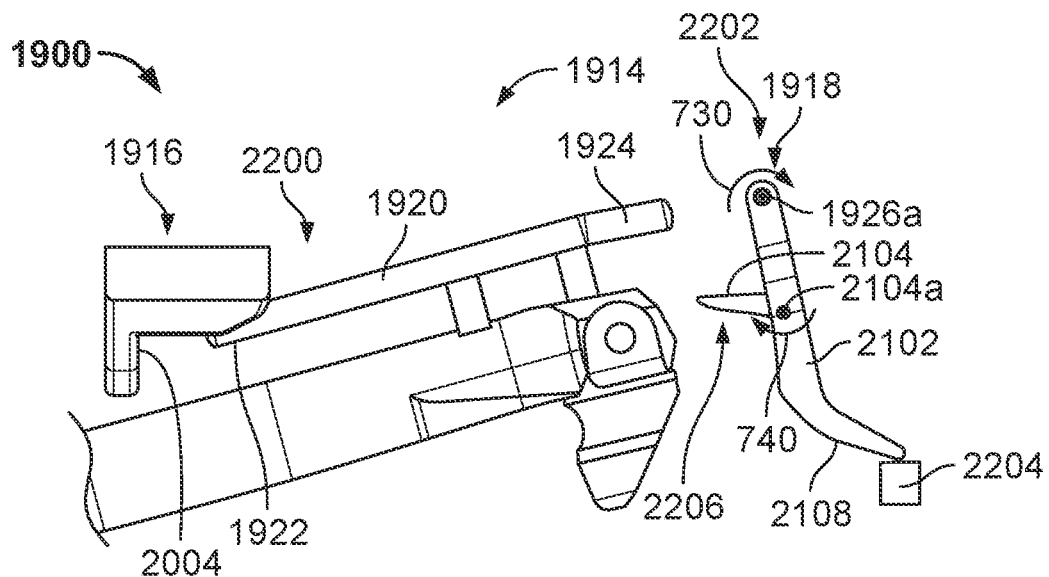
FIGS. 22A-22D are side views of the example arresting hook system of FIG. 19 at different positions as the example arresting hook system moves from an example stowed position toward an example deployed position.

FIGS. 22A-22D are side views of the arresting hook system 1900 of FIG. 19 at different positions when the arresting hook system 1900 moves from a stowed position 202 toward a deployed position 204. Referring to FIG. 22A, the vertical actuator 242 is actuated from a first retracted position 802 (FIG. 8A) toward a first fully extended position 1002 (FIG. 10A) to cause the hook shank 402 of the illustrated example to move aft along the roll axis 132 toward the directional lock 1918. In turn, the guide 1920 moves in a direction from the passive lock 1916 toward the directional lock 1918. For example, FIG. 22A illustrates the guide 1920 in a first position 2200 in which the first end 1922 of the guide 1920 is removed from the retainer aperture 2004 of the passive lock 1916. The directional lock 1918 is in an initial position 2202. In the initial position 2202, the latch body 2102 is biased in the second rotational direction 730 to cause the deflection region 2108 to engage a stop 2204 of the frame. Additionally, the flap 2114 is in a non-blocking position 2206. Specifically, a spring biases the selector 2104 in the second rotational direction 730 about the selector pivot axis 2104a to the non-blocking position 2206 to expose the capture aperture 2106 (FIG. 21A).

Figure 22B:
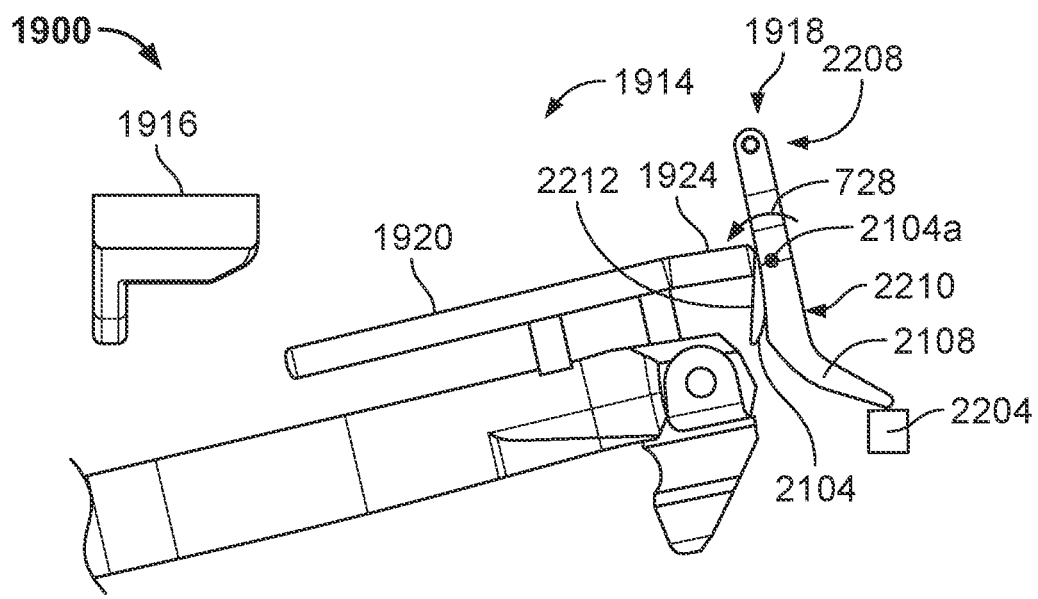

Referring to FIG. 22B, as the vertical actuator 242 extends toward the first fully extended position 1002 (FIG. 10A), the directional lock 1918 moves to a bypass position 2208. Specifically, in the bypass position 2208, the flap 2114 is in a blocking position 2210. In particular, as the hook shank 402 moves toward the directional lock 1918 as the vertical actuator 242 is actuated toward the first fully extended position 1002, the second end 1924 of the guide 1920 engages a first surface 2212 of the selector 2104 to cause the selector 2104 to pivot against a spring force in the first rotational direction 728 about the selector pivot axis 2104a. In the blocking position 2210, the selector 2104 prevents or restricts access to the capture aperture 2106 of the latch body 2102. As a result, the guide 1920 bypasses the directional lock 1918.

Figure 22C:
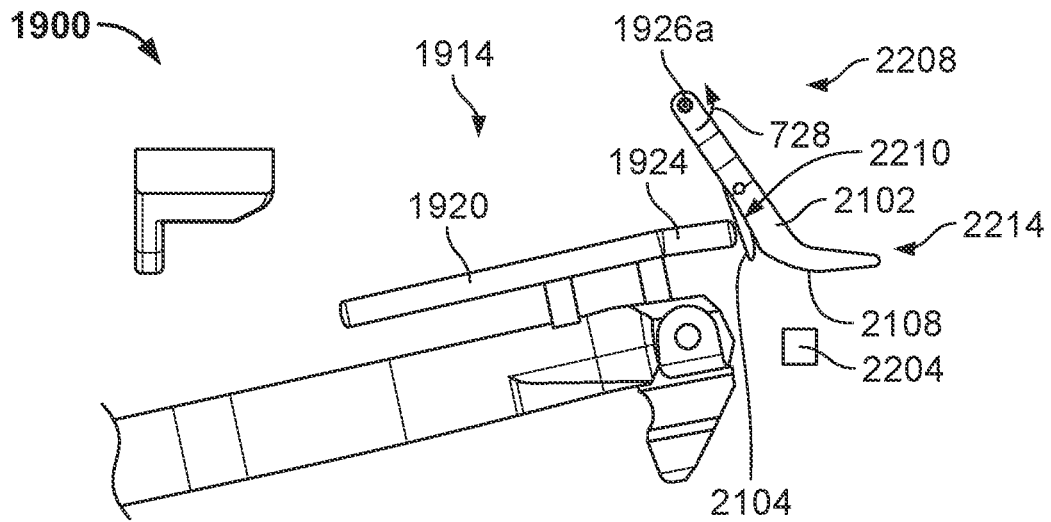

Referring to FIG. 22C, to continue movement of the arresting hook system 1900 from the bypass position 2208 of FIG. 22B to the deployed position 204, the VDA 252 is actuated from the second retracted position 804 toward the second fully extended position 1202 (FIG. 12A) to move the hook shank 402 and, thus, the hook 404 from the bypass position 2208 of FIG. 22B to the deployed position 204. To prevent interference between the directional lock 1918 and the guide 1920 when the directional lock 1918 is in the bypass position 2208, the guide 1920 causes the latch body 2102 to pivot about the latch pivot axis 1926a in the first rotational direction 728 to a deflection position 2214 such that the deflection region 2108 moves away or disengages from the stop 2204.

Figure 22D:
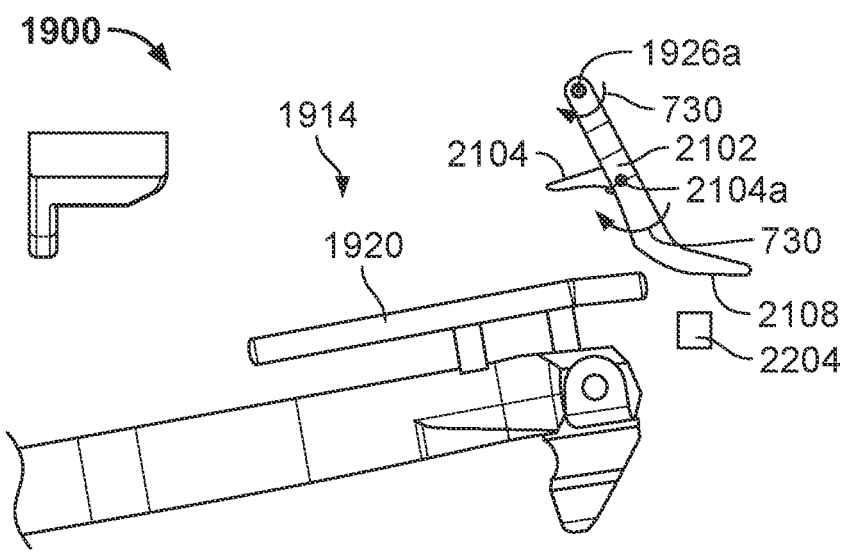

As shown in FIG. 22D, as the guide 1920 releases the flap 2114 and/or the latch body 2102, the selector 2104 rotates in the second rotational direction 730 about the selector pivot axis 2104a and the latch body 2102 rotates in the second rotational direction 730 about the latch pivot axis 1926a until the deflection region 2108 engages the stop 2204 (see FIG. 22A). In other words, the directional lock 1918 returns to the initial position 2202 of FIG. 22A after the guide 1920 bypasses the directional lock 1918.

Figure 23A:
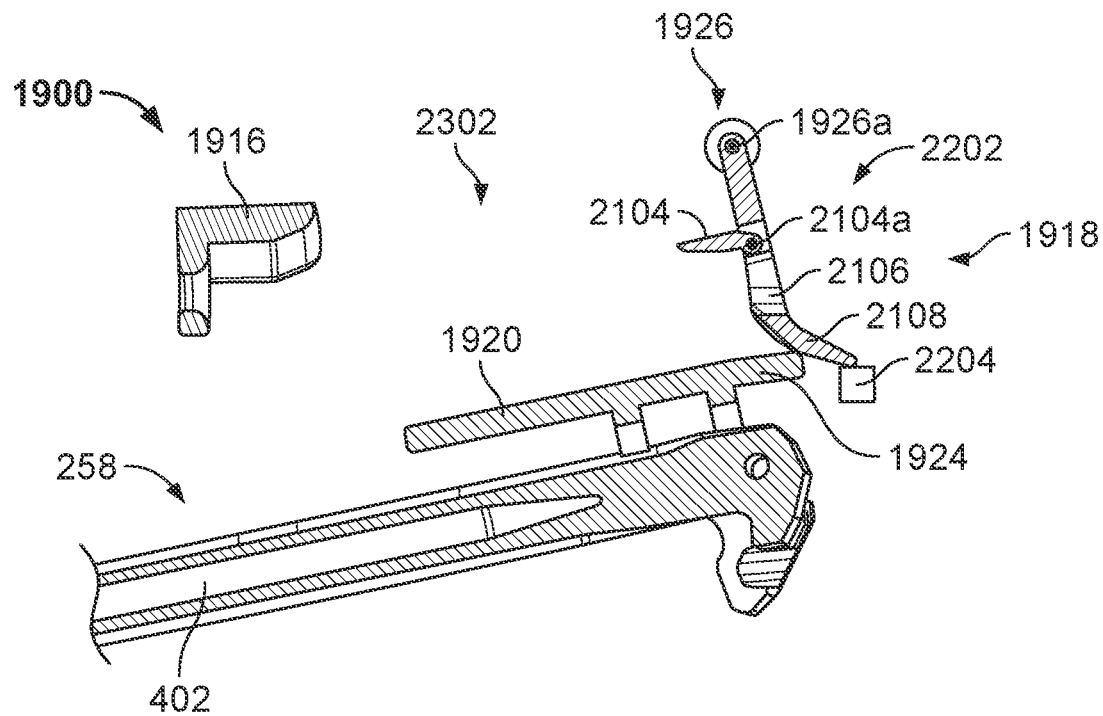
FIGS. 23A and 23B are partial side views of the example arresting hook system shown in example intermediate positions in response to the example arresting hook system moving from the example deployed position toward the example stowed position after an arrestment event.
Figure 23B:
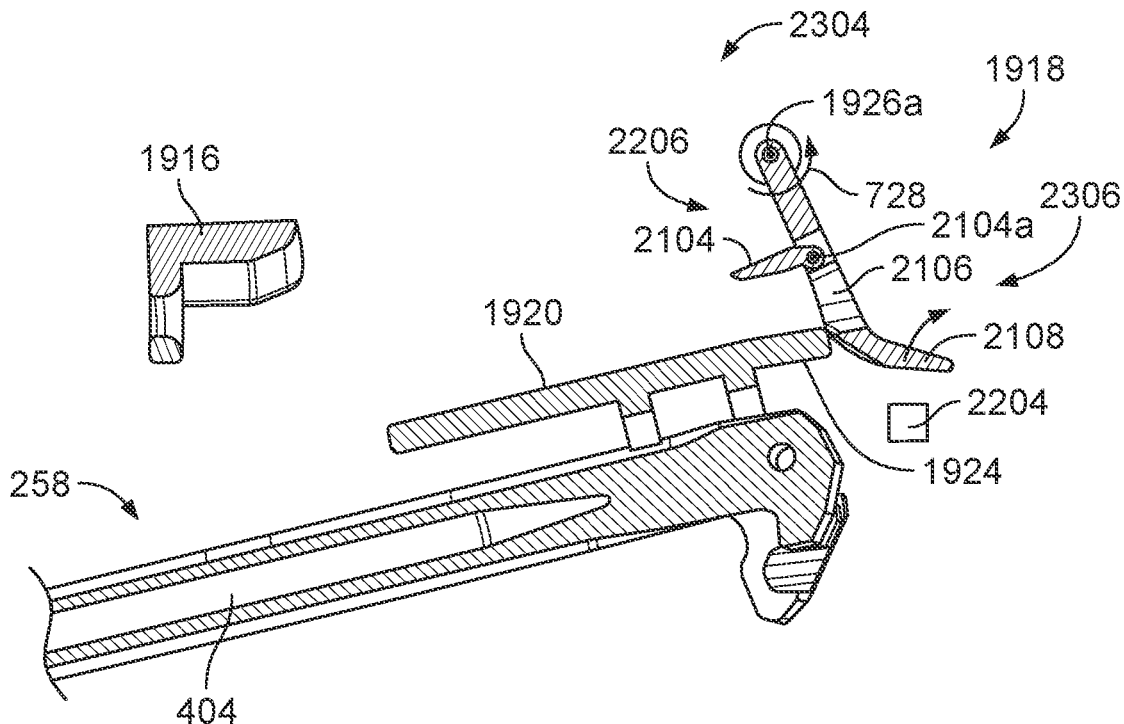

FIGS. 23A and 23B are partial side views of the arresting hook system 1900 of FIG. 19 shown at intermediate positions 2302 and 2304 as the arresting hook system 1900 moves from the deployed position 204 toward the stowed position 202 after an arrestment event. In other words, the intermediate positions 2302 and 2304 are positions of a return path in which the VDA 252 retracts from the second fully extended position 1202 to the second retracted position 804. As the hook deployment assembly 210 moves to the non-engagement intermediate position 258, the guide 1920 engages the directional lock 1918. In particular, the second end 1924 of the guide 1920 engages the deflection region 2108 of the latch body 2102 to cause the latch body 2102 to pivot or rotate in the first rotational direction 728 about the latch pivot axis 1926a from the initial position 2202 of FIG. 23A to a deflected position 2306 of FIG. 23B. In other words, the latch body 2102 moves about the latch pivot axis 1926a in the first rotational direction 728 to cause the deflection region 2108 (e.g., an end of the latch body 2102 opposite the latch pivot axis 1926a) to move away from the stop 2204. The selector 2104 remains in the non-blocking position 2206.

Figure 24:
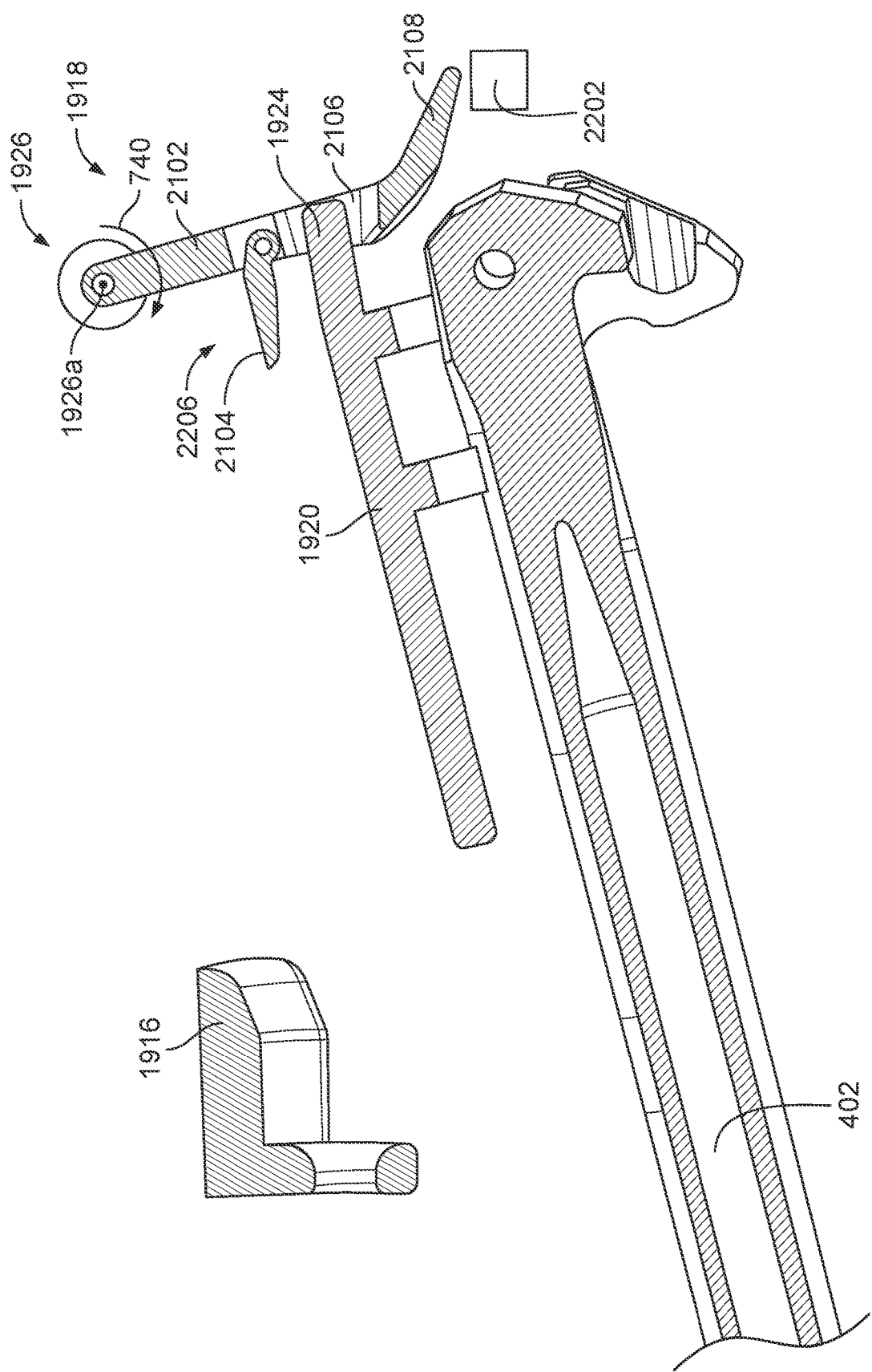
FIG. 24 is a partial side view of the example arresting hook system of FIG. 19 shown in an example inspection position.

FIG. 24 is a partial side view of the arresting hook system 1900 of FIG. 19 shown in an inspection position 206. In the inspection position 206, the VDA 252 is in the second retracted position 804 and the vertical actuator 242 is in the first fully extended position 1002. As the VDA 252 moves to the second retracted position 804, the second end 1924 of the guide 1920 moves into the capture aperture 2106 of the latch body 2102. A biasing element of the latch joint 1926 causes the latch body 2102 to pivot in the second rotational direction 730 about the latch pivot axis 1926a until the deflection region 2108 engages the stop 2204. The selector 2104 is biased toward the non-blocking position 2206 about the selector pivot axis 2104a and, thus, does not interfere (e.g., engage) with the guide 1920.

Figure 25:
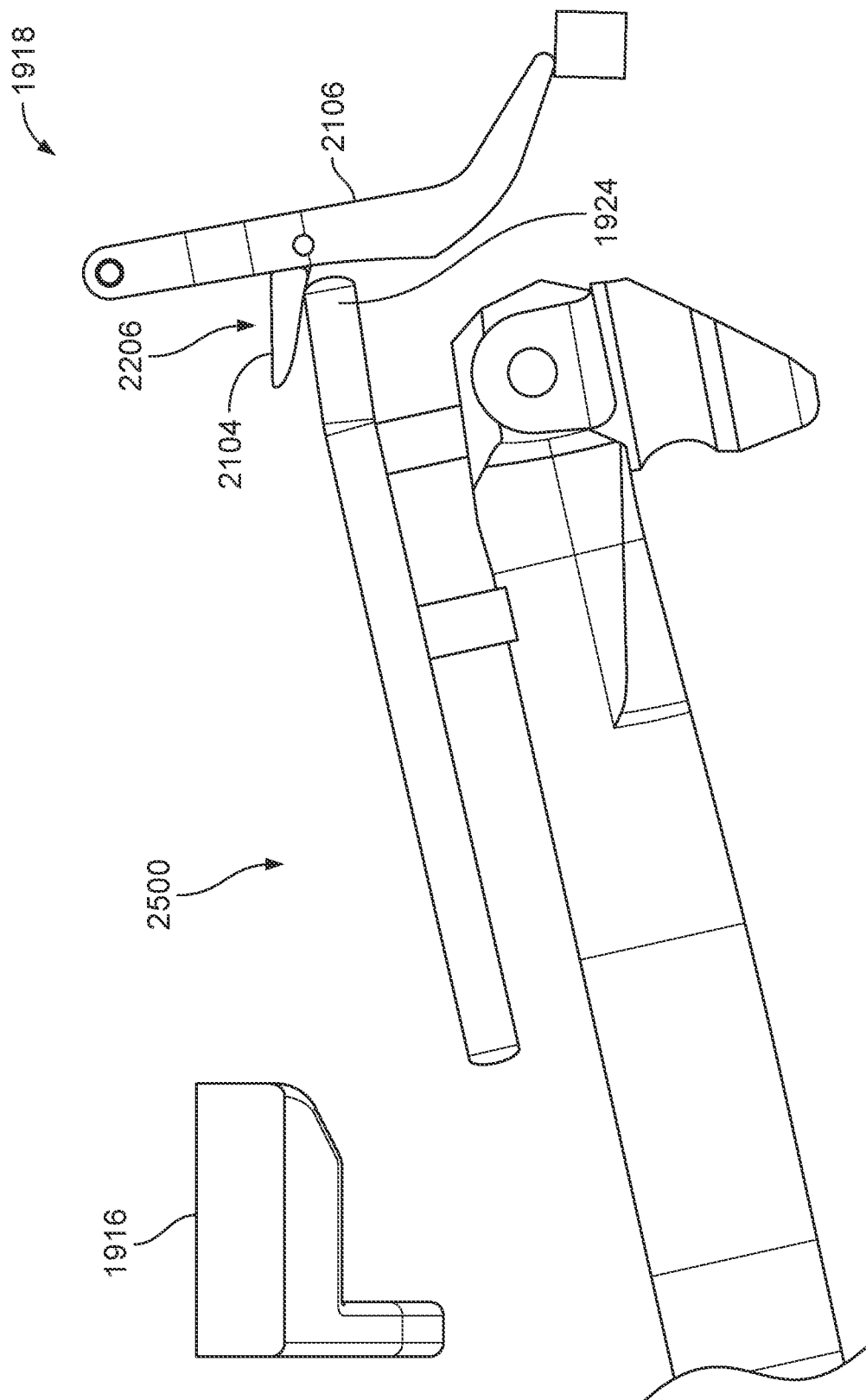
FIG. 25 is a partial side view of the example arresting hook system of FIG. 19 shown in an example intermediate position between the example inspection position and the example stowed position.

FIG. 25 is a partial side view of the arresting hook system 1900 of FIG. 19 shown in an intermediate position 2500 as the arresting hook system 1900 moves from the inspection position 206 toward the stowed position 202. To remove the guide 1920 from the capture aperture 2106, the vertical actuator 242 is moved from the first fully extended position 1002 toward the first retracted position 802. In response, the second end 1924 of the guide 1920 disengages or removes from the capture aperture 2106. The selector 2104 is biased via a spring toward the non-blocking position 2206 and does not interfere (e.g., engage) with the guide 1920 as the guide 1920 withdraws from the capture aperture 2106 and moves toward the passive lock 1916.

Figure 26:
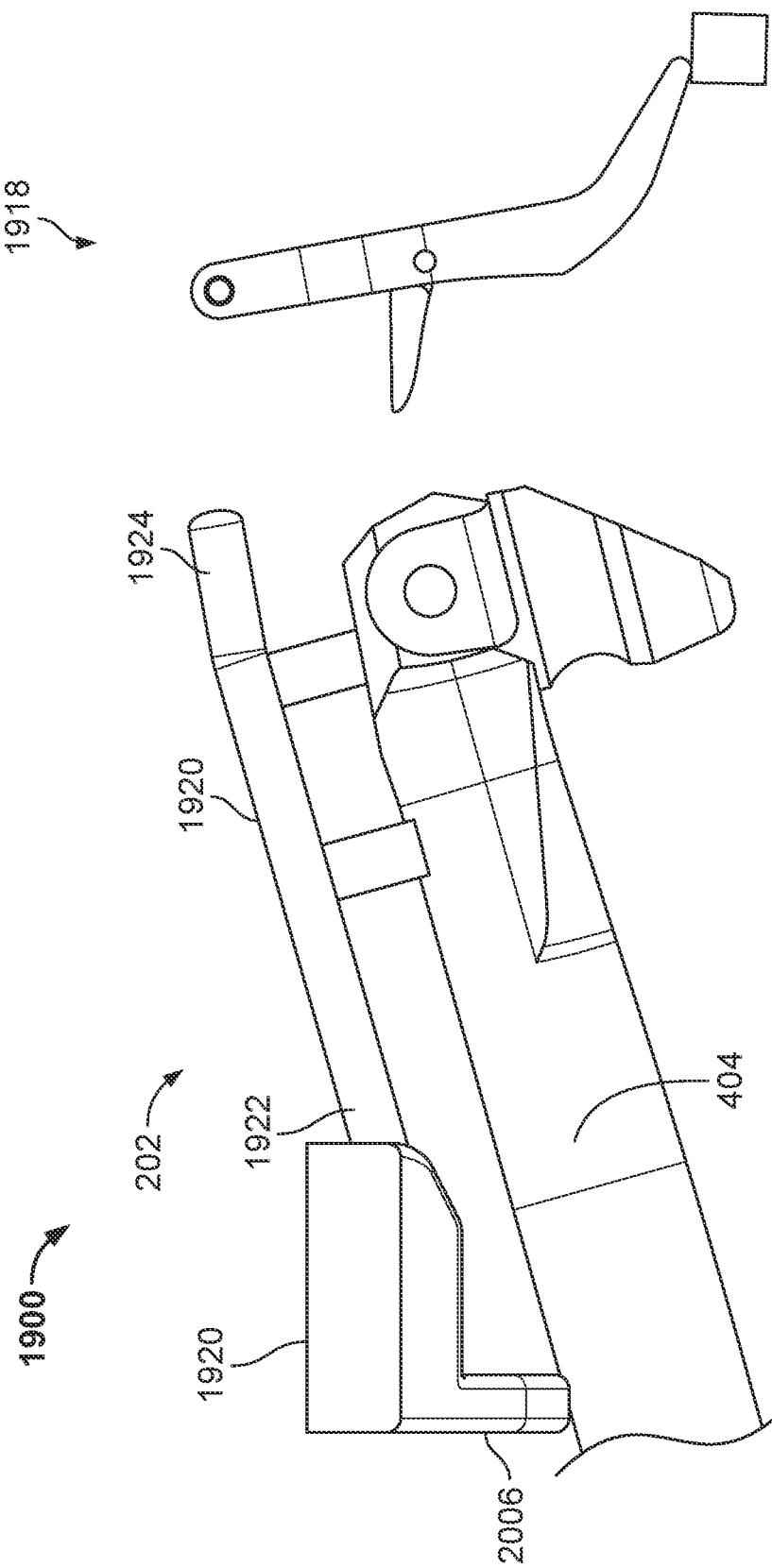
FIG. 26 is a partial side view of the example arresting hook system of FIG. 19 shown in the example stowed position.

FIG. 26 is a partial side view of the arresting hook system 1900 of FIG. 19 shown in the stowed position 202. In the stowed position 202, the vertical actuator 242 is retracted to the first retracted position 802, which causes the hook shank 402 (e.g., via the pivot assembly 212) to move forward along the roll axis 132. The first end 1922 of the guide 1920 is positioned in the retainer aperture 2004 of the passive lock 1916.

Although each example arrestment hook systems disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Example methods, apparatus, systems, and articles of manufacture to implement arrestment hook systems are disclosed herein. Further examples and combinations thereof include the following:

Example 1 includes a pivot assembly for use with an arresting hook, the pivot assembly comprising a coupler having a first opening defining a first axis and a second opening defining a second axis, the first opening transverse relative to the second opening, a linkage arm having a body and an arm, the body including a third opening defining a third axis, the first opening of the coupler to receive the body of the linkage arm such that the second opening of the coupler coaxially aligns with the third opening of linkage arm, and a pin to extend through the second opening and the third opening to couple the coupler and the linkage arm.

Example 2 includes the pivot assembly of example 1, wherein the arm extends rearward of the body.

Example 3 includes the pivot assembly of any of examples 1-2, wherein an end of the arm opposite the body includes a clevis.

Example 4 includes the pivot assembly of any of examples 1-3, wherein the clevis defines a fourth opening defining a fourth axis, wherein the third axis of the third opening is parallel relative to the fourth axis of the fourth opening.

Example 5 includes the pivot assembly of any of examples 1-4, wherein the fourth opening is spaced from the third opening by a distance defined by a length of the arm.

Example 6 includes a pivot assembly for use with an arresting hook system, the pivot assembly comprising a coupler to couple to a clevis of a hook shank, a linkage arm having a shaft and an arm, the shaft to extend through the clevis of the hook shank and the coupler, the arm to extend at angle relative to the shaft, and a pin to extend through the coupler and the shaft of the linkage arm, the pin to couple the coupler and the linkage arm, an axis of the pin to intersect a longitudinal axis of the shaft when the pin is coupled to the coupler and the linkage arm.

Example 7 includes the pivot assembly of example 6, wherein the coupler includes a first bore defining the longitudinal axis, the first bore to receive the shaft of the linkage arm.

Example 8 includes the pivot assembly of any of examples 6-7, wherein the coupler includes a second bore to receive the pin, the second bore being transverse relative to the longitudinal axis of the coupler.

Example 9 includes the pivot assembly of any of examples 6-8, wherein the shaft includes a third bore, the third bore aligning with the second bore when the shaft is positioned in the coupler.

Example 10 includes the pivot assembly of any of examples 6-9, wherein the pin at least one of restricts or prevents lateral and rotational movement of the linkage arm relative to the coupler along the longitudinal axis.

Example 11 includes the pivot assembly of any of examples 6-10, wherein the arm of the linkage arm includes a connector to couple to a piston of a vertical damper actuator of the arresting hook system.

Example 12 includes the pivot assembly of any of examples 6-11, wherein the coupler is to pivotally couple the arresting hook shank and a trapeze of the arresting hook system.

Example 13 includes an arresting hook system comprising a trapeze assembly, the trapeze assembly including a pivot plate, a hook assembly including a hook and a hook shank to support the hook, the hook shank including a clevis opposite the hook, and a pivot assembly to couple the trapeze assembly and the hook assembly, the pivot assembly including a coupler positioned in the clevis of the hook shank, a linkage arm having a shaft and an arm extending rearward of the shaft, the shaft positioned in an opening of the clevis of the hook shank and a first opening of the coupler, and a pin to couple the coupler and the shaft of the linkage arm, the pin defining a lateral pivot axis that intersects a vertical pivot of the shaft of the linkage arm.

Example 14 includes the arresting hook system of example 13, wherein the pin is positioned in a second opening of the coupler and a third opening of the shaft that aligns with the second opening when the shaft is positioned in the first opening of the coupler.

Example 15 includes the arresting hook system of any of examples 13-14, wherein the pin is perpendicular relative to a longitudinal axis of the shaft.

Example 16 includes the arresting hook system of any of examples 13-15, wherein the arm includes a second clevis at an end of the arm.

Example 17 includes the arresting hook system of any of examples 13-16, wherein the second clevis is to receive a rod end of a vertical damping actuator of the arresting system.

Example 18 includes the arresting hook system of any of examples 13-17, wherein the coupler includes a cam surface to engage a lateral damper of the arresting system.

Example 19 includes the arresting hook system of any of examples 13-18, wherein the pin couples the hook shank and the pivot plate of the trapeze assembly.

Example 20 includes the arresting hook system of any of examples 13-19, wherein the pin includes retainers at respective ends of the pin, the retainers to engage respective sides of the pivot plate of the trapeze assembly.

Example 21 includes a locking assembly for an arresting hook system comprising a track coupled to a frame of an aircraft, the track including a forward end and an aft end opposite the forward end, the track including a first lock positioned at the forward end and a second lock positioned at the aft end, and a guide coupled to a hook shank of the arresting hook system, the guide to move along at least a portion of the track, the guide to engage the first lock when the hook shank is in a stowed position, the guide to bypass the second lock as the hook shank moves from the stowed position to a deployed position.

Example 22 includes the locking assembly of example 21, wherein the guide is to engage the second lock as the hook shank moves from the deployed position to the stowed position, the hook shank to be in an intermediate position when the guide engages the second lock, the intermediate position between the stowed position and the deployed position.

Example 23 includes the locking assembly of any of examples 21-22, wherein the first lock includes a capture hook at the forward end of the track.

Example 24 includes the locking assembly of any of examples 21-23, wherein the second lock is a directional lock.

Example 25 includes the locking assembly of any of examples 21-24, wherein the second lock includes a spring latch and a selector.

Example 26 includes the locking assembly of any of examples 21-25, wherein the spring latch is coupled to the frame of the aircraft, the spring latch to rotate relative to the frame about a first latch joint.

Example 27 includes the locking assembly of any of examples 21-26, wherein the selector is coupled to the track, the selector to rotate relative to the track about a selector joint different than the first latch joint.

Example 28 includes the locking assembly of any of examples 21-27, wherein the guide includes a roller and a bracket, the roller coupled to a hook shank of the arresting hook system via the bracket.

Example 29 includes an arresting hook system for an aircraft comprising a trapeze deployment assembly, a hook deployment assembly including a hook shank and a hook, the hook deployment assembly pivotally coupled to the trapeze deployment assembly, and a locking assembly coupled to a frame of the aircraft, the locking assembly including a passive lock and a directional lock, the passive lock to retain the hook when the hook deployment assembly is in a stowed position, the directional lock to enable the hook to bypass the directional lock when the hook deployment assembly moves from the stowed position to a deployed position, the directional lock to retain the hook of the hook deployment assembly in an intermediate position when the hook deployment assembly moves from the deployed position to the stowed position.

Example 30 includes the arresting hook system of example 29, wherein the locking assembly includes a track defining a length between a first end and a second end opposite the first end, the passive lock positioned at the first end, the directional lock positioned at the second end.

Example 31 includes the arresting hook system of any of examples 29-30, wherein the passive lock and the directional lock are positioned in a travel path of the hook, the travel path being along the track between the first end and the second end.

Example 32 includes the arresting hook system of any of examples 29-31, wherein the passive lock includes a pocket positioned in the travel path, the pocket oriented toward the directional lock.

Example 33 includes the arresting hook system of any of examples 29-32, wherein the directional lock includes a selector and a latch, the selector coupled to rotate relative to the track, the selector to rotate to a blocking position based on movement of the hook from the stowed position to the deployed position, the selector to prevent the latch from capturing the hook when the selector is in the blocking position.

Example 34 includes the arresting hook system of any of examples 29-33, wherein the hook shank includes a roller, the passive lock to engage the roller when the hook deployment assembly moves into the stowed position, the directional lock to engage the roller when the hook deployment assembly moves into an intermediate position from the deployed position, the intermediate position between the stowed position and the deployed position.

Example 35 includes an aircraft comprising an arresting hook system including a trapeze deployment assembly, a hook deployment assembly including a hook coupled to a hook shank, the hook shank including a roller, a pivot assembly to pivotally couple the trapeze deployment assembly and the hook deployment assembly, and a dual lock coupled to a frame of the aircraft, the dual lock including a track defining a first end and a second end opposite the first end, the dual lock including a passive lock positioned at the first end and a directional lock positioned at the second end, the passive lock including a pocket to receive the roller when the arresting hook system is in a stowed position, the roller to bypass the directional lock when the arresting hook system moves from the stowed position to a deployed position, the direction lock to capture the roller when the arresting hook system moves from the deployed position toward the stowed position, the directional lock to capture the roller when the arresting hook system is in an inspection position prior to the hook moving to the stowed position.

Example 36 includes the aircraft of example 35, wherein the directional lock includes a latch and a selector, the latch coupled to a spring, the selector coupled to a spring hinge.

Example 37 includes the aircraft of any of examples 35-36, wherein the latch is pivotally coupled to the frame of the aircraft about a first pivot axis, the spring to bias the latch in a first direction about the first pivot axis, the first direction relative to the frame of the aircraft.

Example 38 includes the aircraft of any of examples 35-37, wherein the selector is pivotally coupled to the track about a second pivot axis different than the first pivot axis, the spring hinge to bias the selector in the first direction about the second pivot axis and toward the latch.

Example 39 includes the aircraft of any of examples 35-38, wherein the latch is to move in a second direction about the first pivot axis when the arresting hook system moves from the deployed position toward the stowed position, the second direction opposite the first direction.

Example 40 includes the aircraft of any of examples 35-39, wherein the selector is to move in the second direction about the second pivot axis to move the arresting hook system from the inspection position to the stowed position.

Example 41 includes an arresting hook system for an aircraft, the arresting hook system comprising a linkage assembly defining a trapeze deployment assembly of the arresting hook system, the linkage assembly including a forward body defining a first joint and a second joint opposite the first joint, the forward body longitudinally extending between the first joint and the second joint, the forward body pivotally coupled to a frame of the aircraft via the first joint, an aft body defining a third joint, a fourth joint, and a primary pivot joint, the aft body pivotally coupled to the frame via the third joint, and a coupling assembly pivotally coupled to the second joint of the forward body and the fourth joint of the aft body, movement of the forward body to cause movement of the aft body via the coupling assembly, a pivot assembly to pivotally couple a hook shank to the primary pivot joint of the aft body, a vertical actuator coupled to the forward body and the frame of the aircraft, the vertical actuator to move the arresting hook system between a stowed position and an intermediate position, and a vertical damper actuator (VDA) including a cylinder and a piston, the cylinder pivotally coupled to the frame of the aircraft via a VDA pivot joint, the VDA to rotate relative to the frame of the aircraft, the piston having an end operatively coupled to the pivot assembly, the VDA to move the arresting hook system between the intermediate position and a deployed position.

Example 42 includes the arresting hook system of example 41, wherein the pivot assembly includes a coupler and a linkage arm extending rearward from the coupler.

Example 43 includes the arresting hook system of any of examples 41-42, wherein the coupler couples the hook shank to the primary pivot joint of the aft body and the linkage arm couples to the end of the piston of the VDA via a clevis joint, the end of the piston and the linkage arm defining the clevis joint.

Example 44 includes the arresting hook system of any of examples 41-43, wherein the linkage assembly defines a first bar linkage including a first forward link between the first joint and the second joint, a first coupler link between the second joint of the forward body and the fourth joint of the aft body, a first aft link between the fourth joint of the aft body and the third joint of the aft body, and a first ground link between the third joint of the aft body and the first joint of the forward body.

Example 45 includes the arresting hook system of any of examples 41-44, wherein the pivot assembly, the aft body, and the VDA define a second bar linkage.

Example 46 includes the arresting hook system of any of examples 41-45, wherein the second bar linkage includes a second forward link between the third joint and the primary pivot joint, a second coupler link between the primary pivot joint and the clevis joint of the linkage arm, a second aft link between the clevis joint and the VDA pivot joint, and a second ground link between the third joint of the first aft link and the VDA pivot joint.

Example 47 includes the arresting hook system of any of examples 41-46, wherein the vertical actuator is to move the first bar linkage to an on-center alignment, wherein the first forward link and the first coupler link are aligned when the first bar linkage is in the on-center alignment.

Example 48 includes the arresting hook system of any of examples 41-47, wherein the VDA is to move the arresting hook system after the vertical actuator moves the first bar linkage to the on-center alignment.

Example 49 includes the arresting hook system of any of examples 41-48, wherein the pivot assembly is to nest within the aft body when the arresting hook system is in the stowed position.

Example 50 includes the arresting hook system of any of examples 41-49, wherein the second bar linkage defines a transmission angle between the second coupler link and the second aft link.

Example 51 includes the arresting hook system of any of examples 41-50, wherein the transmission angle is between 40 and 50 degrees when the arresting hook system in in the deployed position.

Example 52 includes the arresting hook system of any of examples 41-51, wherein the transmission angle is between 145 and 155 degrees when the arresting hook system is in the intermediate position.

Example 53 includes the arresting hook system of any of examples 41-52, wherein the VDA is pivotally coupled to the frame of the aircraft via a trunnion, the cylinder having a length, the trunnion positioned along the length of the cylinder.

Example 54 includes an arresting hook apparatus to be stowed within an outer mold line of an aircraft, the arresting hook apparatus comprising a trapeze deployment assembly including a vertical actuator to move the trapeze deployment assembly between a stowed position and an intermediate position, and a hook deployment assembly including a vertical damper actuator (VDA) and a hook, the VDA pivotally coupled to a primary structure of the aircraft via a trunnion, the VDA to move the hook deployment assembly between the intermediate position and a deployed position, the VDA to dampen arrestment loads when the hook deployment assembly is in the deployed position.

Example 55 includes the arresting hook apparatus of example 54, wherein the trapeze deployment assembly defines a first bar linkage including a first forward link, a first coupler link, a first aft link, and a first ground link.

Example 56 includes the arresting hook apparatus of any of examples 54-55, wherein the hook deployment assembly defines a second bar linkage including a second forward link, a second coupler link, a second aft link, and a second ground link.

Example 57 includes the arresting hook apparatus of any of examples 54-56, wherein the trapeze deployment assembly includes an aft body defining the first aft link of the first bar linkage and the second forward link of the second bar linkage, the first aft link and the second forward link rotatably interlocked via the aft body.

Example 58 includes the arresting hook apparatus of any of examples 54-57, wherein the VDA includes a piston disposed within a cylinder having a length, the trunnion positioned adjacent to a midpoint of the length.

Example 59 includes an aircraft comprising an arresting hook system disposed within an outer mold line of the aircraft when the arresting hook system is in a stowed position, the arresting hook system disposed at least partially outside of the outer mold line when the arresting hook system is in at least one of an intermediate position or a deployed position, the arresting hook system including a hook shank having a first end and a second end opposite the first end, a hook coupled to the first end of the hook shank, a linkage assembly including a forward body, a coupling body, and an aft body, the second end of the hook shank coupled to the aft body via a primary pivot joint, the forward body aligned with the coupling when the arresting hook system is in the intermediate position and the deployed position, a vertical actuator coupled to a frame of the aircraft and the forward body to deploy the arresting hook system between the stowed position and the intermediate position, and a vertical damper actuator pivotally coupled to the frame of the aircraft via a trunnion, the vertical damper actuator to deploy the arresting hook system between the intermediate position and the deployed position.

Example 60 includes the aircraft of example 59, wherein a first position of the primary pivot joint associated with the stowed position is forward of a second position of the primary pivot joint associated with the intermediate position.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A pivot assembly for use with an arresting hook, the pivot assembly comprising:
   a coupler having a first body including a first bore defining a first axis and a second bore defining a second axis, the first opening transverse relative to the second opening;
   a linkage arm having a second body and an arm, the second body including a third bore defining a third axis, the first bore of the coupler to receive the second body of the linkage arm such that the second bore of the coupler coaxially aligns with the third bore of linkage arm; and
   a pin to extend through the second bore and the third bore to couple the coupler and the linkage arm.

2. The pivot assembly of claim 1, wherein the arm extends rearward of the body.

3. A pivot assembly for use with an arresting hook, the pivot assembly comprising
   a coupler having a first opening defining a first axis and a second opening defining a second axis, the first opening transverse relative to the second opening;
   a linkage arm having a body and an arm, the body including a third opening defining a third axis, the first opening of the coupler to receive the body of the linkage arm such that the second opening of the coupler coaxially aligns with the third opening of linkage arm, the arm extending rearward of the body, an end of the linkage arm opposite the body includes a clevis; and
   a pin to extend through the second opening and the third opening to couple the coupler and the linkage arm.

4. The pivot assembly of claim 3, wherein the clevis defines a fourth opening defining a fourth axis, wherein the third axis of the third opening is parallel relative to the fourth axis of the fourth opening.

5. The pivot assembly of claim 4, wherein the fourth opening is spaced from the third opening by a distance defined by a length of the arm.

6. A pivot assembly for use with an arresting hook system, the pivot assembly comprising:
   a coupler to couple to a clevis of a hook shank;
   a linkage arm having a shaft and an arm, the shaft to extend through the clevis of the hook shank and the coupler, the arm to extend at angle relative to the shaft; and a pin to extend through the coupler and the shaft of the linkage arm, the pin to couple the coupler and the linkage arm, an axis of the pin to intersect a longitudinal axis of the shaft when the pin is coupled to the coupler and the linkage arm.

7. The pivot assembly of claim 6, wherein the coupler includes a first bore defining the longitudinal axis, the first bore to receive the shaft of the linkage arm.

8. The pivot assembly of claim 6, wherein the coupler includes a second bore to receive the pin, the second bore being transverse relative to the longitudinal axis of the coupler.

9. The pivot assembly of claim 8, wherein the shaft includes a third bore, the third bore aligning with the second bore when the shaft is positioned in the coupler.

10. The pivot assembly of claim 6, wherein the pin at least one of restricts or prevents lateral and rotational movement of the linkage arm relative to the coupler along the longitudinal axis.

11. The pivot assembly of claim 6, wherein the arm of the linkage arm includes a connector to couple to a piston of a vertical damper actuator of the arresting hook system.

12. The pivot assembly of claim 6, wherein the coupler is to pivotally couple the arresting hook shank and a trapeze of the arresting hook system.

13. An arresting hook system comprising:
a trapeze assembly, the trapeze assembly including a pivot plate;
a hook assembly including a hook and a hook shank to support the hook, the hook shank including a clevis opposite the hook; and
a pivot assembly to couple the trapeze assembly and the hook assembly, the pivot assembly including:
a coupler positioned in the clevis of the hook shank;
a linkage arm having a shaft and an arm extending rearward of the shaft, the shaft positioned in an opening of the clevis of the hook shank and a first opening of the coupler; and
a pin to couple the coupler and the shaft of the linkage arm, the pin defining a lateral pivot axis that intersects a vertical pivot of the shaft of the linkage arm.

14. The arresting hook system of claim 13, wherein the pin is positioned in a second opening of the coupler and a third opening of the shaft that aligns with the second opening when the shaft is positioned in the first opening of the coupler.

15. The arresting hook system of claim 13, wherein the pin is perpendicular relative to a longitudinal axis of the shaft.

16. The arresting hook system of claim 13, wherein the arm includes a second clevis at an end of the arm.

17. The arresting hook system of claim 16, wherein the second clevis is to receive a rod end of a vertical damping actuator of the arresting system.

18. The arresting hook system of claim 13, wherein the coupler includes a cam surface to engage a lateral damper of the arresting system.

19. The arresting hook system of claim 13, wherein the pin couples the hook shank and the pivot plate of the trapeze assembly.

20. The arresting hook system of claim 19, wherein the pin includes retainers at respective ends of the pin, the retainers to engage respective sides of the pivot plate of the trapeze assembly.

21. The pivot assembly of claim 2, wherein an end of the arm opposite the body includes a fastener.

22. The pivot assembly of claim 1, wherein the first body includes a first boss and a second boss that extend from an outer surface of the first body.

23. The pivot assembly of claim 1, wherein the second/ body is a cylindrical body.

24. The pivot assembly of claim 1, wherein the linkage assembly is to couple to an actuator, the actuator to cause pivotal movement of the coupler relative to the second axis.

* * * * *